(12) United States Patent
Perrott et al.

(10) Patent No.: US 6,334,681 B1
(45) Date of Patent: Jan. 1, 2002

(54) LENSES AND SPECTACLES BEARING LENSES

(75) Inventors: Colin Maurice Perrott, Mouse Harbor; Kevin Douglas O'Connor, Greenwood; Simon John Edwards, St. Peters, all of (AU)

(73) Assignee: Sola International Holdings Ltd., Lonsdale (AU)

( * ) Notice: Subject to any disclaimer, the term of this patent is extended or adjusted under 35 U.S.C. 154(b) by 0 days.

(21) Appl. No.: 09/293,173

(22) Filed: Apr. 16, 1999

Related U.S. Application Data

(63) Continuation-in-part of application No. PCT/AU98/00274, filed on Apr. 17, 1998.

(30) Foreign Application Priority Data

Apr. 17, 1997 (AU) .............................. PO6257
Oct. 21, 1998 (AU) .............................. PCT/AU 98/00872

(51) Int. Cl.⁷ ................................................ G02C 7/02
(52) U.S. Cl. ........................ 351/159; 351/41; 351/176
(58) Field of Search ................................. 351/159, 172, 351/176, 177, 41

(56) References Cited

U.S. PATENT DOCUMENTS

| | | |
|---|---|---|
| 1,741,536 A | 12/1929 | Rayton |
| 1,918,999 A | 7/1933 | Wells |
| 1,942,400 A | 1/1934 | Glancy |
| 3,705,760 A * | 12/1972 | Langendorfer et al. ....... 341/41 |
| 4,187,505 A | 2/1980 | Morley et al. |
| 4,577,942 A | 3/1986 | Frieder et al. |
| 4,645,317 A * | 2/1987 | Frieder et al. .............. 351/172 |
| 4,778,266 A | 10/1988 | Maitenaz |
| 5,056,906 A | 10/1991 | Akiyoshi |
| 5,094,520 A | 3/1992 | Reshef et al. |
| 5,110,199 A | 5/1992 | Ishida |
| 5,123,724 A | 6/1992 | Salk |
| 5,187,505 A | 2/1993 | Spector |
| 5,321,443 A | 6/1994 | Huber et al. |
| 5,416,537 A | 5/1995 | Sadler |
| 5,426,473 A | 6/1995 | Riehm |
| 5,483,303 A | 1/1996 | Hirschman |
| 5,526,068 A | 6/1996 | Markovitz |
| 5,604,547 A | 2/1997 | Davis et al. |
| 5,617,153 A | 4/1997 | Allen et al. |
| 5,644,374 A | 7/1997 | Mukaiyama et al. |
| 5,650,838 A | 7/1997 | Roffman et al. |
| 5,689,323 A | 11/1997 | Houston et al. |
| 5,719,655 A | 2/1998 | Peschel et al. |
| 5,825,455 A | 10/1998 | Fecteau et al. |
| 6,129,435 A | 10/2000 | Reichow et al. |
| 6,142,624 A | 11/2000 | Morris et al. |

FOREIGN PATENT DOCUMENTS

| | | |
|---|---|---|
| EP | 573 948 | 12/1993 |
| EP | 640 523 | 3/1995 |
| FR | 2542462 | 9/1984 |
| FR | 83 03673 | 9/1984 |
| GB | 680400 | 10/1952 |
| GB | 1509583 | 5/1978 |
| GB | 2 237 893 | 5/1991 |
| GB | 2 281 635 | 3/1995 |
| GB | 2281635 | 3/1995 |
| WO | 79/00548 | 8/1979 |
| WO | 91/17468 | 11/1991 |
| WO | 97/21138 | 6/1997 |
| WO | WO97/22894 | 6/1997 |
| WO | WO97/35224 | 9/1997 |
| WO | WO97/38343 | 10/1997 |

* cited by examiner

Primary Examiner—Scott J. Sugarman
(74) Attorney, Agent, or Firm—Burns, Doane, Swecker & Mathis, L.L.P.

(57) ABSTRACT

An optical lens element of wrap-around or shield type wherein the aperture of the lens outline or edge of east one surface of the optical lens element is of generally ovaline shape and located on the surface of a sphere whose radius of curvature corresponds to 11 D or above, a toroid where the horizontal radius or curvature corresponds to 11 D or above, or a surface where the radius of curvature changes across at least section of the lens aperture.

54 Claims, 32 Drawing Sheets

LENSES AND SPECTACLES BEARING LENSES

The subject application is a continuation-in-part of PCT/AU98/00274, which was filed Apr. 17, 1998, and designated the United States.

The present invention relates to spectacles bearing sunglass lenses, in particular spectacles with refractive power and to optical lens elements for mounting in frames of the wrap-around or shield type.

It is known in the prior art to manufacture non-corrective eyeglasses such as sunglasses or protective eyeglasses having wrap-around segments designed to shield the eye from incident light, wind, and foreign objects in the temporal vision field of the wearer.

Visible light and light in the UV region may enter the eye from angles as high as 100° from the line of sight.

It has not been possible, however, in prior art sunglasses or protective eyeglasses, to provide such spectacles with significant refractive power, whilst maintaining a cosmetically acceptable appearance. The radius of curvature required to provide an ophthalmic lens including a prescription surface is such that the spectacles would produce a bug-eyed appearance, which would be cosmetically unacceptable.

Moreover, direct utilisation of prior art sunglass lenses with refractive power does not permit retrofitting of non-prescription sunglasses nor use of prescription lenses with a variety of sunglasses.

Whilst attempts have been made in the prior art to provide a wrap-around sun shield over otherwise generally standard prescription eyeglasses, such products are generally cosmetically unacceptable and suffer from significant optical distortions.

Attempts have also been made to provide detachable prescription lenses to otherwise standard sunglasses but such arrangements are both cosmetically unattractive and suffer from considerable optical distortion due to light passing between two spaced lens surfaces.

Similarly it is known in the prior art to manufacture non-corrective clip-on sunglasses for attachment to standard prescription spectacles. However such clip-on sunglasses are also both cosmetically unattractive and suffer from similar optical distortion.

Further, in International Patent Application PCT/AU97/00188 "Improved Single Vision Lenses", Applicants disclose an optical lens element including a front and back surface, at least one surface being continuous, and forming a prescription (Rx) zone and a peripheral temporal zone for providing a shield in the area of the temples, which zones are smoothly blended to avoid a prismatic jump from the Rx zone to the temporal zone.

Whilst such lenses are a significant improvement, problems remain in respect of ease of manufacture, optical quality and ease of mounting, particularly for lenses of medium to high power. Specifically, highly powered minus lenses tend to intrude against the temples of the wearer, requiring the use of a peripheral zone, as described, in that region for lenses beyond about −4.00 D corrective power. From extensive wearer trials, Applicants have established that wearers enjoy the greater width of corrected vision provided by lenses of this type and report less enthusiastically against the use of the peripheral extension which has no corrective power. For example for plus power lenses beyond about +2.00 D corrective power, the inner surface of the lens may clash against the wearer's eyelashes unless the peripheral extension is used, again diminishing the wearer's experience of panoramic corrected vision.

Accordingly it would be a significant advance in the art if lens constructions could be provided which avoid the problems of physical contact with the wearer but nevertheless deliver corrected vision approaching the full field available to human vision.

It is accordingly an object of the present invention to overcome, or at least alleviate, one or more of the difficulties and deficiencies related to the prior art.

Accordingly in a first aspect of the present invention there is provided an ophthalmic article including a first lens element having a front and rear surface; and a complementary lens element capable of bearing a prescription (Rx surface having a front surface so shaped to closely approach at least a portion of the rear surface of the first lens element.

In this embodiment, the complementary lens element provides at least a portion of the refractive power required by the wearer, and is so shaped that the ophthalmic article remains substantially free of optical distortion and cosmetically acceptable.

By the term "lens element" as used herein, we mean an optical or ophthalmic lens, semi-finished lens, or lens wafer which may be utilised in the formation of an ophthalmic product.

The ophthalmic article may be of any suitable shape. The article may be a pair of spectacles. The article may be a pair of sunglasses.

The first lens element may be a tinted sunglass element (s), preferably attached to a spectacle frame. The first lens element may exhibit plano power or may provide positive or negative refractive power.

The first lens element may include an extension in the temporal region.

The complementary lens element may have a front surface of complementary shape to the rear surface of the first lens element.

In an alternative aspect of the present invention, there is provided an ophthalmic article including a first lens element capable of bearing a prescription (Rx) surface; and a complementary lens element having a rear surface so shaped to closely approach at least a portion of the front surface of the first lens element.

In this embodiment, the complementary lens element may function as a sunglass element and/or may provide at least a portion of the refractive power of the ophthalmic article, for example to improve night driving optical performance. The complementary lens element has a rear surface so shaped that the ophthalmic article remains substantially free of optical distortion and cosmetically acceptable.

The first lens element may be a standard prescription lens element. The first lens element may include an extension in the temporal region.

The complementary lens element may be a tinted sunglass lens element. The complementary lens element may also include an extension in the temporal region. The complementary lens element may exhibit plano power or may provide positive or negative refractive power.

Accordingly, in a further aspect of the present invention, there is provided a lens element holder including a pair of lens element supports;

attachment means for removably attaching the lens element holder to a spectacle frame; and a pair of lens elements mounted on or in the lens element supports.

The lens element holder according to this aspect of the present invention is adapted for utilisation with any suitable spectacle frame, in particular a spectacle frame bearing sunglass lenses, protective lenses, or prescription lenses, or any combination thereof. In a preferred aspect the lens element holder may be designed to clip in behind the sunglass lenses.

Accordingly, in a still further aspect of the present invention, there is provided spectacles including a spectacle frame;

a tinted sunglass element(s) or shield element attached to the frame;

a lens element holder including a pair of lens element supports;

attachment means for optionally removably attaching the lens element holder to the spectacle frame; and a pair of optical lens elements mounted on or in the lens element supports.

Applicants have discovered that by utilising a pair of optical lens elements to provide refractive power to the spectacles, the spectacles have a significantly improved appearance for the wearer and significantly reduced optical distortion between the spectacle lenses and lens wafers.

The spectacle frame utilised in the spectacles according to this aspect of the present invention may be of any suitable type. A conventional spectacle frame may be used. A spectacle frame of the wrap-around type is preferred.

Frames of the rimless and temple bar type may be used.

The optical lens elements may be optical lens wafers.

The pair of optical lens elements may be a pair of optical lens wafers.

The pair of optical lens elements utilised in the spectacles according to this aspect of the present invention may be of any suitable type. A back lens element, preferably a back lens wafer formed from a polymeric optical material and capable of forming a prescription (Rx) surface may be used. A back wafer lens which is adapted to utilise the full depth of the plano front surface of the tinted sunglass element is preferred. A range of back wafer elements of the "Matrix" type by Applicants (U.S. Pat. No. 4,187,505 to Applicants) have been found to be suitable.

The back lens elements may provide a range of refractive distance Rx of from approximately +2.00 D to –2.00 D with 0 to –2.00 cyl. Such a range of refractive power will provide suitable prescription lenses for approximately 50% of all scripts Desirably, the range of refractive power may be extended to at least approximately +2.50 D to approximately –4.00 D. Even more preferably the range of refractive power is approximately +3.50 D to –4.00 D.

The tinted sunglass elements(s) or shield element(s) may include a single curved element or pair of lenses, depending on the style chosen. The tinted sunglass element(s) or shield element(s) may exhibit plano power. A plano lens curve of approximately 6 to 8 dioptre (D) or higher is preferred. The tinted sunglass element(s) may be attached to the spectacle frame in any conventional manner.

As mentioned above, in this aspect, the lens element holder may be designed to clip in behind the tinted sunglass element(s) so that the lens elements approach the back surface of the sunglass element as closely as possible. Accordingly, the front or mating surface curve of the lens elements may be constant for all prescriptions, their back surfaces being altered to provide both the nominal curve for the Rx correction and atoric corrections to compensate for tilt and off-axis location, as described by Applicants in International Patent Application PCT/AU97/00188. By comparison, prior art spectacle lenses as sold commercially by Applicant in finished lens form have no correction for off-axis alignment or tilt. Furthermore both front and back surface curves vary according to the Rx being provided. In general terms, the choice of front and back surface curves for prior art finished lenses is such that their numerical average is of order 5.5 to 6.0 dioptres, this being the design curve of conventional spectacle frames.

The lens element supports may be designed to surround the lens wafers in whole or in part to hold them in position behind the tinted sunglass element.

Lens elements may be attached to the lens element support by mounting within the lens wafer support frame, either in conventional manner or by utilisation of a series of lugs around the circumference of the lens wafer supports.

The attachment means for removably attaching the lens element holder to the spectacle frame may be of any suitable type. The attachment means of the lens wafer holder will vary with the nature of the spectacle frame selected. For example the attachment means may be similar to those used in conventional clip-on sun lens elements. The attachment means may attach the lens wafer holder to the circumference of the spectacle frame and/or by the utilisation of tongues or lugs proximate the nose piece of the spectacle frame.

In a preferred embodiment the lens element holder may include a nose piece adapted to receive and retain a pair of lens elements.

The nose piece may be adapted to be removably attached to the nose piece of the spectacle frame. The lens element holder may accordingly include an optionally removable attachment clip (see FIG. 21 below).

In a further preferred embodiment, the lens attachment means for removably attaching the lens element holder to the spectacle frame may include a retaining member(s) adapted to receive and retain a lens element in the region of; its temporal extremity.

The or each retaining member may be positioned adjacent the temporal hinge of the spectacle frame. Each retaining member may take the form of a retaining slot adapted to receive the temporal edge of a lens element. The retaining slot may be open at the upper end thereof to permit insertion and removal of the lens element.

The retaining slot may have a complementary shape to the shape of the temporal edge of the lens element.

In an alternative aspect of the present invention, the lens element holder according to the present invention may be designed for attachment to a spectacle frame in front of the sunglass lenses.

Accordingly, in a further aspect of the present invention there is provided spectacles including a spectacle frame;

a pair of ophthalmic lenses capable of bearing a prescription (Rx) surface;

a lens element holder including a lens element support(s);

attachment means for optionally removably attaching the lens element holder to the spectacle frame; and an optical lens element(s) mounted on or in the lens element support.

In this embodiment, the attachment means may be designed for removably attaching the lens element holder to the front of the spectacle frame.

Accordingly, in this aspect, the optical lens element(s) may be a pair of optical lens wafers, preferably a pair of front lens wafers.

The front lens element(s) may be of the plano type. The optical lens element(s) may be of the wrap-around type. The front lens element(s) may be provided in a range of front surface curves of from approximately 2.00 D to 9.00 D in order that their back or mating surface curves may be as close as possible to the curve of the sunglass lenses. This may be contrasted with the 6.00 D base design curve of conventional spectacle lenses. The range of lens elements providing a fixed mating curve permits the lens elements to more closely align to the design of tho sunwar.

Accordingly, the lens element holder may be more compact and fashionable, as well as suffering minimally from light entry between the front lens element and back spectacle lenses.

In an alternative aspect of the present invention an optical lens element is provided which may be mounted in a suitable spectacle frame, for example of wrap around or shield type.

Accordingly in this aspect of the present invention there is provided an optical lens element including a front and back surface, at least one surface being continuous, and forming a prescription (Rx) zone and optionally a peripheral, optionally non-prescription, temporal zone;

at least one surface exhibiting a change of base curve across the field of vision of the wearer;

the front and/or back surface bearing a surface correction to at least partially adjust for optical errors.

The optical lens element according to this aspect of the present invention may be mounted directly in a spectacle frame, for example of the wrap around or shield type. When mounted, the optical lens element may be rotated temporally about a vertical axis through the optical centre thereof ("tilt"), or translated so that the line of sight remains parallel to the optical axis of the lens ("offset"), or a combination of both tilt and offset as described below.

The optical lens element according to this aspect of the present invention may provide prescription (Rx) correction generally in the range of −6.0 D to +6.0 D.

In a preferred aspect, the front surface of the optical lens element exhibits a change of base curve across the field of vision of the wearer, the base curves preferably being smoothly blended to avoid a prismatic jump in the Rx zone. The base curve from the nasal limit to the optical centre may be relatively low, for example from approximately 0.0 D to approximately 6 D. The base curve from the optical centre to the temporal limit may, in contrast, be a high base curve, e.g. of approximately 6.0 D or above, preferably approximately 12.0 D to 18.0 D.

Preferably, the front and/or back surface(s) of the optical lens element include a compound spherical design to provide the desired prescription (Rx) in the prescription zone. More preferably, this prescription zone will extend across the full aperture of the spectacle frames being employed.

It will be understood that an advantage of the present invention is that a common front curve may be utilised across a range of prescription powers. This provides an improvement in the ease of manufacture of optical lens elements, allows a wide range of prescriptions to be fitted to a single frame design and assists in the reduction of inventories.

In a further preferred aspect the optical lens element in the region from the nasal limit to the optical centre may be generally of the meniscus type. Alternatively, the nasal region of the optical lens element may be biconvex in shape. The biconvex shape is preferred, particularly for lenses of high power, due to its ease of mounting and improved cosmetics for the wearer.

By the term "optical lens element" as used herein, we mean an optical or ophthalmic lens, semi-finished lens or lens formed from a pair of lens wafers which may be utilised in the formation of an optical lens product.

In a preferred form, the front surface exhibits a change of base curve across the field of vision of the wearer, the base curves being smoothly blended to avoid a prismatic jump in the Rx zone.

The ophthalmic lens element may be a lens of negative or positive refractive power or may be a plano lens. Where the ophthalmic lens element includes an ophthalmic lens wafer, the peripheral temporal zone may be provided by the front wafer.

The peripheral temporal zone may be at least in part of generally toric shape. The peripheral temporal zone may be at least in part generally plano.

The peripheral temporal zone may itself form an extension of the prescription zone or may be a non-prescription zone.

In an alternative or additional aspect, the peripheral temporal zone may be modified to permit light control within the zone.

The lens element may be rotated temporally about a vertical axis through the optical centre thereof or the optical axis may be decentred relative to the geometric axis, or the lens element may be both rotated and decentred.

It will be understood that the peripheral temporal zone, for a typical sunglass lens element of the wrap-around type, may for example extend for approximately 10 to 25 mm.

In a further aspect of the present invention, there is provided an optical lens element providing prescription (Rx) correction generally in the range −6.0 D to +6.0 D.

wherein the front surface is capable of being mounted in a frame of constant design curve irrespective of the Rx, such frame curves being 5.0 D and above; and the back surface provides good clearance from temples or eye lashes; at least one surface exhibits a change of base curve across the field of vision of the wearer.

The ophthalmic lens element may form part of a series of lens elements, e.g. of the type described in International Patent Application PCT/EP97/00105, the entire disclosure of which is incorporated herein by reference.

Such series is particularly preferred where the curvature of the front surface of the optical lens element is kept constant over a range of powers.

Preferably the front surface is capable of being mounted in a frame of constant design curve of between 8.0 D and 9.0 D.

More preferably the front surface of the lens element has a high compound curve extending from nasal to temporal limits, but the vertical curve is 6.0 D or below.

It will be understood that such vertical curves permit the final prescription lenses, preferably edged lenses, to be adapted to the shape of the wearer's face and so locate closely in a form of the wrap-around type (a so-called "geometrically toric" design for which the vertical curve of the back surface is selected to maintain the desired through power or Rx correction provided by the lens. This may be distinguished from a conventional "optically toric" design wherein one surface is rotationally symmetric and the other is shaped to provide the sphere and cylinder components of the wearer's Rx without consideration of the facial form of a wearer).

Alternatively the optical lens elements may be adapted for mounting in a frame of the shield type. Accordingly in a still further aspect of the present invention there is provided a unitary optical lens including a pair of optical lens elements, each lens element providing prescription (Rx) correction generally in the range −6.0 D to +6.0 D with 0 to +3 cyl wherein the front surface is capable of being mounted in a frame of constant design curve irrespective of the Rx, such frame curves being 5.0 D and above; and the back surface provides good clearance from temples or eye lashes; at least one surface exhibits a change of base curve across the field of vision of the wearer.

The optical lens element according to the present invention may, when mounted, in a spectacle frame, be rotated temporally about a vertical axis through the optical centre thereof or decentred.

Accordingly in a further aspect of the present invention, there is provided an optical lens element adapted for mounting in a frame of the wrap-around or shield type, such that the lens element is rotated temporally about a vertical axis through the optical centre thereof, the lens element including a front and back surface capable of forming a prescription (Rx) zone; and a peripheral temporal zone;

at least one surface exhibits a change of base curve across the field of vision of the wearer.

the front and/or back surface bearing a surface correction to at least partially adjust for optical errors including astigmatic and mean power errors.

In this embodiment, whilst the optical axis continues to intersect the line of sight of the wearer, a number of optical effects and errors are thus introduced as discussed below. However, by suitable selection of the combination of front and/or back surface, the optical errors may be reduced or eliminated.

Accordingly, in a still further aspect of the present invention there is provided an optical lens element adapted for mounting in a frame of the wrap-around or shield type, the lens element including a front and back surface capable of forming a prescription (Rx) zone; and a peripheral temporal zone;

at least one surface exhibits a change of base curve across the field of vision of the wearer, wherein the optical axis is decentred relative to the geometric axis of the lens element to provide for prismatic correction, the front and/or back surface bearing a surface correction to at least partially adjust for errors including astigmatic and mean power errors.

Applicants have discovered that it is possible to produce an optical lens element, preferably a sunglass lens element, which includes a prescription (Rx) zone and which is decentred to provide a prismatic correction.

Preferably the front and/or back surface of the optical lens element further includes a surface correction to at least partially adjust for prismatic errors, e.g. introduced by lens tilt or offset required e.g. to suit the styling of the frame.

Illustrative optical effects and errors are dealt with in detail in International Patent Application PCT/AU97/00188 referred to above.

One or more of the following corrections may be introduced to reduce the errors described:

Mean Power Error Correction

The front and/or back surface curvature may be adjusted to account for the change in mean power resulting from rotation of the lens, the degree of correction depending upon a balance of wearer tolerable on-axis power error and reduction of un-accommodatable off-axis power errors.

Hence a full power correction for the introduced shift in through power to correct on-axis errors may be applied or a partial correction used when off-axis power error is considered.

Astigmatic Error Correction

The front and/or back surface may at least in part be optically toric in nature to correct for astigmatic error resulting from the lens rotation discussed earlier. The degree of correction may fully correct for the astigmatism introduced due to rotation of the lens or may be partially corrected depending upon the application. A partial correction may be applied to achieve a tolerable on-axis astigmatic error so as to reduce the off-axis astigmatic errors.

Prismatic Correction

The optical centre may be shifted horizontally to compensate for prism induced by the lens rotation. This may be achieved also by applying prescribed prism during design specification or surfacing, taking into account any deliberate offset or decentration of the lens element to suit the geometric form of the frame.

Additional Considerations

These corrections include, but are not limited to, pantoscopic lens tilt, variation in lens frame types, cosmetic requirements and average pupil-centre to lens distances depending on frame and lens form types.

Off-axis Prismatic Disparity

To correct for off-axis prismatic disparity the lens may include an aspheric surface on either the front or back surfaces, or both.

Aspherisation of Surfaces

Aspherisation of either the front or back surfaces may be utilised to correct for off-axis errors including errors introduced due to tilt and/or the selection of the base curves. Such off-axis error may include power and astigmatic error and prismatic disparity.

It will be recognised, however, that the optical lens elements described above are generally only suitable for prescriptions where zero or very low cylinder corrections are required.

Accordingly, Applicants have designed an optical lens element of the type described above but so modified as to permit prescription (Rx) correction generally in the range of −6.0 D to +6.0 D with 0 to +3 cyl.

Accordingly, in a further aspect of the present invention there is provided an ophthalmic article including a first lens element having a front and rear surface; and a complementary lens element capable of bearing a prescription (Rx surface having a front surface so shaped to closely approach at least a portion of the rear surface of the first lens element;

the lens element being generally rotationally symmetrical about the optical centre of the lens.

It will be understood that given the rotational symmetry of the opticle lens element the cylinder can simply be introduced to the degree desired.

In a further aspect of the present invention, there is provided an optical lens element providing prescription (Rx) correction generally in the range −6.0 D to +6.0 D with 0 to +3.0 cyl.

wherein the front surface is capable of being mounted in a frame of constant design curve irrespective of the Rx, such frame curves being 5.0 D and above; and the back surface provides good clearance from temples or eye lashes; at least one surface exhibits a change of base curve across the field of vision of the wearer.

The ophthalmic lens element may form part of a series of lens elements, e.g. of the type described in International Patent Application PCT/EP97/00105, the entire disclosure of which is incorporated herein by reference.

Such series is particularly preferred where the shape of the front surface of the optical lens element is kept constant over a range of powers.

Preferably the front surface is capable of being mounted in a frame of constant design curve of between 8.0 D and 9.0 D.

More preferably the front surface of the lens element has rotational symmetry about a design axis (being geometrically toroidal) with high surface curve extending toward temporal limits and a lower curve in the central optical zone.

It will be understood that the effect of the lower surface curve at the central optical zone of the lens element permits the desired wrap around form of prescription eyewear without bug-eyed appearance. Further the final prescription lenses, preferably edged lenses, may be adapted to the shape of the wearer's face and so locate closely against the facial form of the wearer.

Alternatively the optical lens elements may be adapted for mounting in a frame of the shield type. Accordingly in a still further aspect of the present invention there is provided a unitary optical lens including a pair of optical lens elements, each lens element providing prescription (Rx) correction generally in the range −6.0 D to +6.0 D with 0 to +3 cyl.

wherein the front surface is capable of being mounted in a frame of constant design curve irrespective of the Rx, such frame curves being 5.0 D and above; and the back surface provides good clearance from temples or eye lashes; at least one surface exhibits a change of base curve across the field of vision of the wearer in both horizontal and vertical directions.

The optical lens element according to the present invention may, when mounted, in a spectacle frame, be rotated temporally about a vertical axis through the optical centre thereof or decentred.

Accordingly in a further aspect of the present invention, there is provided an optical lens element adapted for mounting in a frame of the wrap-around or shield type, such that the lens element is rotated temporally about a vertical axis through the optical centre thereof, the lens element including a front and back surface capable of forming a prescription (Rx) zone; and a peripheral temporal zone;

at least one surface exhibits a change of base curve across the field of vision of the wearer in both vertical and horizontal directions;

the front and/or back surface bearing a surface correction to at least partially adjust for optical errors including astigmatic and mean power errors.

In this embodiment, the surface corrections directed toward the elimination of optical error introduced by horizontal tilt or by offset of the optical lens elements are distributed in a rotationally symmetric fashion, thus compromising to some extent the quality of vision off-axis in a vertical sense.

Accordingly, in a still further aspect of the present invention there is provided a semi-finished optical lens element adapted for mounting in a frame of the wrap-around or shield type, wherein the front surface is capable of forming a prescription (Rx) zone; and a peripheral temporal zone;

the front surface exhibits a change of base curve across the field of vision of the wearer, and the front surface has shape corrections of optically toric character to correct for lens tilt and offset, primarily in the horizontal direction.

The back surface required to complete the wearer's Rx has sphere and cylinder components which involve a change in base curve across the field of vision of the wearer in both horizontal and vertical directions.

Such complex surfaces cannot be created by conventional ophthalmic lens processing equipment, but may be generated by current state of the art surfacing equipment such as the "Ultralab" unit from Micro Optics Inc. This equipment produces a precise surface form by cutting to a computer generated file. The final optical finish may be achieved by applying an overlay coat of optical resin matching the refractive index of the underlying lens. Errors which would be created by polishing the generated surface are thereby avoided or at least substantially reduced.

The front surface of this semi-finished optical lens element has a precise orientation corresponding to the horizontal plane in which tilt and offset may occur. Therefore it may bear other optical features which require precise orientation with respect to vertical and horizontal directions. Examples of these are multifocal power addition for near or intermediate visual distances (both conventional segment type and progressive addition lenses), polarizing filters, or cosmetic mirror or tint treatments.

Accordingly, in a still further aspect of the present invention there is provided a semi-finished optical lens element adapted for mounting in a frame of the wrap-around or shield type, wherein the front surface is capable of forming a prescription (Rx) zone; and a peripheral temporal zone;

the front surface exhibits a change of base curve across the field of vision of the wearer;

has shape corrections of optically toric character to correct for lens tilt and offset in the horizontal direction, and includes a secondary optical feature which requires precise orientation of a finished prescription lens with respect to the vertical or horizontal directions.

The secondary optical features may be selected from one or more of the group including multi-focal correction, progressive power addition, light polarization and the like.

In a preferred aspect of the present invention the ophthalmic lens element may be formed as a laminate of a back and front lens element.

Accordingly, in a preferred aspect of the present invention there is provided a laminate optical article adapted for mounting in a frame of the wrap-around or shield type, including a front lens element;

a complementary back lens element, the front and back surfaces of the laminate optical article being capable of forming a prescription (Rx) zone;

at least one surface exhibiting a change of base curve across the field of vision of the wearer;

the front and/or back surface bearing a correction to at least partially adjust for errors including astigmatic and mean power errors; the front and/or back lens element optionally including a peripheral temporal zone.

Desirably at least the front surface of the front lens element exhibits a change of base curve across the field of vision of the wearer and optionally includes a secondary optical feature, as described above.

It will be understood, in this embodiment, inventories may be reduced by providing a single front lens element for a range of complementary back elements. Furthermore, the need to employ the most modern lens finishing techniques as for example to complete an Rx from a semi-finished blank is alleviated.

It will be understood further that any feature described as being included via the front lens element may equally be included by the back lens element and vice-versa.

In a further preferred embodiment, in order to permit introduction of cylinder correction, the mating surfaces of front and back lens elements may be generally rotationally symmetric about their respective geometric centres.

As discussed above, the laminate article may be rotated temporally about a vertical axis through the optical centre thereof, or the optical axis may be decentred relative to the geometric axis, or the lens element may be both rotated and decentred.

Accordingly, in a preferred embodiment of this aspect of the present invention there is provided a laminate optical article adapted for mounting in a frame of the wrap-around or shield type, such that the lens element is rotated temporally about a vertical axis through the optical centre thereof, including a front lens element;

a complementary back lens element, the front and back surfaces of the laminate optical article being capable of forming a prescription (Rx) zone;

at least one surface exhibiting a change of base curve across the field of vision of the wearer;

the front and/or back surface bearing a correction to at least partially adjust for errors including astigmatic and mean power errors; the front and/or back lens element optionally including a peripheral temporal zone, and/or a secondary optical feature which requires precise orientation of a finished prescription lens with respect to the vertical or horizontal directions.

In a preferred embodiment, the front lens element may be generally plano.

The corresponding back lens element may include a lens element of positive or negative power.

If desired, there may be a distribution of distance power and cylinder between the front and back lens elements.

Alternatively, the back lens element may be relatively thick, the laminate optical article forming a semi-finished lens. Desirably, the lamination of such an article will allow introduction of optical features such as light polarization, mirrors or photochromicity associated with the interlayer region. The interlayer region is also a suitable host for holographic, electrochromic or liquid crystal optical structures.

In an alternative or additional aspect, the lens element may be modified to permit light control within the peripheral temporal zone. Desirably the peripheral temporal zone may be modified so that no images are created in temporal vision.

The peripheral temporal zone of the optical lens element according to the present invention may be constructed to maximise cosmetic appearance. Ideally, the peripheral temporal zone should show little or no optical difference from the remainder of the front surface of the ophthalmic lens element. For example, where the prescription Rx surface of the ophthalmic lens is a minus Rx lens, the temporal extension may exhibit a zero refractive power or positive refractive power. The temporal extension may be tapered in cross-section to maximise cosmetic acceptability.

Accordingly, in a preferred aspect the curvature of the front surface is modified in the peripheral temporal zone to substantially correspond to the curvature of the back surface thereof.

It will be understood that the peripheral temporal zone thus formed is a substantially plano extension.

The peripheral temporal zone may be treated with any suitable coatings to maximise the cosmetic appearance of the front surface thereof.

The front surface of the lens element in this embodiment may be of generally circular cross-section.

The rear surface of the lens element may be of generally conic cross-section.

The front surface should be of generally conic cross-section in the peripheral temporal zone, thus providing a generally plano temporal cross-section.

As stated above, the lens element may be modified to permit light control within the peripheral temporal zone. The reflected colour of a sunglass lens is primarily a function of the dyes at the front surface of the lens. A mirror coating may be applied to the back surface of the lens so that the combination of front and back surface reflections achieves specular intensity (mirror) and the sense of lens colour (tint). Alternatively, or in addition, a different tint coating or layer may be provided at the rear surface of the lens. This may alter both the intensity and spectral character of transmitted and reflected rays interacting with the over-tinted region of the lens.

In a further option, the front or rear surface (preferably the rear) may be frosted so that reflocted and transmitted light is diffuse. That is, images are not formed by light which enters the lens peripherally. The frosted part of the lens is visually opaque (translucent) to a wearer. To someone else, the lens will reflect the tinted colour from its front surface against a dull shadow from the frosted part of the rear surface. Preferably the rear surface may include a localised mirror coating from which the reflection is a matte finish.

The peripheral temporal zone may be treated in a number of ways so that it will not create images in peripheral vision, irrespective of the optical design. The most direct methods simply prevent a perceptible intensity of focused light from passing through by blocking it with any one or a combination of:

Back Surface Gradient Mirror

Back Surface Gradient (Black) Tint

Back Surface Mist

The mirror coating may be introduced utilising conventional techniques, for example vacuum deposition of metal film on a finished lens. A chemical solution of a pristine metallic layer may be deposited on part of a casting mould and subsequently a lens is cast against that mould. A metal mirror thug formed may transmit insufficient light to form any troublesome images while reflecting a soft matte finish in copper, nickel or whatever the chosen metal.

Alternatively, or in addition, the temporal extension may include one or more of the following:

Reflection Holographic Film: mirrored polymer sheet, e.g. approximately 0.5 mm thick giving brightly coloured, changing reflected colour patterns Light Control Film: for example polycarbonate film, e.g. 0.8 mm thick limiting light transmission to a narrow angular band Reflective Film: for example Mylar film 0.025 mm thick, 10% transmission/90% reflection Liquid Crystal Film: for example polymeric sheet 0.20 mm thick changing colour across the full spectrum with changing temperature.

The ophthalmic lens may be formulated from any suitable material. A polymeric material may be used. The polymeric material may be of any suitable type. The polymeric material may include a thermoplastic or thermoset material. A material of the diallyl glycol carbonate type may be used.

The polymeric article may be formed from cross-linkable polymeric casting compositions, for example as described in Applicants' U.S. Pat. No. 4,912,155, U.S. patent application Ser. No. 07/781,392, Australian Patent Applications 50581/93 and 50582/93, and European Patent Specification 453159A2, the entire disclosures of which are incorporated herein by reference.

Such cross-linkable polymeric casting compositions may include a diacrylate or dimethacrylate monomer (such as polyoxyalkylene glycol diacrylate or dimethacrylate or a bisphenol fluorene diacrylate or dimethacrylate) and a polymerisable comonomer, e.g. methacrylates, acrylates, vinyls, vinyl ethers, allyls, aromatic olefins, ethers, polythiols and the like.

For example, in Australian Patent Application 81216/87, the entire disclosure of which is incorporated herein by reference, Applicant describes a cross-linkable coating composition including at least polyoxyalkylene glycol diacrylate or dimethacrylate and at least one poly functional unsaturated cross-linking agent.

Further, in Australian Patent Application 75160/91, the entire disclosure of which is incorporated herein by reference, Applicant describes a polyoxyalkylene glycol diacrylate or dimethacrylate; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

Such polymeric formulations are UV cured or cured by a combination of UV and thermal treatment. The range of optical lenses sold under the trade designations "Spectralite" by Applicants have been found to be suitable.

The polymeric material may include a dye, preferably a photochromic dye, which may, for example, be added to the monomer formulation used to produce the polymeric material. The variation in depth of colour may be minimised by incorporating a pigment or dye into one or more layers of the optical article.

The ophthalmic lens element according to the present invention may further include standard additional coatings to the front or back surface including electrochromic coatings.

The front lens surface may include an anti-reflective (AR) coating, for example of the type described in U.S. Pat. No. 5,704,692 to Applicants, the entire disclosure of which is incorporated herein by reference.

The front lens surface may include an abrasion resistant coating, e.g. of the type described in U.S. Pat. No. 4,954,591 to Applicants, the entire disclosure of which is incorporated herein by reference.

In a particularly preferred form, the laminate ophthalmic article may include an inner layer providing desired optical properties of the type described in International Patent Application PCT/AU96/00805 to Applicants, the entire disclosure of which is incorporated herein by reference.

The front and back surfaces may further include one or more additions conventionally used in casting compositions such as inhibitors, dyes including thermochromic and photochromic dyes, e.g. as described above, polarising agents, UV stabilisers and materials capable of modifying refractive index.

In a further preferred aspect of the present invention the optical lens element may be modified to accentuate facial form in the nasal region.

Accordingly the optical lens element may include a region of reduced or opposite curvature defining a nasal accentuating region.

In a more preferred form, the lens element may reach forward toward the nasal bridge and backward toward the temples.

In a still further aspect of the present invention there is provided spectacles including
  a spectacle frame of the wrap-around type adapted to receive a pair of optical lenses such that each lens is rotated temporally about a vertical axis through the optical centre thereof; and
  a pair of optical lens elements, each lens element including
    a front and/or back surface capable of forming a prescription (Rx) surface; and optionally
    a peripheral temporal zone;
    at least one surface exhibits a change of base curve across the field of vision of the wearer;
    the front and/or back surface bearing a surface correction to at least partially adjust for errors including astigmatic and mean power errors.

The front and back surfaces of the optical lens elements may be of the types described above. The optical lens element may be decentred.

The spectacle frame according to this aspect of the present invention may be of any suitable type. The spectacle frame may permit adjustment of the inter-pupillary distance for example via attachment of a lens to the frame supports. Frames of the rimless and temple bar type may be used.

The ophthalmic lenses mounted within the frame may be formed from a semi-finished lens or front and back lens wafer as described above. The ophthalmic lenses may bear a prescription surface of minus or plus power.

The forward reach of the lenses in the nasal region may be utilized at least in part to provide protection of the wearer's nose from physical impact or radiation damage due to the UV component of sunlight, for example. Lenses having this purpose are desirably curved forward in the nasal region to a horizontal base of 4.0 to 8.0 D so that the combination of lens surface and nose piece of the sunglass frame or unitary lens protects substantially all of the wearer's nose without intruding on the forward visual field.

In a further aspect of the present invention, there is provided a method of designing an optical lens element adapted for mounting in a frame of the wrap-around or shield type, which method includes
  providing
    a mathematical or numerical representation of a surface of an optical lens element including a first section designed to provide the desired prescription (Rx) in the prescription zone; and adding thereto a mathematical or numerical representation of an overlapping section of increased base curve such that the complete lens surface exhibits a change of base curve across the field of vision of the wearer thus forming a second lens section of increased base curve;
  rotating and/or decentring the representation of the lens surface to permit mounting in a suitable frame; and
  modifying the representation of the lens surface to at least partially adjust for errors including astigmatic and mean power errors.

In a preferred aspect, the method may include
  providing a mathematical or numerical representation of an aspheric front surface of an optical lens element including a first section designed to provide the desired prescription (Rx) in the prescription zone and;
  rotating and/or decentring the representation of the lens surface to permit mounting in a suitable frame;
  subsequently providing a mathematical or numerical representation of a prescription (Rx) back surface; and
  modifying the representation of the back surface of the lens element to at least partially adjust for prismatic and/or astigmatic errors.

Preferably the method includes
  providing
    a mathematical or numerical representation of a Surface of an optical lens element including a first section designed to provide the desired prescription (Rx) in the prescription zone; and adding thereto a mathematical or numerical representation of an overlapping section of increased base curve such that the complete lens surface exhibits a change of base curve across the field of vision of the wearer thus forming a second lens section of increased base curve; and a second mathematical or numerical representation of a transition section designed to smoothly blend the prescription section and a second overlapping section to define a complete lens surface;

rotating and/or decentring the representation of the lens surface to permit mounting in a suitable frame; and modifying the representation of the lens surface to at least partially adjust for errors including astigmatic and mean power errors.

It will be understood that virtually any sunglass capable of being glazed to an Rx may be converted to a prescription product via the lens water holder or optical lens element according to the present invention. This may offer one or more practical advantages:

1) Rapid Rx delivery at a sunglass store, either from a lens element holder inventory (to average PD), or by cut, edge and fit of wafers or lenses at the sunglass store.
2) The option for contact lens wearers to use the basic sunwear product with or without their contacts.
3) The option to have a choice of sunlens colours or mirrors in a common frame style and convert any to Rx by choice.
4) The option to convert branded sunwear products such as Serengeti and Revo to Rx without the protracted delay of ordering from the manufacturer.
5) Sunwear that looks and performs like sunwear, but is also Rx.
6) Better optics because of the higher lens base curves. The flattening of curves for ophthalmic styles compromises the optics, especially well off axis.
7) Minimal problems with double reflections because of the close match of the plano lens curve and the Rx lens front curve.

In a further preferred aspect, the front surface of the lens element or wafer may be of the progressive type.

A lens element of the type described in International Patent Application PCT/AU95/00695 to Applicants, which provides enhanced near vision together with reasonable intermediate vision may be used. Such a lens is particularly suitable for near vision tasks, such as reading, utilisation of computers, and the like.

The entire disclosure of International Patent Application PCT/AU95/00695 is incorporated herein by reference.

The present invention will now be more fully described with reference to the accompanying figures and examples. It should be understood, however, that the description following is illustrative only and should not be taken in any way as a restriction on the generality of the invention described above.

EXAMPLE 1

FIG. 1

Figure 1:
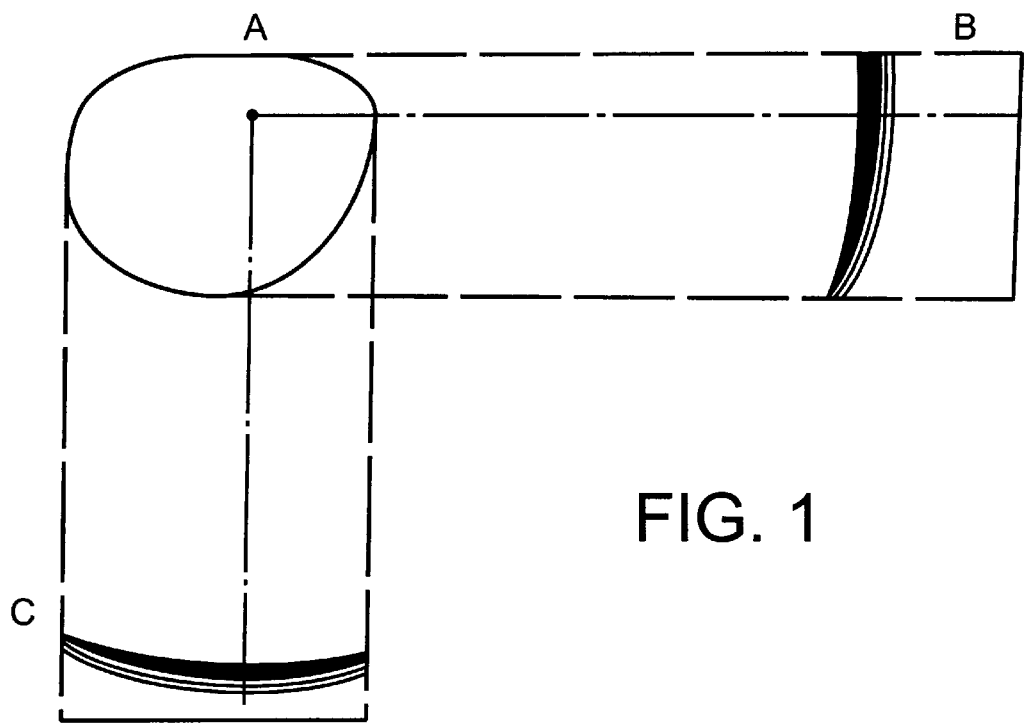
FIG. 1 depicts a plano sunglass lens element and complimentary lens element.

FIG. 1 depicts a typical plano sunglass lens element, approximately to scale. A is the front view of the lens before the right eye of the wearer, the marked spot on the lens being the typical position of the wearer's pupil behind the sunglass lens. B is a vertical section at the visual axis and C is a horizontal section at the visual axis. The front lens is plano of 6 Dioptre curve and its optical axis is coincident with the visual axis of the wearer. The complementary lens element behind the plano is a lens of rear element or back wafer form with front curve equal to 6 Dioptres for all refractive powers. The example is a lens with plus Rx power of 2 D (Dioptres).

FIG. 2

Figure 2:
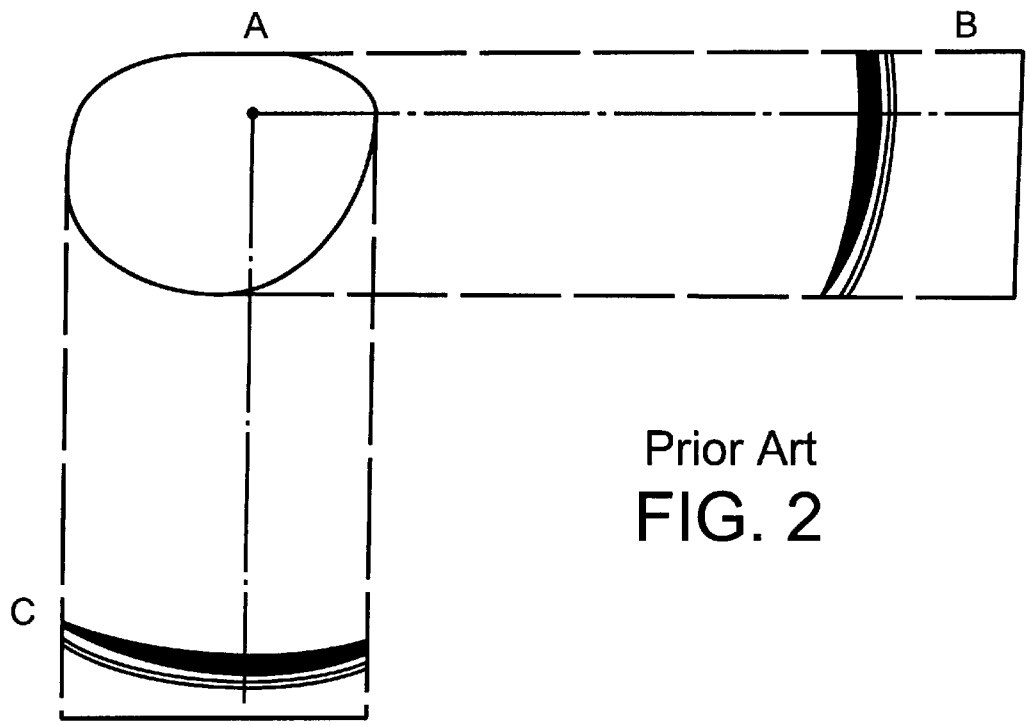
FIGS. 2 & 3 depict configurations similar to FIG. 1, but using typical stock Rx lenses.

FIG. 2 depicts a configuration similar to FIG. 1 where the complementary lens element is a typical stock Rx lens used in the industry, the front curve varying according to the Rx of the lens chosen. The example is a +2 D lens with front curve of 7 D.

FIG. 3

Figure 3:
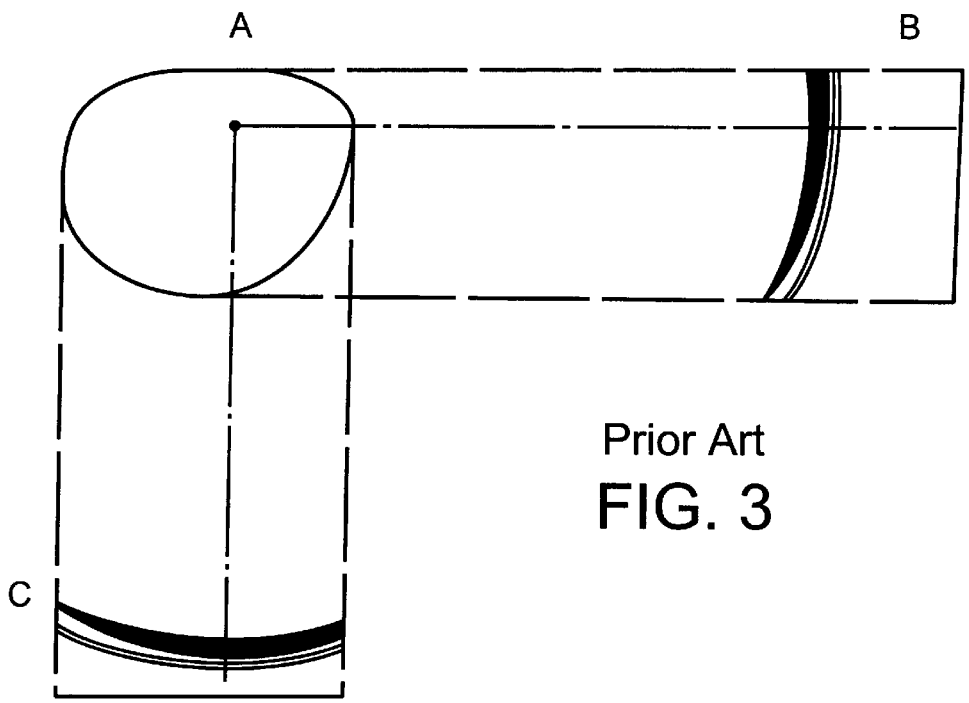

FIG. 3 depicts a configuration similar to FIG. 1 where the complementary lens element is a typical stock Rx lens used in the industry, the front curve varying according to the Rx of the lens chosen. The example is a +2 D lens with front curve of 8 D.

FIG. 4

Figure 4:
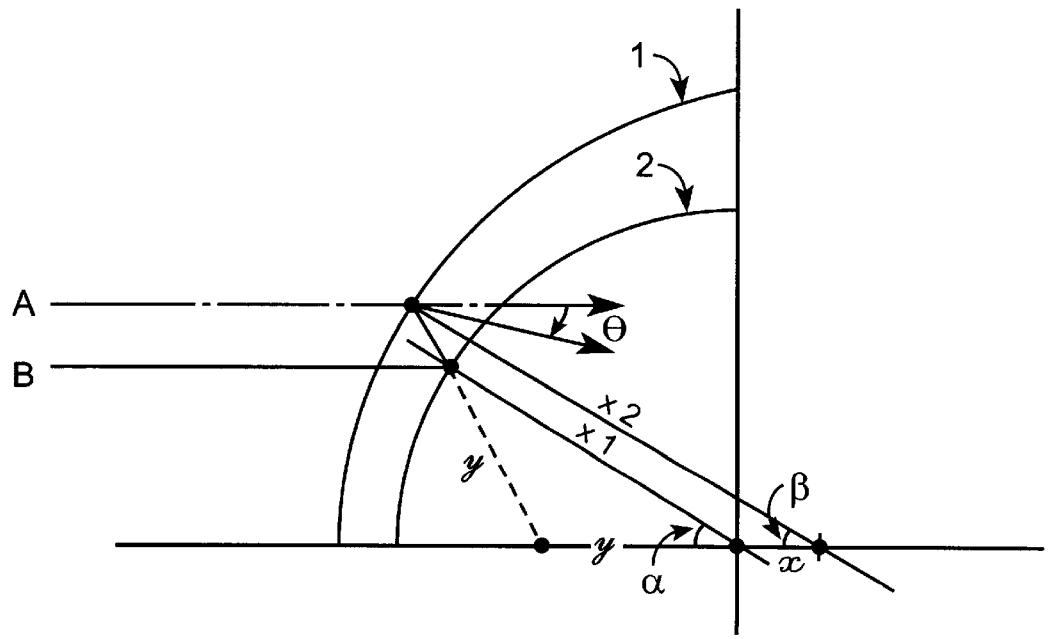
FIG. 4 depicts the reflection of a light ray B between the front surface of a complementary lens 2 and the back surface of a plano lens 1.

FIG. 4 depicts the reflection of a light ray B between the front surface of a complementary lens 2 and the back surface of a plano lens 1. The deflection angle of ray B when entering the back lens compared to the original direction A of the ray is given by $\theta=2[\alpha-\beta]$ where $\cos \alpha=(r_1/2y)$ and $\cos D=(r_2/2\{y+x\})$.

EXAMPLE 2

FIG. 5

Figure 5:
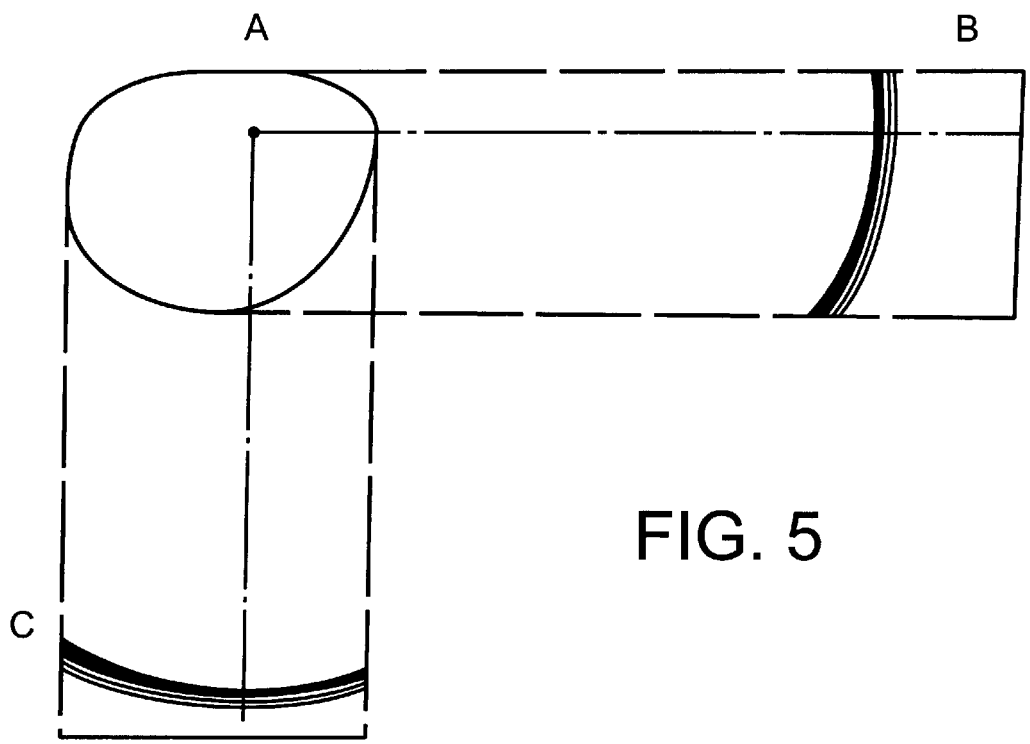
FIG. 5 depicts a typical plano sunglass lens and complimentary lens element.

FIG. 5 depicts a typical plano sunglass lens, approximately to scale. A is the front view of the lens before the right eye of the wearer, the marked spot on the lens being the typical position of the wearer's pupil behind the sunglass lens. B is a vertical section at the visual axis and C is a horizontal section at the visual axis. The front lens is plano of 6 Dioptre curve and its optical axis is coincident with the visual axis of the wearer. The complementary lens element behind the plano is a lens of rear element or back wafer form with front curve equal to 6 Dioptres for all refractive powers. The example is a lens with plus Rx power of 2 D (Dioptres).

FIG. 6

Figure 6:
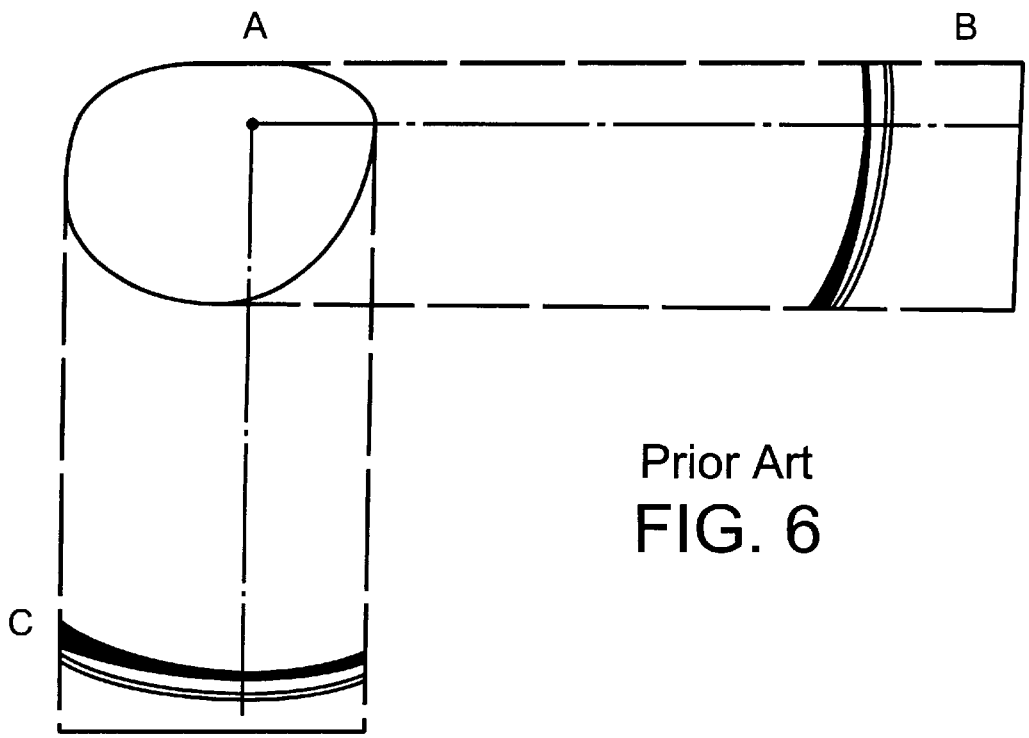
FIGS. 6, & 7 depict configurations similar to FIG. 5, but using typical stock Rx lenses.

FIG. 6 depicts a configuration similar to FIG. 5 where the complementary lens element is a typical stock Rx lens used in the industry, the front curve varying according to the Rx of the lens chosen. The example is a −2 D lens with front curve of 5 D.

FIG. 7

Figure 7:
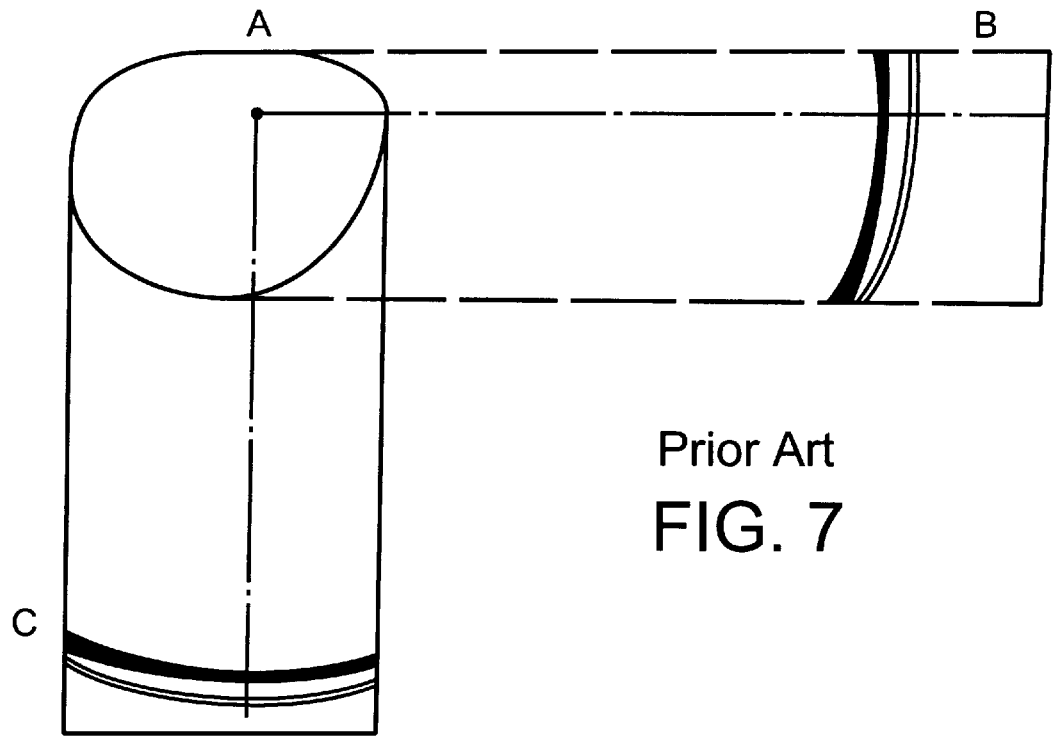

FIG. 7 depicts a configuration similar to FIG. 5 where the complementary lens element is a typical stock Rx lens used in the industry, the front curve varying according to the Rx of the lens chosen. The example is a −2 D lens with a front curve of 4 D.

EXAMPLE 3

FIG. 8

Figure 8:
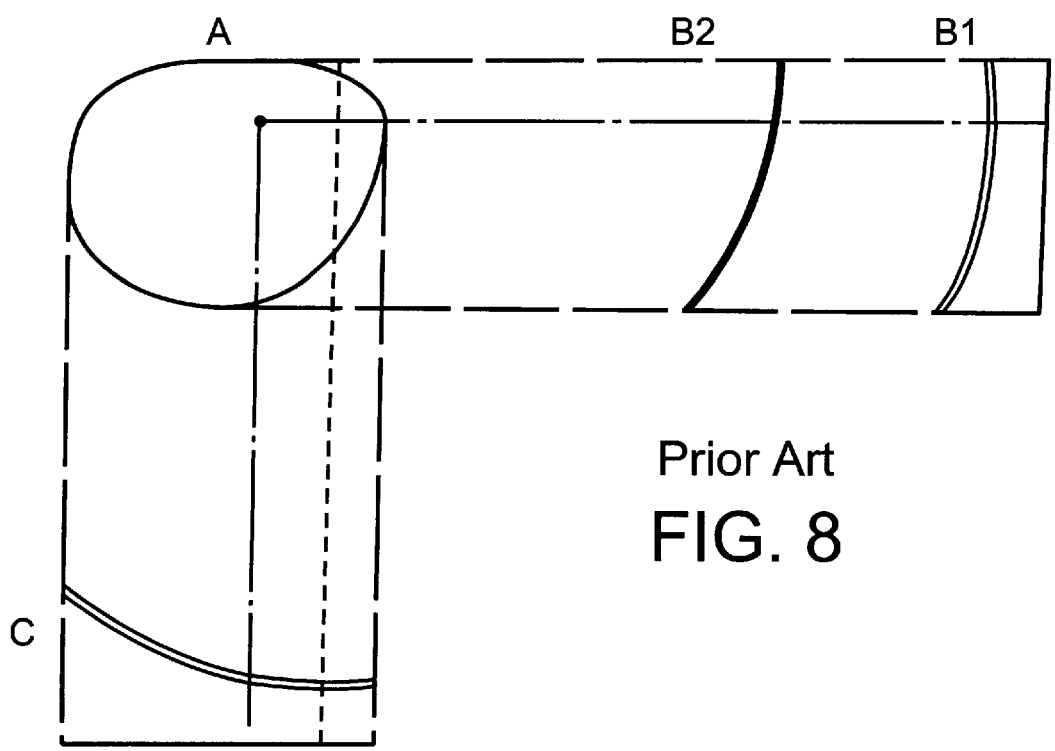
FIGS. 8 & 9 illustrate certain geometric aspects of the prior art.

FIG. 8 depicts a typical plano sunglass lens, approximately to scale. A is the front view of the lens before the right eye of the wearer, the marked spot on the lens being the typical position of the wearer's pupil behind the sunglass lens B1 and B2 are vertical sections at the visual axis and C is a horizontal section a the visual axis. The lens is plano of 6 Dioptre curve. The geometric axis of the lens is coincident with the visual axis of the wearer in the section B1, but not in B2 or in the horizontal section C. In these, the visual axis is displaced (upwards for B2 and inwards for C) in order to increase the proximity of the lens curve to the shape of the wearer's face.

FIG. 9

Figure 9:
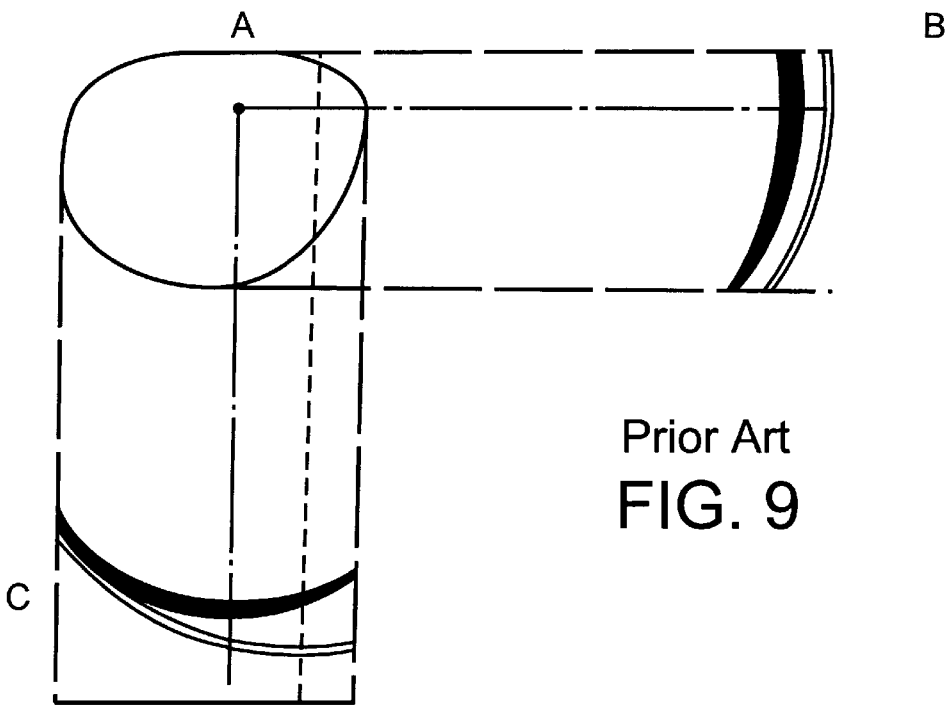

FIG. 9 depicts a spherical design stock lens with plus Rx of +2 D placed behind the lens B1 of FIG. 8. In order to reach across the full aperture of the plano lens and also fit closely against the rear surface of the plano lens at the temple side, the Rx lens must have high front surface curvature (approximately 9 D). This creates displacement of the front vertex of the Rx lens from the rear vertex of the plano lens and also a significant physical return of the nasal limit of the lens towards the wearer's face, as seen in sections B and C.

FIG. 10

Figure 10:
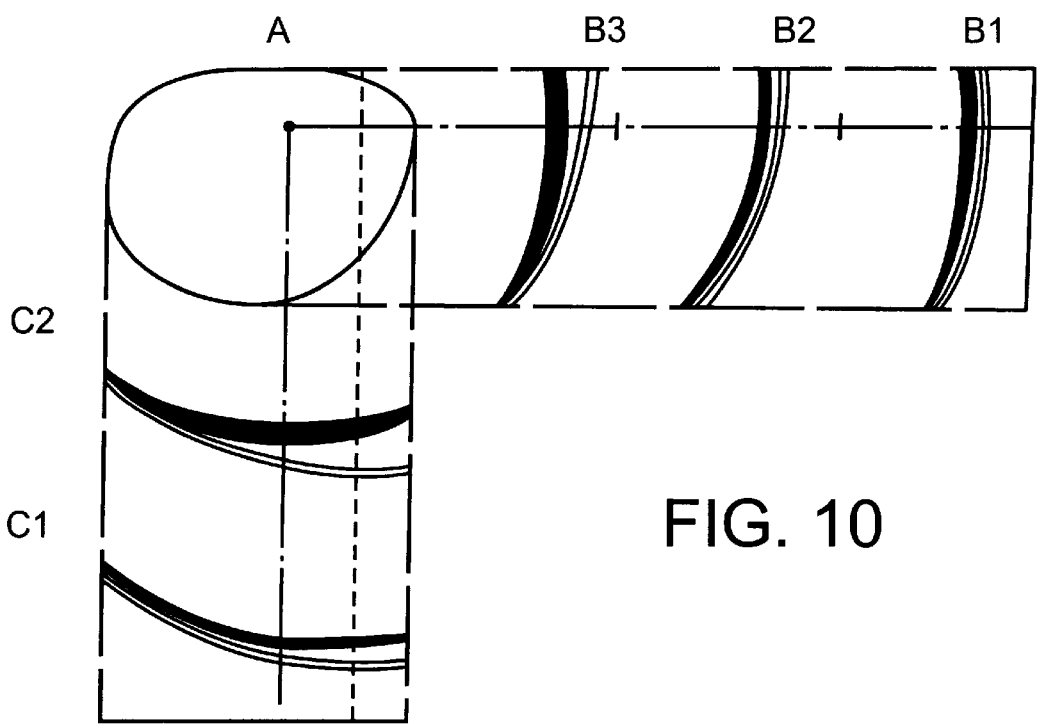
FIGS. 10, 11 & 12 depict alternative complementary lens elements.

In FIG. 10, sections B3 and C2 depict an alternative +2 D Rx complementary lens element to that in FIG. 9. Using spherical curves again results in substantial misfit between the front plano lens. It is desired that the secondary lens conform closely with the rear surface of the plano across the full area of the front lens. A lens of the section C1 is designed with a central region of low curvature flanked by regions of relatively high curvature whilst providing constant refractive power throughout so that the abutting surfaces match closely and there is minimal displacement of vertex and nasal positions of the lens surfaces. For a sunglass of the configuration B1, the back lens element or back wafer may have simple spherical curves orthogonal to the horizontal section C1. For configuration B2 where the geometric axis is located above the visual axis, the orthogonal curves to complete the back lens element must be of similar compound (non-spherical) construction to the horizontal section.

FIG. 11

Figure 11:
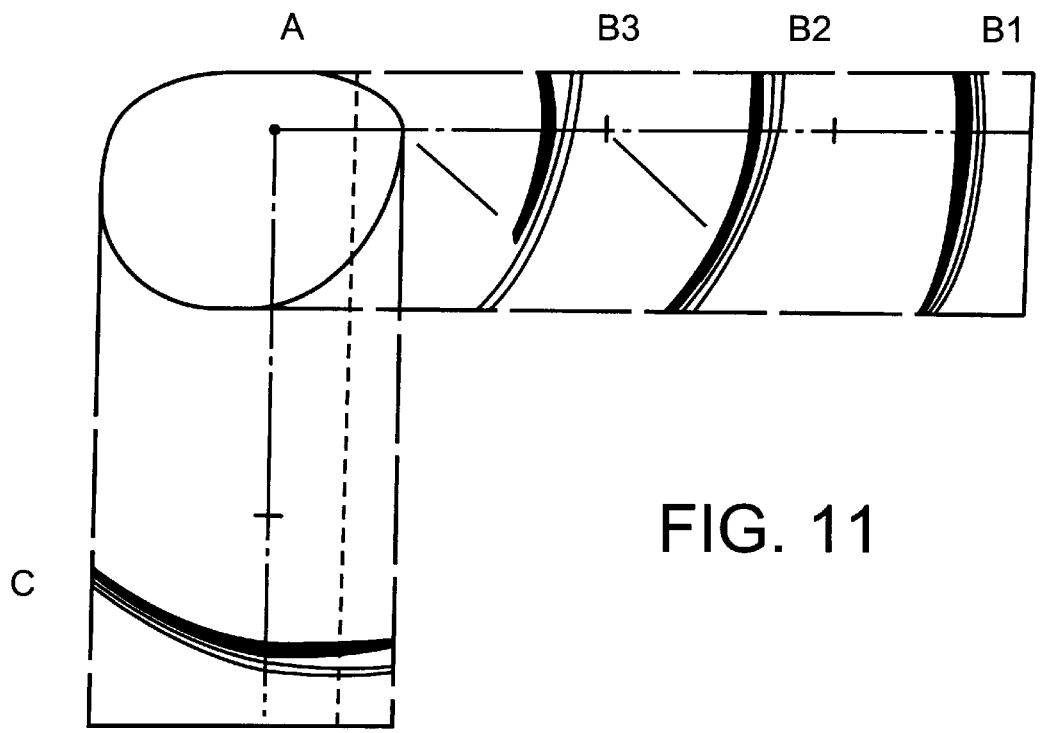

The lenses B1 and B2 of FIG. 11 depict a further alternative approach to using spherical lens curves to fit a complementary lens element behind a plano lens curving downwards from the brow (B2 and B3). The spherical element of plus Rx+2 D has a front curve of approximately 10 D and reaches downward to provide correction to 40° downward vision. This has a physical disadvantage of creating a lens boundary which crosses the aperture of the plano sunglass lens, making the lens edge visible to wearer and to others, and also creating an unsupported lens boundary proximal the cheeks. As the downward vision limit for human vision is approximately 40°, the design is otherwise acceptable. Accordingly, the compound (non-spherical) lens of B2 may be made plano at greater angles of down gaze without visual loss while preserving the target of maintaining a complementary lens configuration which reaches across the full aperture of the plano lens of the sunglasses.

FIG. 12

Figure 12:
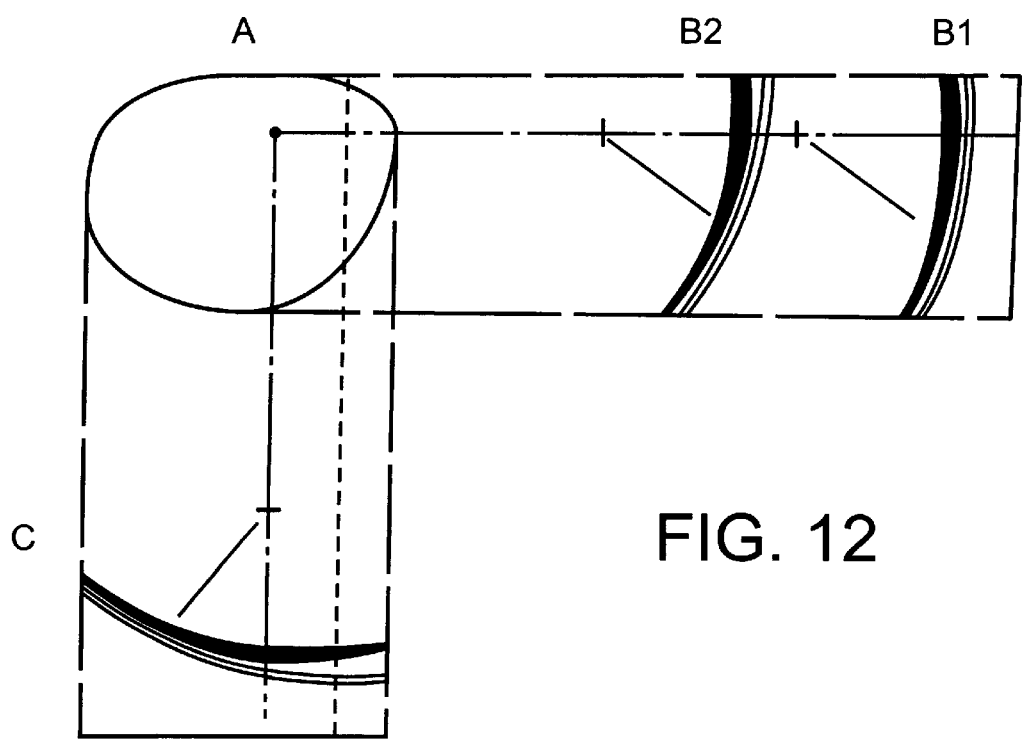

FIG. 12 depicts complementary lens elements of +4 D Rx power fitting both vertical configurations for the plano lens (B1 and B2). In both cases, the design of the vertical lens curves includes an integral plano extension of the Rx lens for down gaze greater than 40°. Similarly, the horizontal design has plano extension beyond 40° towards the temples. The field of Rx correction given by these lenses is typical of modern dress eye wear. The wrap around effect of the sunglasses, to which the complementary lenses conform, provides protection from light, wind, dust and other possible intrusions near the temples.

EXAMPLE 4

FIG. 13

Figure 13:
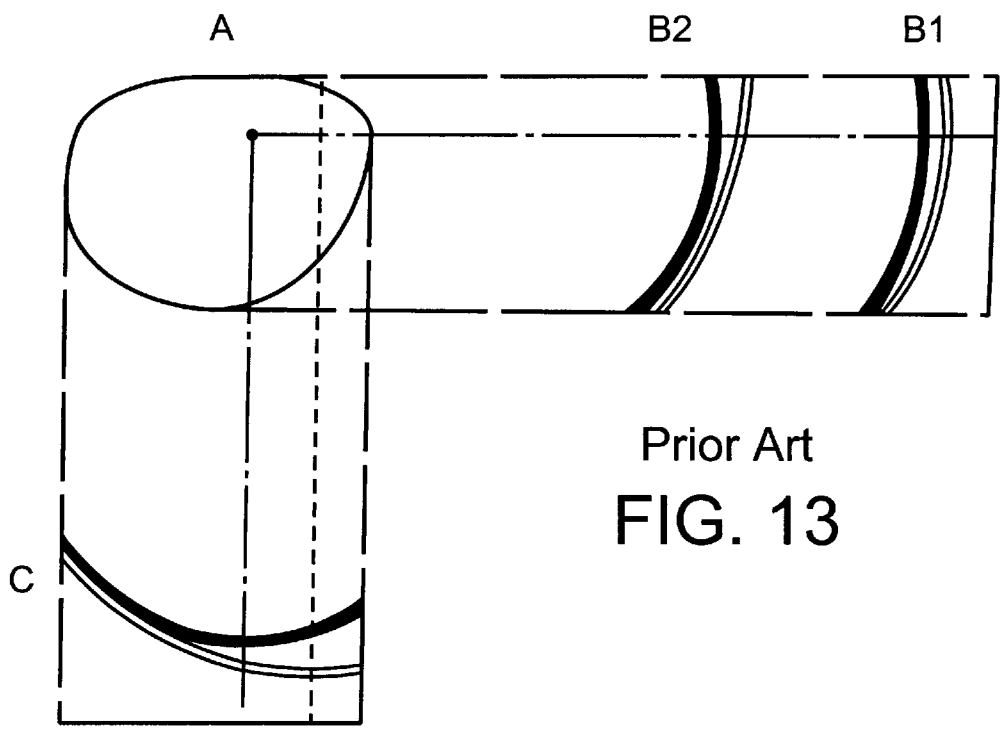
FIG. 13 depicts a spherical design stock lens placed behind the plano lens as in FIG. 9.

FIG. 13 depicts a spherical design stock lens with Rx of −2 D placed behind the plano lens as in FIG. 9. In order to reach across the full aperture of the plano lens and also fit closely against the rear surface of the plano lens at the temple side, the Rx lens must have high front surface curvature (approximately 11 D). This creates displacement of the front vertex of the Rx lens from the rear vertex of the plano lens and also a significant physical return of the nasal limit of the lens towards the wearer's face, as seen in sections B1 and B2.

FIG. 14

Figure 14:
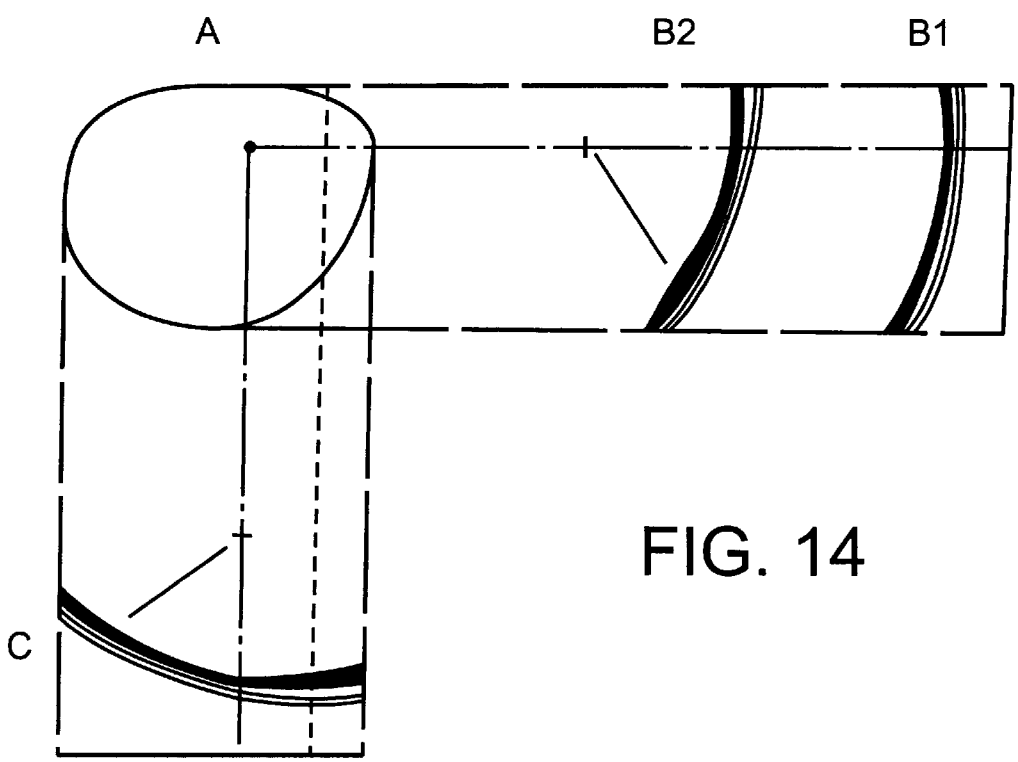
FIG. 14 depicts complementary lens elements both vertical configurations for a plano lens.

FIG. 14 depicts complementary lens elements of −2 D Rx power fitting both vertical configurations for the plano lens (B1 and B2). In both cases, the design of the vertical lens curves includes an integral plano extension of the Rx lens for down gaze greater than 50°. Similarly, the horizontal design has plano extension beyond 50° towards the temples. The field of Rx correction given by these lenses is typical of modern dress eye wear. The wrap around effect of the sunglasses, to which the secondary lenses conform, provides protection from light, wind, dust and other possible intrusions near the temples.

EXAMPLE 5

FIG. 15

Figure 15:
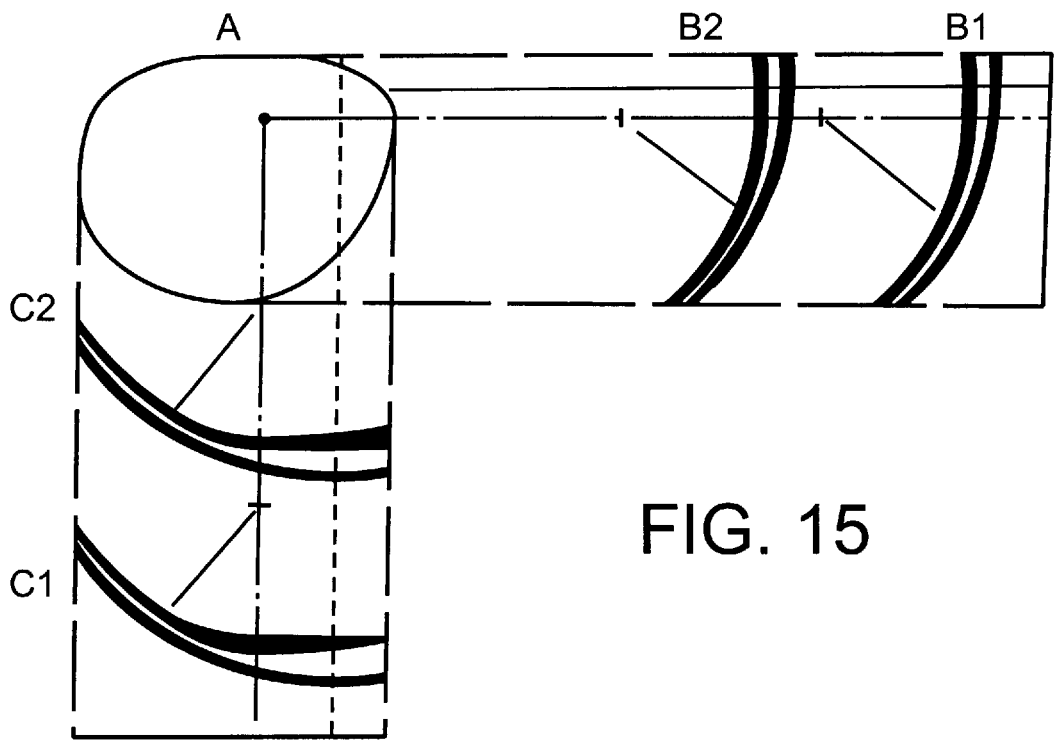
FIG. 15 depicts complementary lens elements placed behind plano sunglass lenses.

FIG. 15 depicts complementary lens elements of +/−2 D Rx power placed behind plano sunglass lenses of 8 D curve. The higher curvatures dictate the use of non-spherical, compound curve lenses with integral plano extension.

EXAMPLE 6

FIG. 16

Figure 16:
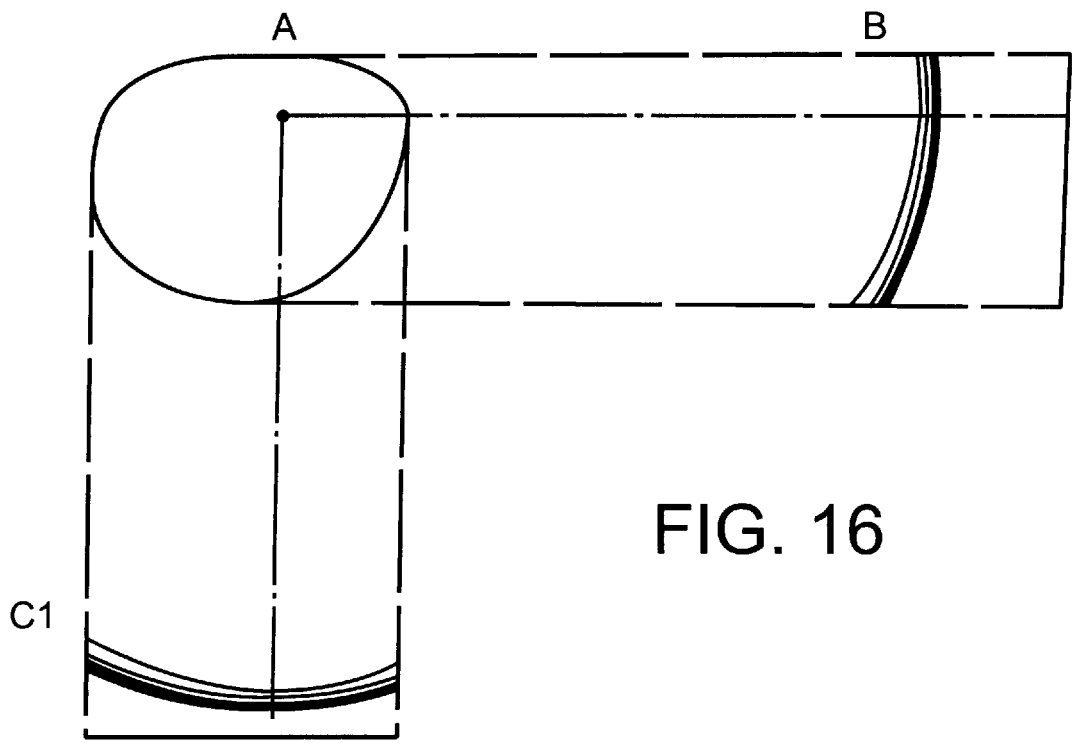
FIG. 16 depicts a complementary lens element placed in front of a prescription lens in a pair of dress spectacles.

FIG. 16 depicts a complementary lens element placed in front of a prescription lens in a pair of dress spectacles of nominally 6 D front curve. Such lenses may be tinted in plano form to give sunglass comfort or they may be mild negative Rx lenses, for example −0.25 to −0.50 D, to assist accurate distance vision for sport or for night driving. In this latter case, the lenses may be tinted for special lighting requirements. Alternatively, they may be clear lenses.

Plano lenses may be fitted with minimal care to alignment of the optical axis provided the lens curves are not 8 D or higher. The minus prescription lenses should be fitted accurately for alignment of their optical axis parallel to the visual axis of the wearer, but may be offset if required by the frame design.

EXAMPLE 6

FIG. 17

Figure 17:
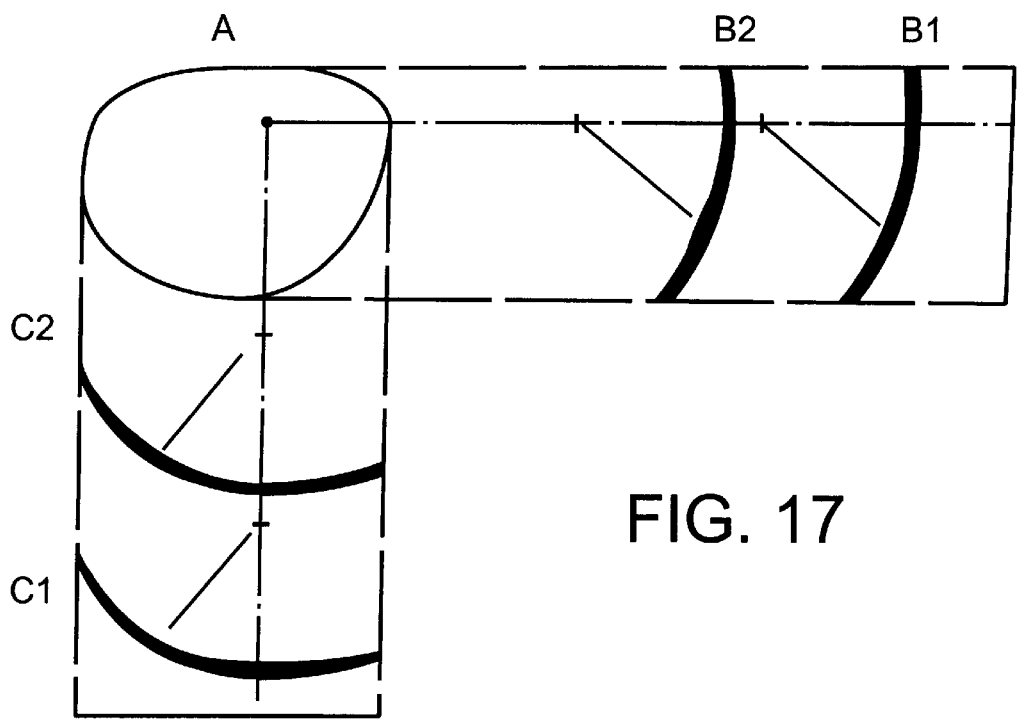
FIG. 17 depicts prescription wrap around lenses having compound (non-spherical) curves.

FIG. 17 depicts prescription wrap around lenses or +/−2 D Rx having compound (non-spherical) curves, in both cases, the design of the vertical lens curves includes an integral plano extension of the Rx lens for down gaze greater than 40°. Similarly, the horizontal design has plano extension beyond 40° towards the temples. The field of Rx correction given by these lenses is typical of modern dress eye wear but they provide in addition the wrap around effect typical of sunglasses protecting the wearer from various intrusions near the temples. The nominal curve in the horizontal section is 12 D, existing primarily in the plano temporal extension. The Rx part of the lens has curves of 6 D or less in the nasal regions horizontally and 8 D or less vertically.

These curves are familiar in the industry and are amenable to normal standards and accuracy in fitting spectacles frames to the wearer's face (for pupillary distance and correct height). Higher curves introduce increasing difficulty in fitting. The horizontal curvature from forward vision toward the temporal limit is in the range 14 to 18 D or so, presenting the need to ensure that the horizontal position of these Rx lenses can be set and maintained accurately. For lenses mounted within a typical spectacle frame, the required accuracy can be achieved without undue effort provided each pupil location is measured with respect to the position that the nose pad of the spectacle frame adopts on the wearer's face. Although normally assumed to be symmetric, the location of the pupils versus the nasal bridge is rarely so.

FIG. 18

Figure 18:
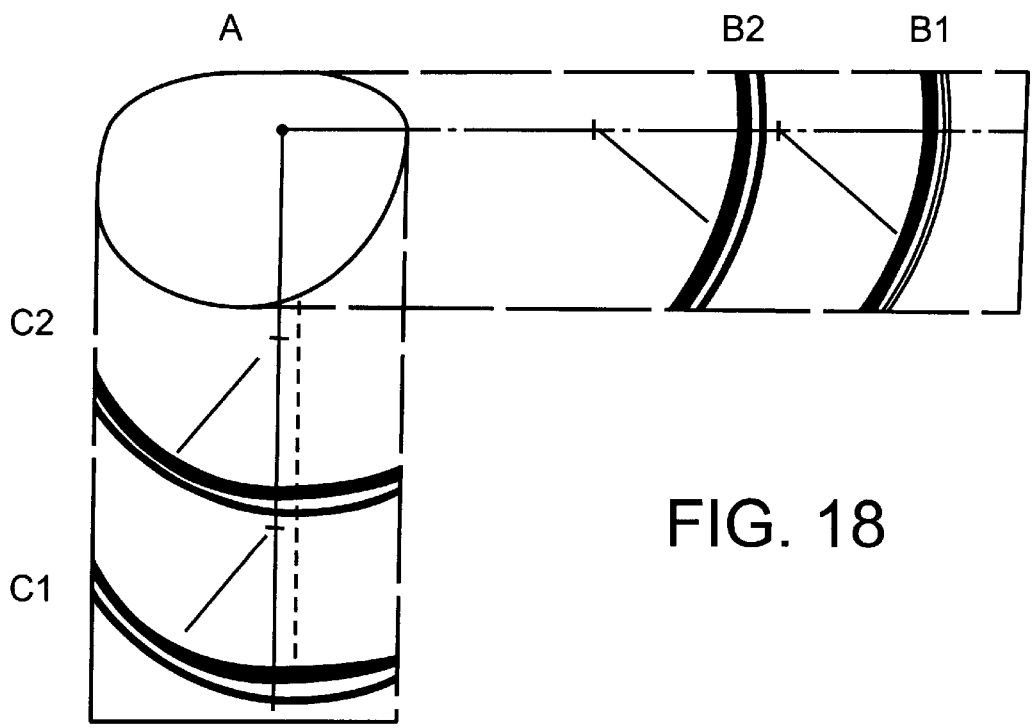
FIG. 18 depicts complementary lens elements which are plano sunglass lenses positioned in front of the wrap around Rx lenses of FIG. 17.

FIG. 18 depicts complementary lens elements which are plano sunglass lenses positioned in front of the wrap around Rx lenses of FIG. 17. The plano lenses have nominal curves of 10 D horizontally and 8 D vertically. The geometric and optical axes of the planos are coincident vertically. They are parallel but displaced (by approximately 5 mm) horizontally. The design may provide prism or adjust the optical axis of the plano horizontally to ensure correct alignment. However, the degree of axis alignment error is similar to the variation in pupil size so the optical error introduced by the planos should be minimal.

FIG. 19

Figure 19:
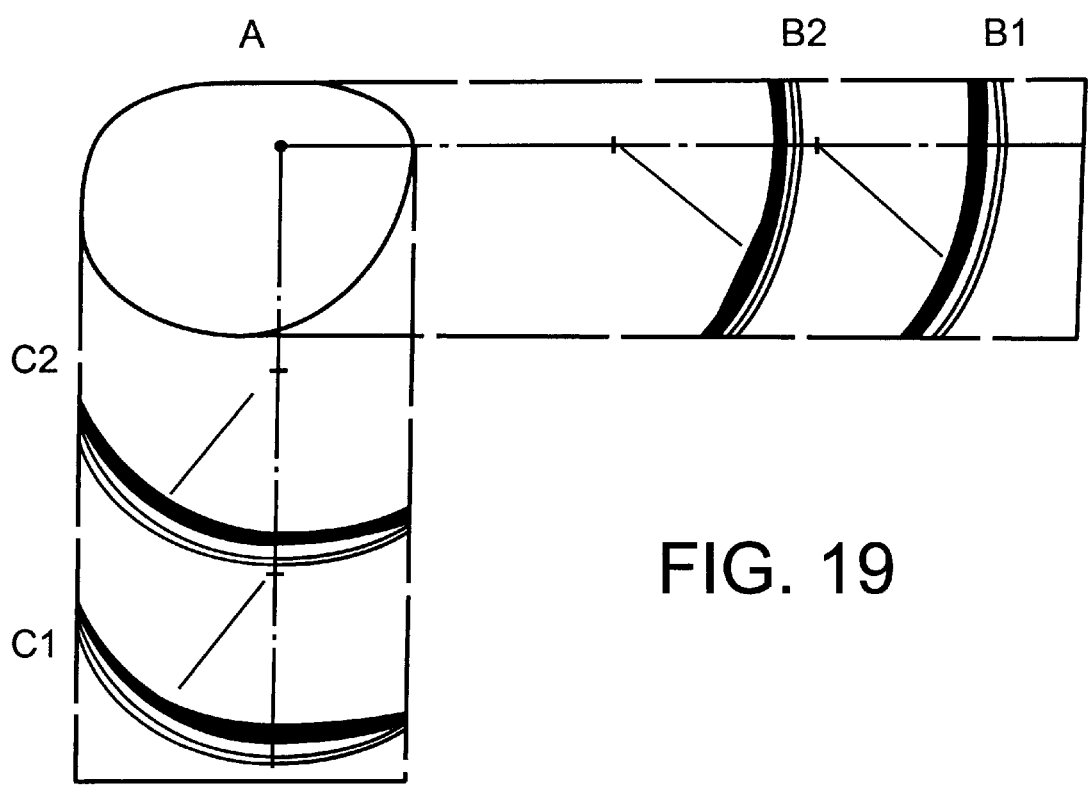
FIG. 19 depicts the Rx lenses of FIG. 17 with complementary lens elements of mild negative power.

FIG. 19 depicts the Rx lenses of FIG. 17 with complementary lens elements of mild negative power, i.e. of the order of −0.25 to −0.50 D positioned in front of the Rx lenses. Such lenses may be used as a visual aid at night, correcting the condition known as night myopia. Alternatively, they are applicable for accurate correction of far distance vision in the day time, since prescribing practise actually corrects vision at closer distances, thereby giving the patient excessive plus power in their Rx lenses. It is essential that these lenses be aligned correctly with respect to the visual axis of the wearer. This requires a discernible change of both radius and center of curvature at the limit of the temporal visual field (C1 and C2) in order that lenses will fit a full range of Rx's and extend across the full aperture of the Rx lenses behind. The lens designs provide close proximity of Rx and complementary lenses at nasal and temporal limits of both lens sets.

EXAMPLE 8

FIG. 20

Figure 20:
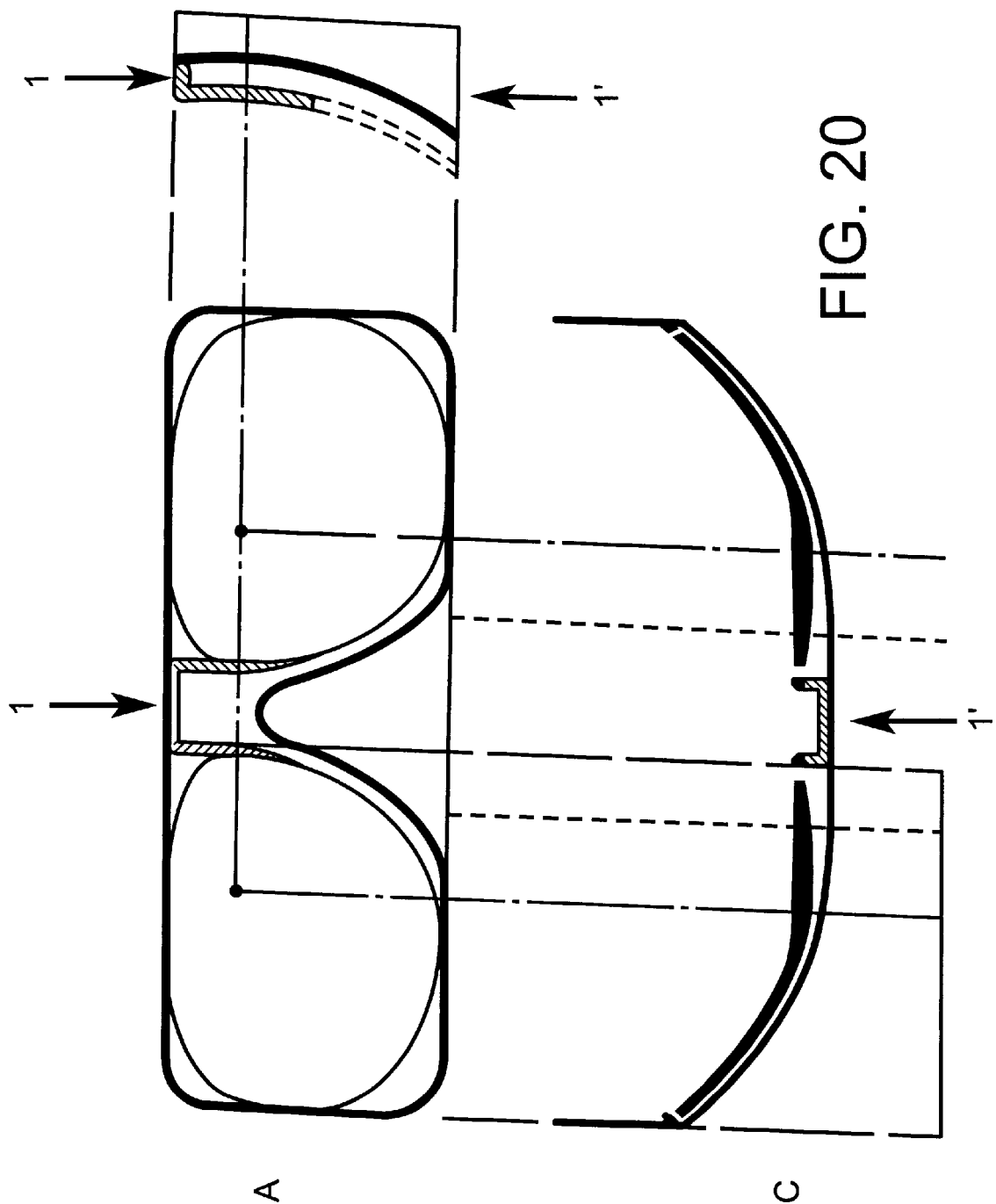
FIG. 20 depicts a wrap around visor and a pair of glazed Rx lenses.

FIG. 20 depicts a wrap around visor of shape common in the non-prescription sunglass industry. The outline of this visor covers the outline of a pair of glazed lenses of conventional frontal shape (A). Conveniently, the nasal pad supporting the whole assembly is attached to the front visor, the Rx lenses to be mounted behind the visor are glazed into an appropriate lightweight holder or frame of the metal wire type or the rimless type. This holder or frame does not have a nose pad and the frame generally fills the outline of the visor and provides substantial clearance around the nose of the wearer.

Also conveniently, the frame into which the complementary Rx lens elements are mounted is reasonably stiff (per normal lightweight eyewear standards) for bending in the vertical plane but at the same time flexible for bending horizontally [Metal wire and rim-less styles achieve both of these objectives]. Such designs normally incorporate a relatively stiff member to cross the nasal bridge. An example of such is given in FIG. 20. The nasal bridge is provided by a stout wire stirrup which rises vertically from the structure encompassing each individual lens. Also common to design styles, this stirrup may be bent forward, away from the nose, toward the brow bar or other upper construction of the visor assembly across the nasal bridge.

FIG. 20 shows in section C a pair of glazed Rx lenses in such a frame placed immediately behind a visor. The two assemblies match closely at the temporal limit, both vertically and along the temporal reaches of the lower edge of the visor. They are separated by a designed and predictable spacing at the brows above the nasal bridge (1–1') in the figure. If the two assemblies are attached vertically at the temporal limits, the remaining connection required to create a stable assembly is to connect the brow of the visor with the wire stirrup of the secondary lens frame.

FIG. 21

Figure 21:
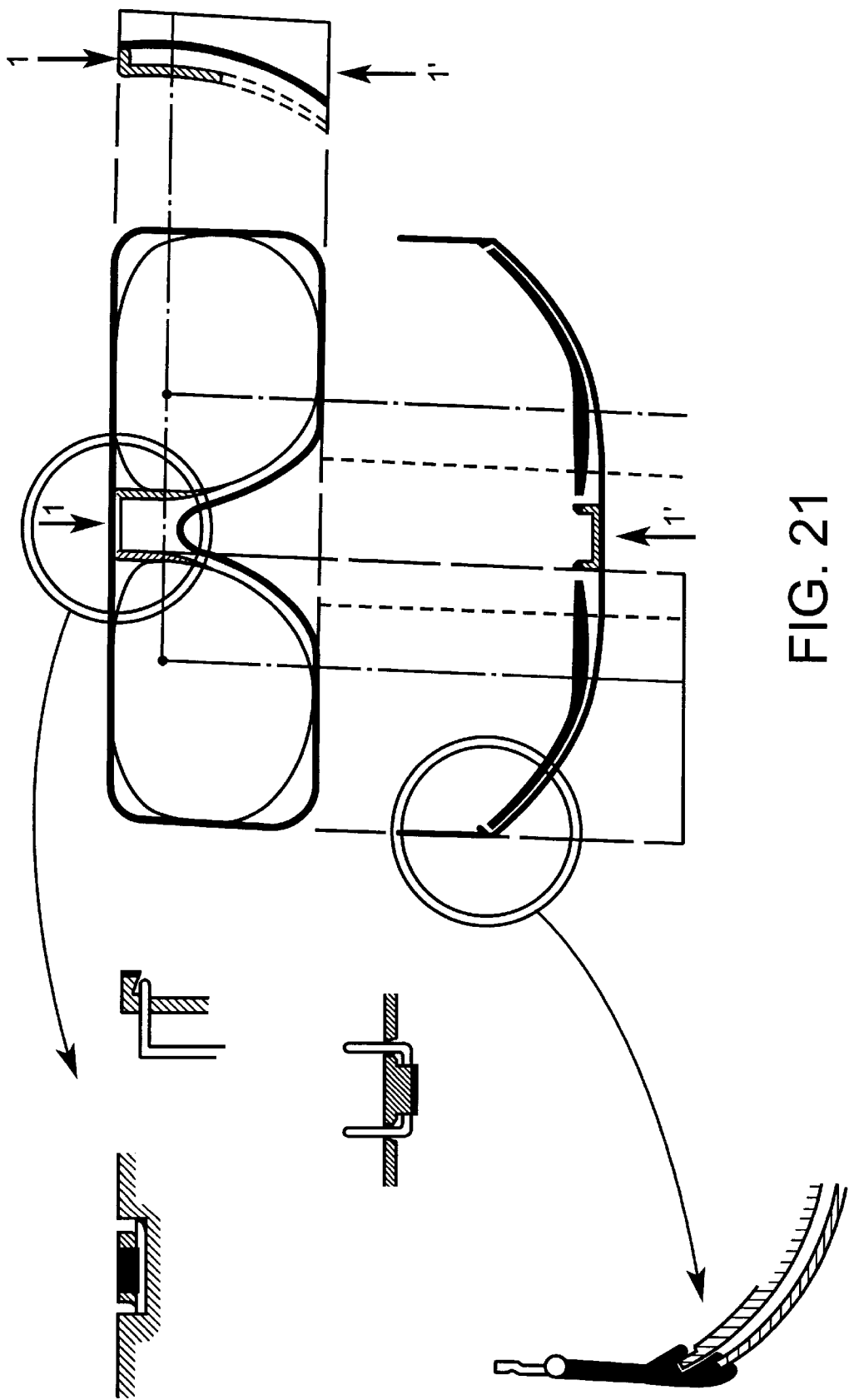
FIG. 21 depicts a product configuration where the Rx lenses are permanently attached in a suitable spectacle type frame and there is attached a visor in front of this.

FIG. 21 shows detailed design principles at the nasal bridge and at the temporal limits of a spectacle assembly.

Attachment of complementary lens assemblies can be achieved by a variety of lug or clip systems visible from in front of the spectacle assembly. This is not desired in the context of the current invention. Thus, the supporting connections for the Rx frame should be behind the front lens or visor as far as is feasible. An example of a satisfactory design is to provide in the vertical limiting edge of the visor or sunglass frame at its temples two locations to retain lenses. Ahead of the temporal hinge there is provided a pair of lens or frame retaining slots. The front retaining slot retains the visor or, if the sunglass is constructed of a pair of plano lenses in a designer frame, the front slot retains the plano lens. Behind this, open vertically up and closed below is a second retaining slot which accommodates the temporal extremity of the Rx frame or a shaped protrusion of the individual Rx lenses held within the Rx frame. The Rx lenses are therefore attached to the assembly by first sliding the temporal limits of the Rx frame into these retaining slots.

To make the total assembly stable, there is preferably at least one other connection between the two members so the vertical movement is prevented and the overall assembly can withstand unexpected shocks. A means of connecting the two assemblies at the nasal bridge is to ensure that the protrusion of the stirrup of the Rx frame contacts the nasal bridge of the visor assembly and attaches via a removable clip. The figure shows one embodiment. The wire stirrup reaches forward to locate in a pair of slots cut in the upper edge of the visor brow. These slots allow the stirrup to be pressed downward so that (with compression of the Rx frame and visor horizontally), the stirrup passes a protruding lug. This lug extends in front of the visor brow by at least the diameter of the stirrup beneath, so that the stirrup is captive for normal wearing conditions.

EXAMPLE 9

FIG. 21 also depicts a product configuration where the Rx lenses are permanently attached in a suitable spectacle type frame and there is attached a visor in front of this. In the assembly depicted in FIG. 21, the complementary back lens elements are permanently mounted. These lenses may be of the compound curve design type and will give the utility of a wrap around design as Rx lenses. The sunglass attributes provided are in this case by a front visor, which visor shall be removably attached via the front slot of FIG. 21 and will be held in place by the stirrup or like member protruding from the Rx frame at the nasal bridge. In this case, it will be sufficient for the stirrup to reside in a slot within the brow of the visor, a retaining lug is not essential as the assembly gains its physical strength from the complete Rx frame behind. For a product of this type the visor will be chosen according to activity and visual experience.

In FIGS. 20 and 21, the sunglass utility may be provided either by a visor or by glazed sunglass lenses. The parallels of design appropriate to both are included without repeat of these design drawings or specific example.

EXAMPLE 10

FIG. 22

Glazed wrap around sunglasses are desired in a range of plus and minus Rx powers with the least number of frame inventory items for a given style. The front curve of all Rx's is preferably chosen to be common to most Rx's but may vary for extreme scripts.

Figure 22:
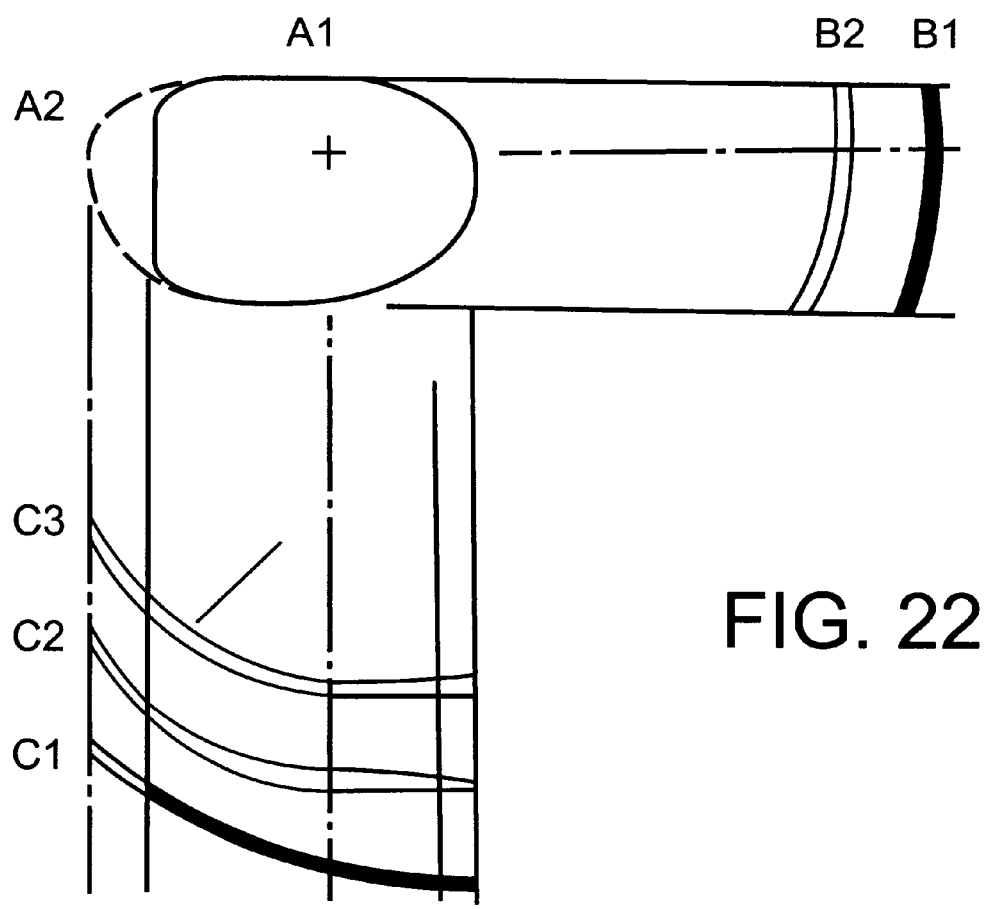
FIG. 22 depicts wrap around sunglasses.

In FIG. 22 there is depicted plan and elevation views of two popular brands of wrap around sunglasses (A1 and A2), both of which give effective protection of temporal vision to a wearer. These are sold with plano lenses and are regarded as not amenable to fitting with Rx lenses. The plano lenses are simple spheres of 6 D base curve (B1 and C1). However, lenses designed according to this invention and Australian Provisional Patent Applications PN 8806 and PN 9007 to applicants, the entire disclosure of which are incorporated herein by reference, do provide the option of fitting such Rx lenses in the power range −4 D to +4 D at least.

A minus Rx of −2 D is shown as section C3 in FIG. 22. This has front curve of 12.5 D from the temporal limit to the forward optical axis. The back curve in this range is 14.5 D, except for an integral temporal extension limiting the edge thickness of the lens and which commences 50° from the forward optical axis. To the nasal side, this lens has a flat front curve of 0 to 0.50 base or thereabouts and a back curve 2 D steeper.

This configuration is shown for the minus Rx lenses in FIGS. 14, 15 and 17 and it provides the specific benefit of minimising the physical return of the lens curve between the front vertex at the optical axis and the nasal limit. The temporal reach of the lens is therefore increased without exaggerating lens curvature to the temporal side.

A plus Rx lens of +2 D is shown as section C2 in FIG. 22. The front curve is 12.5 D and the rear curve 10.5 D from optical axis to temporal limit. To the nasal side of the optical axis, the front curve is 0 or 0.50 D so that the front surface of the plus Rx lens is identical to that of the minus Rx lens. Both will glaze properly in frames if the orthogonal (vertical) front curve is approximately 9 D (section B2).

For such a front surface selection in a plus Rx lens form, the back surface curve from optical axis to nasal limit should be negative. That is, the center of curvature is to the front of the lens, rather than being located on the eye side. These curves need to be corrected to account for the changed location of the effective back vertex, but the design is otherwise parallel to lenses of conventional form except that the physical shape is bi-convex at the nasal region of the lens. In this case, the temporal reach of the plus lenses equates that of minus lenses as they have common front surface geometry. Moreover, the present invention results in a front surface geometry that can be selected as independent of the chosen Rx power.

As elaborated above, the constant front surface shape facilitates the use of clip-on complementary lenses for supplementary Rx adjustment (such as multi-focal or progressive power addition) or the provision of polarising or mirror effects for high glare or intense light applications.

Comparative designs for such plus lenses using compound curves which are given in FIGS. 10, 11, 12, 15 and 17 assume that both curves of the plus lens should be positive on its nasal side. Specifically, the flattest designs then have a back surface curve of about 0 to 0.50 D and there is noticeable difference between front vertex distance and the front nasal limit for all Rx powers other than plano. This distance varies with the Rx power.

EXAMPLE 11

FIG. 23

Figure 23:
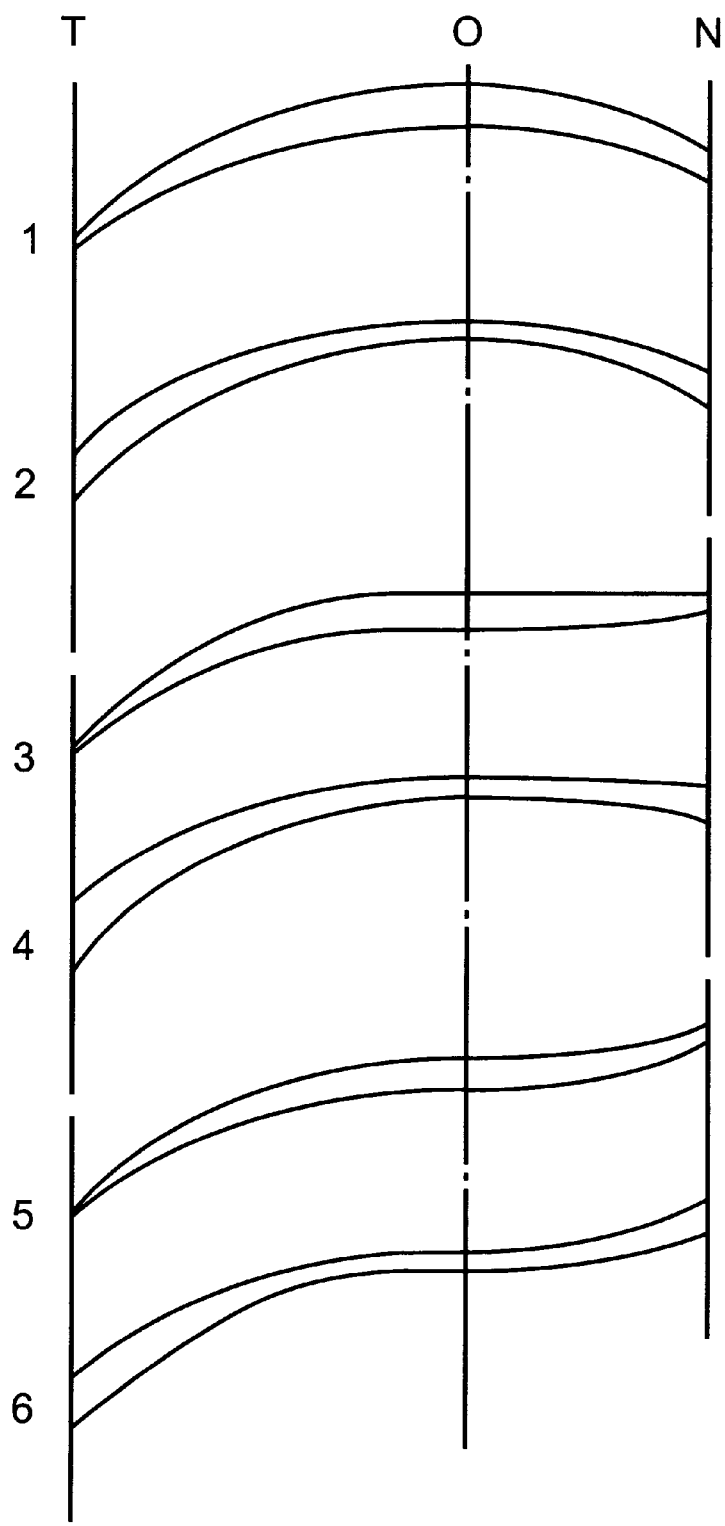
FIG. 23 illustrates lenses which may be included in products accentuating facial form at the nose as well as temples.

Lenses which may be included in frames giving various degrees of wrap toward the temples, the front curves preferably being independent of the Rx to suit either a simple range of sunglass frames or of internal frames to be attached to a visor assembly. (FIG. 23 lenses 3 and 4). Such visor assembly may be a simple shield or a shield with separate temple pieces.

EXAMPLE 12

FIG. 23 depicts lenses (5 and 6) which may be included in products accentuating facial form at the nose as well as temples, such as glazed lenses or complementary lens elements for shields. Shields may be clear sports shields designed solely to protect the face in ball sports such as basketball, where the activity precludes heavy helmets and the like used for example for American football. Alternatively they may provide UV protection, guarding against skin cancer as is experienced commonly on individuals noses.

In FIG. 23 there is depicted the horizontal section of Rx lenses whose optical axis O is located closer to the nasal limit N than the temporal limit T. Lenes 1 and 2 are conventional spheres with front and back base curves of 6 D and 8 D to produce Rx lenses of plus and minus 2 D.

Lenses 3 and 4 have the same 6 and 8 D spherical base curves from temple T to optical axis O. Toward the nasal limit, both lenses have flat front curve of approximately 0 D. The plus Rx lens 3 has negative back surface curve to provide the required refractive power. These lenses give maximum temporal reach for lenses of conventional cosmetic appearance whilst also having least curvature of the temporal design. A full Rx range is preferably designed with a constant front surface form. However physical requirements for lens clearance at temporal and nasal limits may dictate that lower design curve power be used for higher minus Rx lens categories.

Lenses 5 and 6 have the same spherical design toward the temples as other lenses in this figure. However, the curves from optical axis O to nasal limit N are negative in each instance.

These last lenses have a distinctive shape and reach forward toward the nasal bridge as well as back to the temples. They may be manufactured with general conic orthogonal curves approximately 6 to 9 D or so and are most obviously useful for creating eyewear which accentuates the contours of the face including the nasal region. This could be for sunwear but also applies to sports visors such as basketball visors where a safety shield fits closely around the face to protect temples, cheeks and the nose. Such visors on the market today are out away to provide visual aperture as high quality Rx optical inserts are lenses of the required conforming shape are not available. The lenses designed on the principle of 5 and 6 in FIG. 23 will satisfy the purpose of such an application. The front curve can be chosen independent of the Rx.

EXAMPLE 13

FIG. 24

Figure 24:
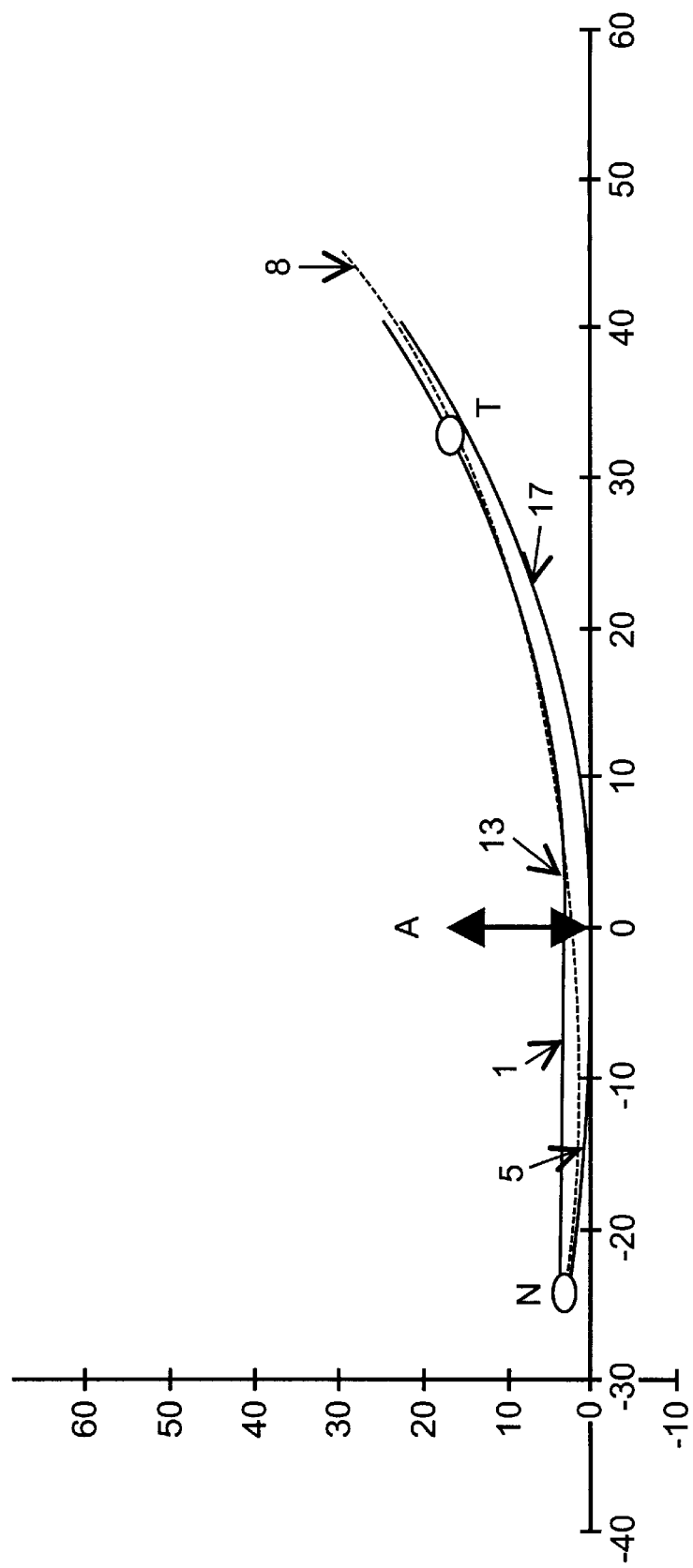
FIG. 24 illustrates the horizontal section of a +4.0 D optical lens according to the present invention.

FIG. 24 illustrates the horizontal section of a +4.0 D optical lens according to the present invention. This lens is similar to those of FIG. 12 and may be used either as an insert lens behind a plano sunglass or may be glazed directly into a frame with nominal design curve of 8 D. In this case, the front curve toward the temple T is 17 D and that toward the nasal limit N is 5 D. There is no plano region and the lens provides the desired Rx correction across its entire aperture.

FIG. 25

Figure 25:
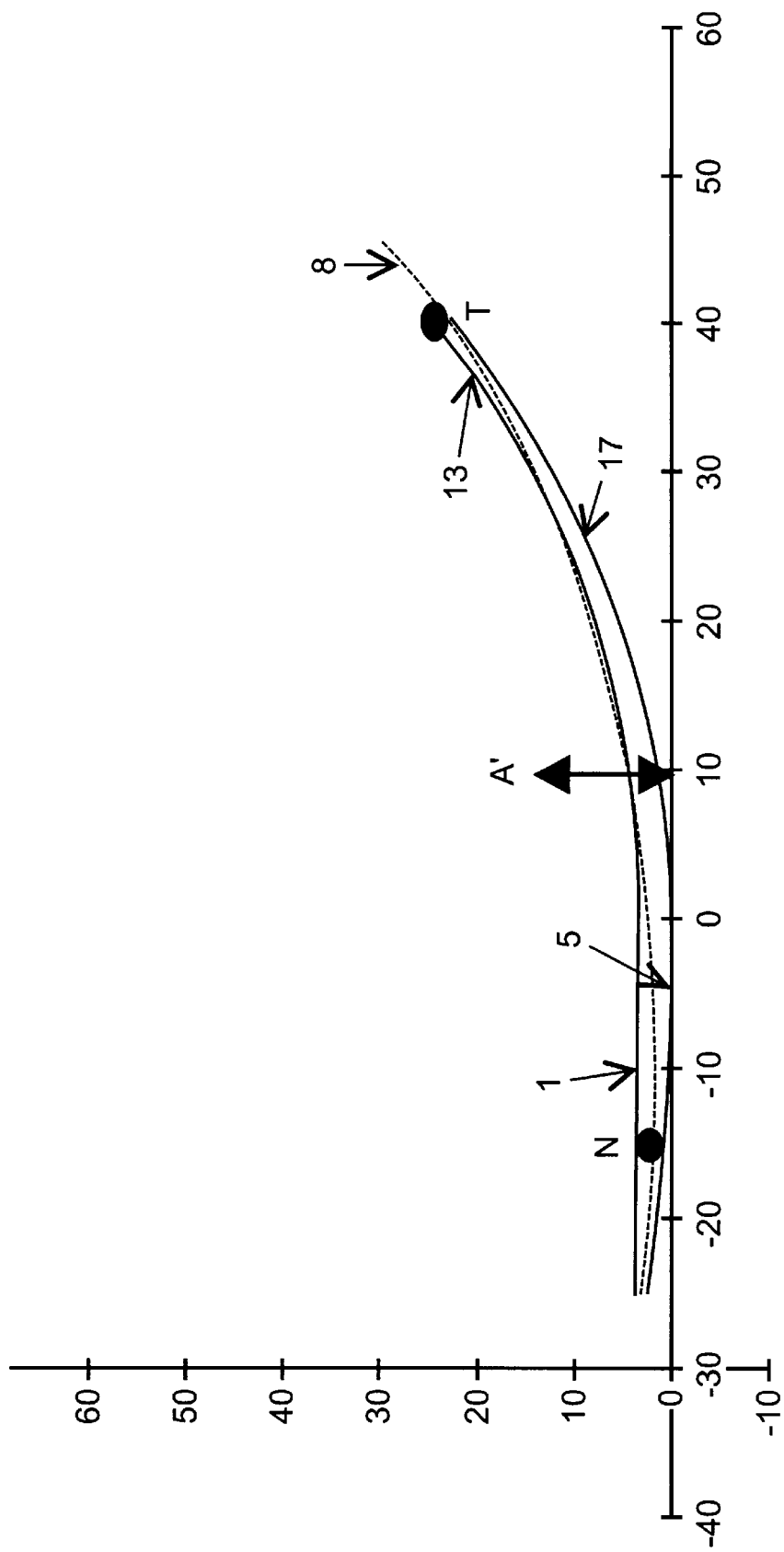
FIG. 25 is a similar view to that illustrated in FIG. 24, but the optical center has been decentered 10 mm relative to the geometric axis.

FIG. 25 is a similar view to that illustrated in FIG. 24, but the optical centre has been decentred 10 mm relative to the geometric axis. This amount of offset is sufficient to fit the lens to frames of the tightest wrap around styling. Optical errors are corrected by design of the front or back surfaces of the lens and there is a complete panoramic field of corrected vision throughout the full aperture of the frames. Furthermore, the inner surface of the lens barely encroaches the space available to eye and lash movement, despite the relatively strong plus Rx being provided.

The vertical curve may be chosen to suit the frame style, but would be in the range 4 D to 8 D for current fashions.

EXAMPLE 14

FIG. 26

Figure 26:
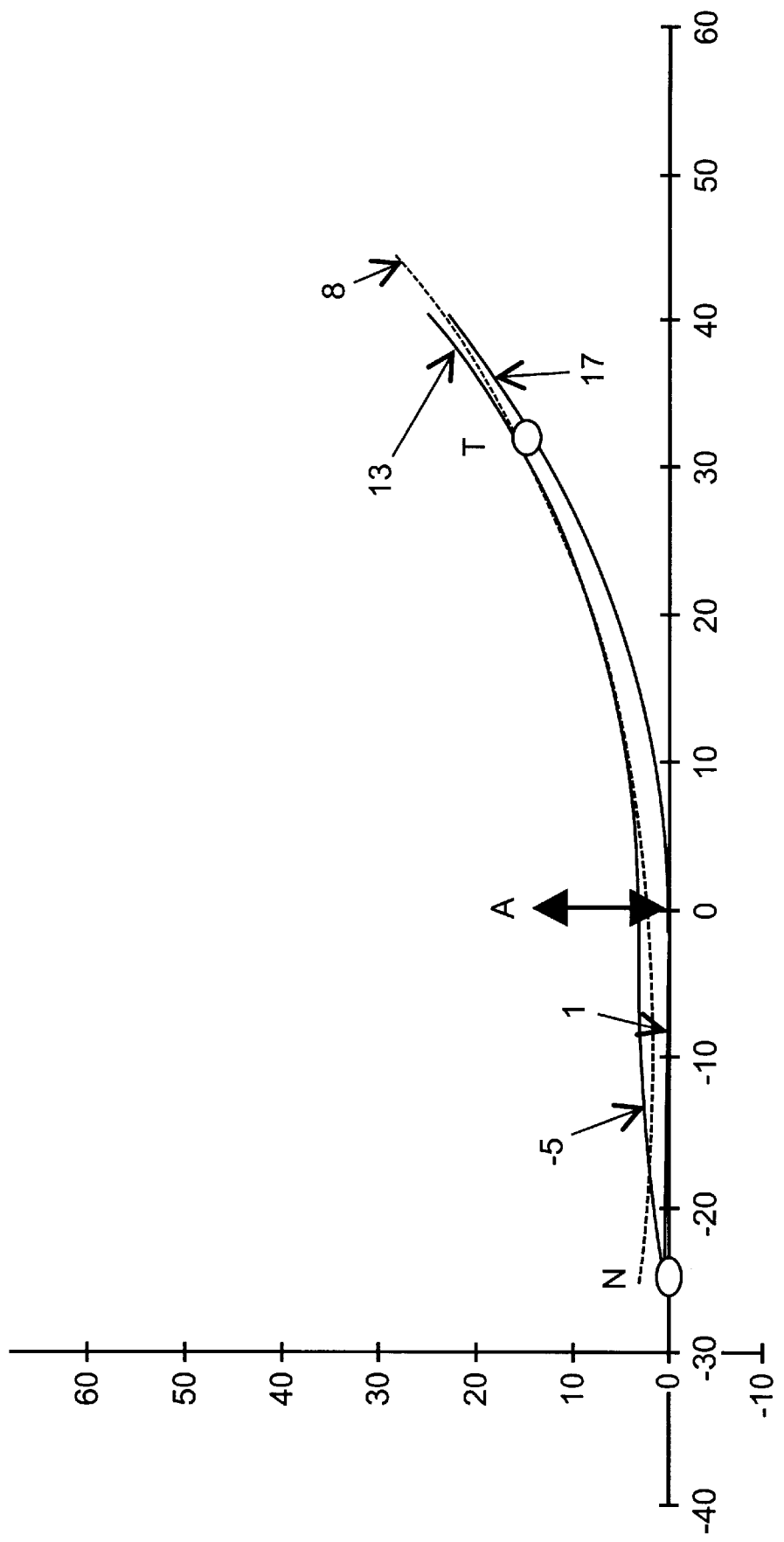
FIGS. 26 & 27 illustrate variations of the optical lens illustrated in FIG. 24.

FIG. 26 illustrates a similar optical lens to that illustrated in FIG. 24 except that the region between the optical centre and the nasal limit is biconvex in order to improve cosmetics, e.g. by accentuating facial forming the nasal region.

FIG. 27

Figure 27:
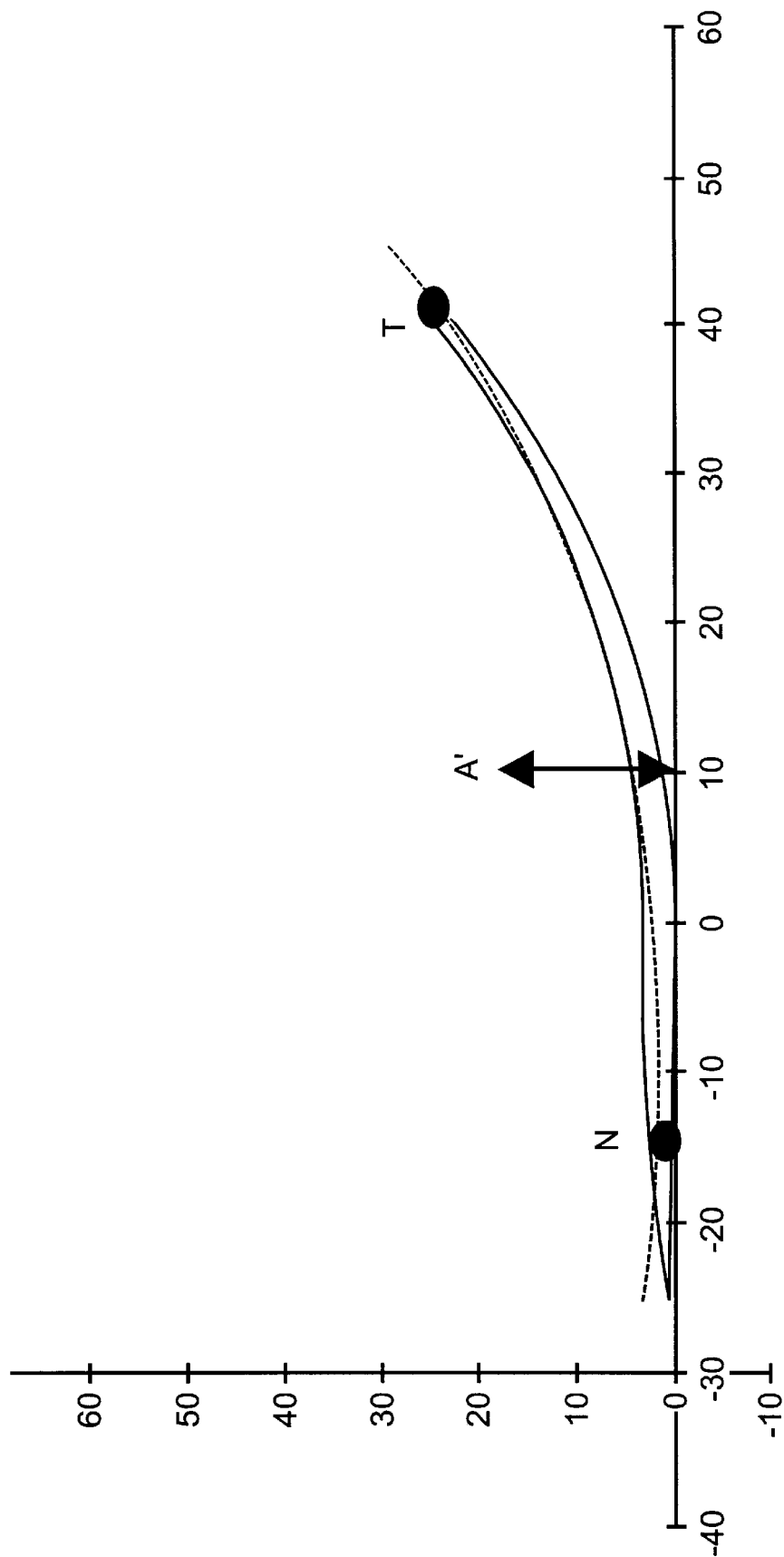

FIG. 27 is a similar view to that illustrated in FIG. 26, but the optical centre has been decentred 10 mm relative to the geometric axis in order to gain a full wrap around the wearer's visual field without diminution of the Rx zone as would occur for example with a plano temporal extension.

EXAMPLE 15

FIG. 28

Figure 28:
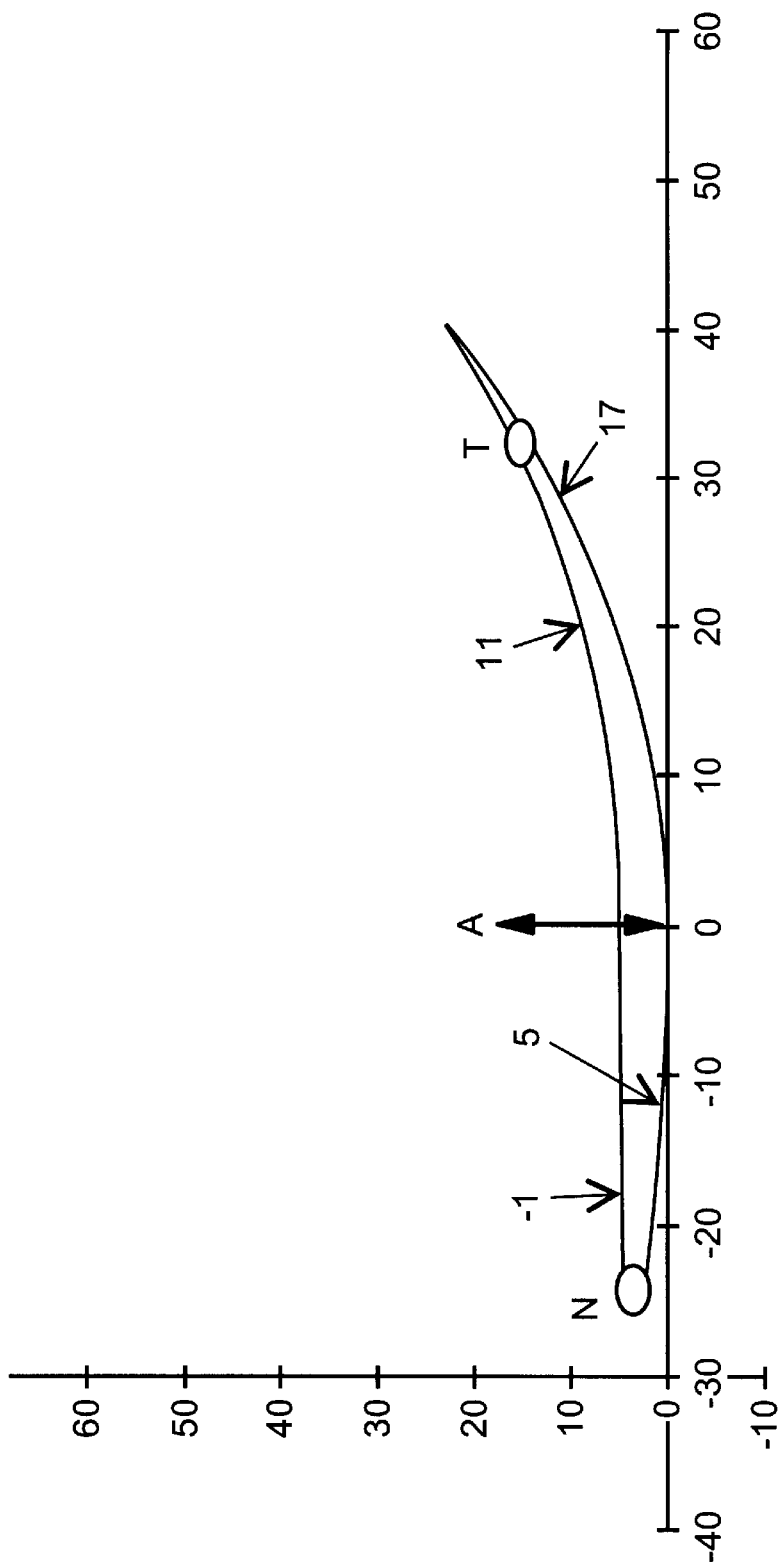
FIG. 28 illustrates a +6.0 D optical lens according to the present invention.

FIG. 28 illustrates a +6.0 D optical lens according to the present invention, but utilising the same front surface curve to that of the +4.0 D optical lenses.

FIG. 29

Figure 29:
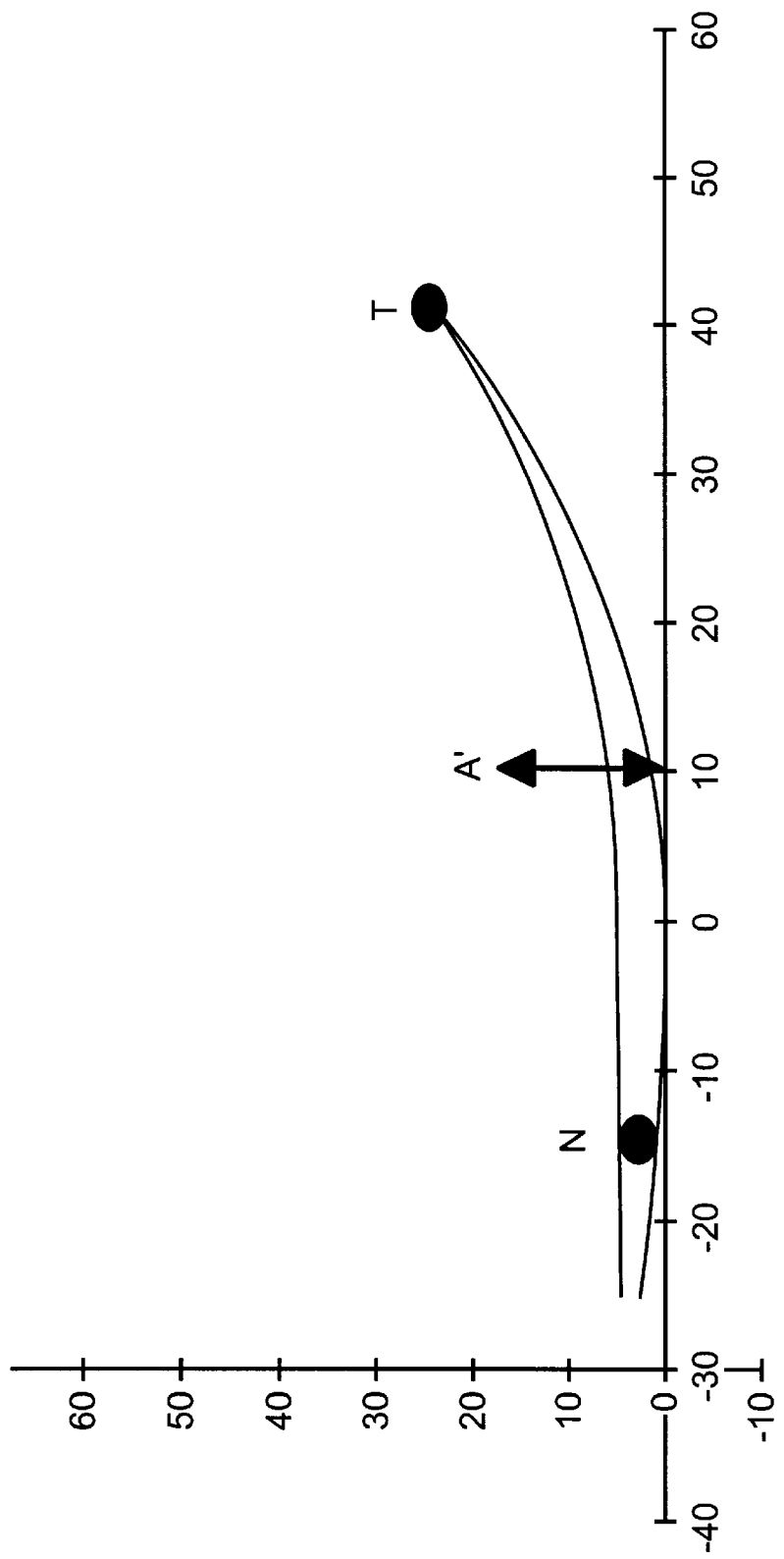
FIG. 29 is a similar view to that illustrated in FIG. 28, but the optical center of the lens has been decentered 10 mm relative to the geometric axis.

FIG. 29 is a similar view to that illustrated in FIG. 28, but the optical centre of the lens has been decentred 10 mm relative to the geometric axis to meet the requirments of the most highly wrapped frames. This lens provides sufficient clearance for unimpeded lash movement despite the high Rx involved. Further clearance may be created by tilting or rotating the lens within the horizontal plane.

EXAMPLE 16

FIG. 30

Figure 30:
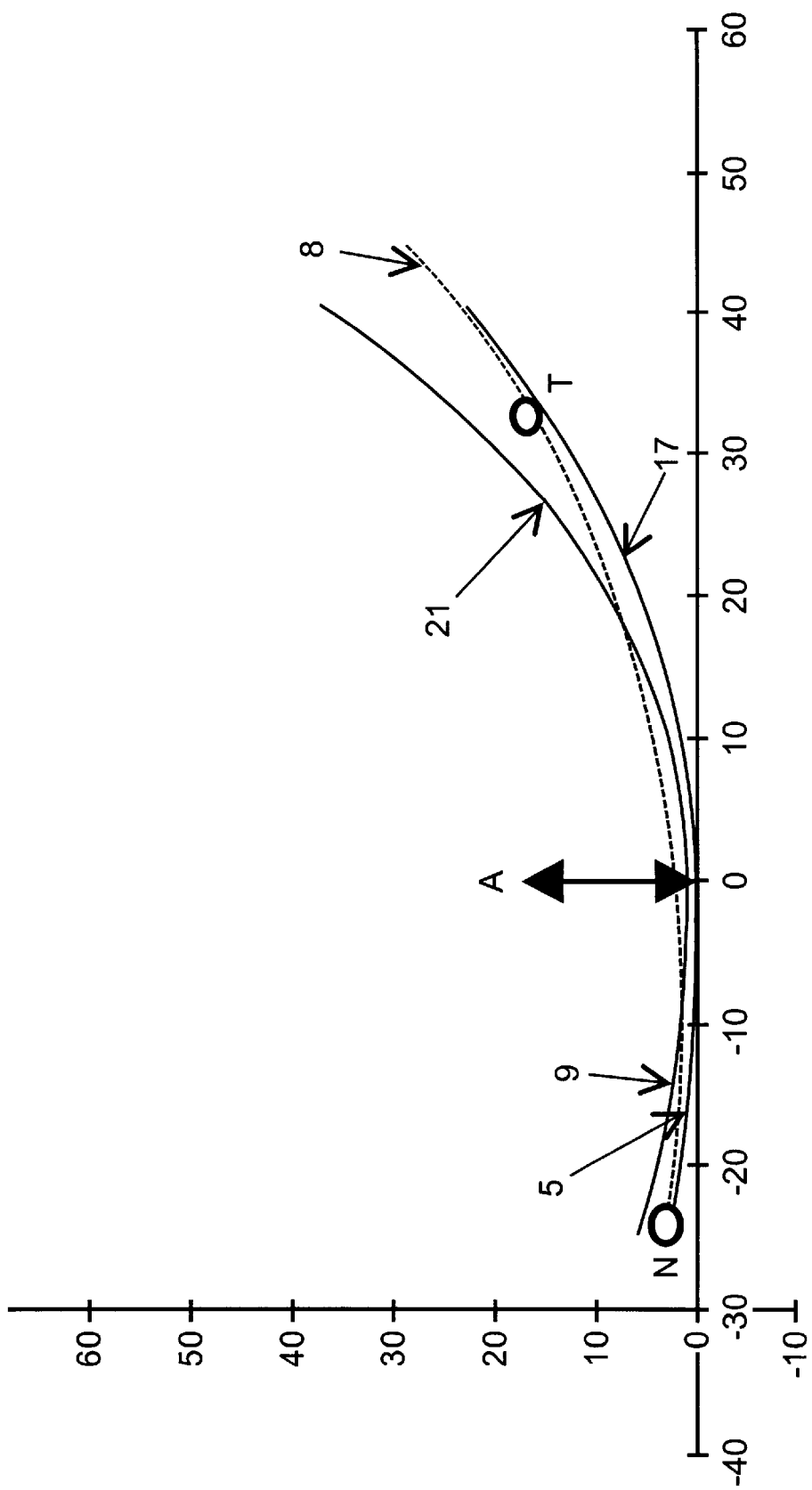
FIG. 30 illustrates a −4.0 D optical lens according to the present invention.

FIG. 30 illustrates a −4.0 D optical lens according to the present invention, but utilising the same front curve to that of the +4.0 D and +6.0 D optical lenses and again avoiding the use of a non-prescription temporal extension.

FIG. 31

Figure 31:
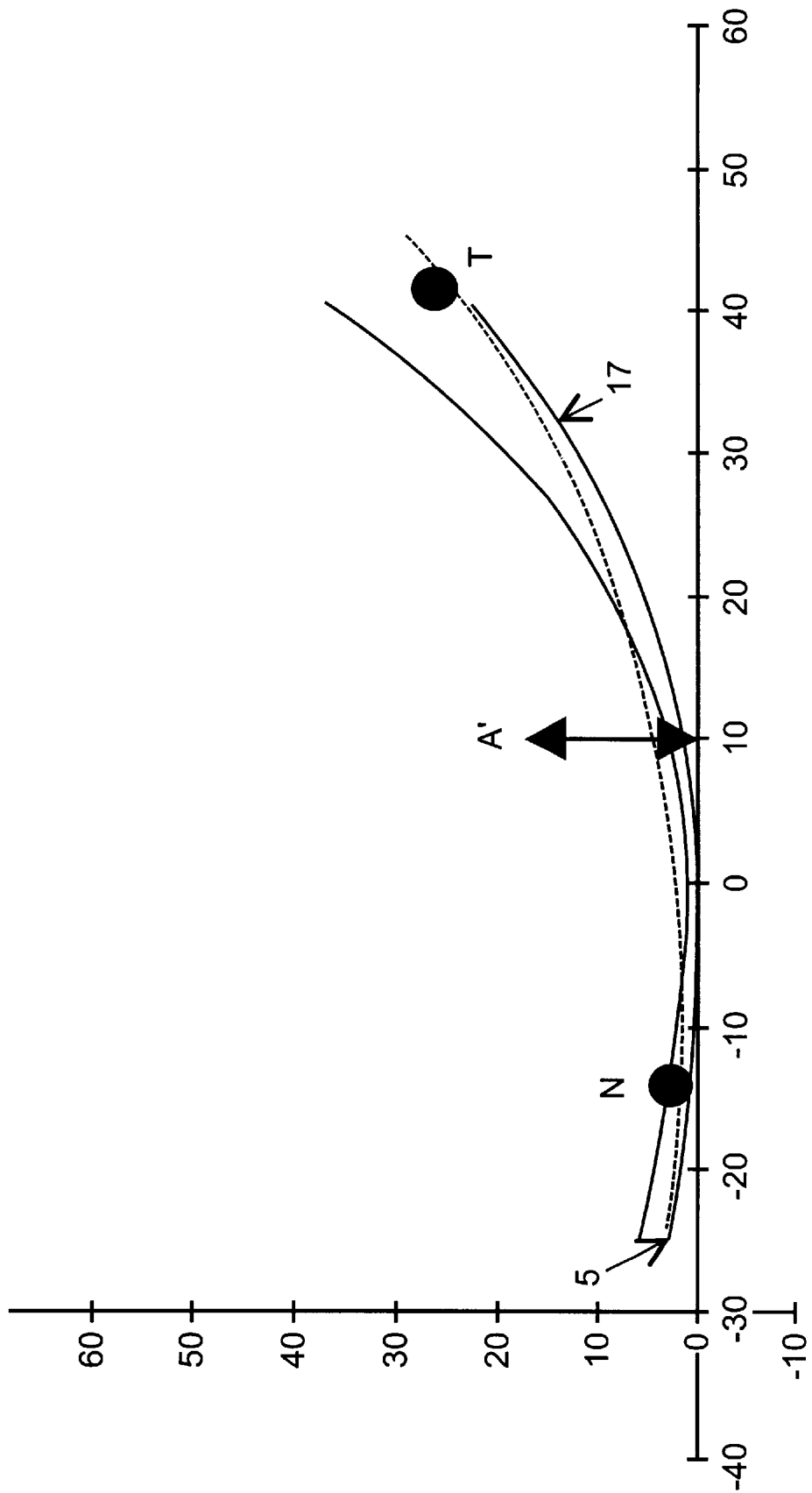
FIG. 31 is a similar view to that of FIG. 29 but the optical center has been decentered 10 mm relative to the geometric axis.

FIG. 31 is a similar view to that of FIG. 29 but the optical centre has been decentred 10 mm relative to the geometric axis in order to provide a maximum degree of wrap.

EXAMPLE 17

FIG. 32

Figure 32:
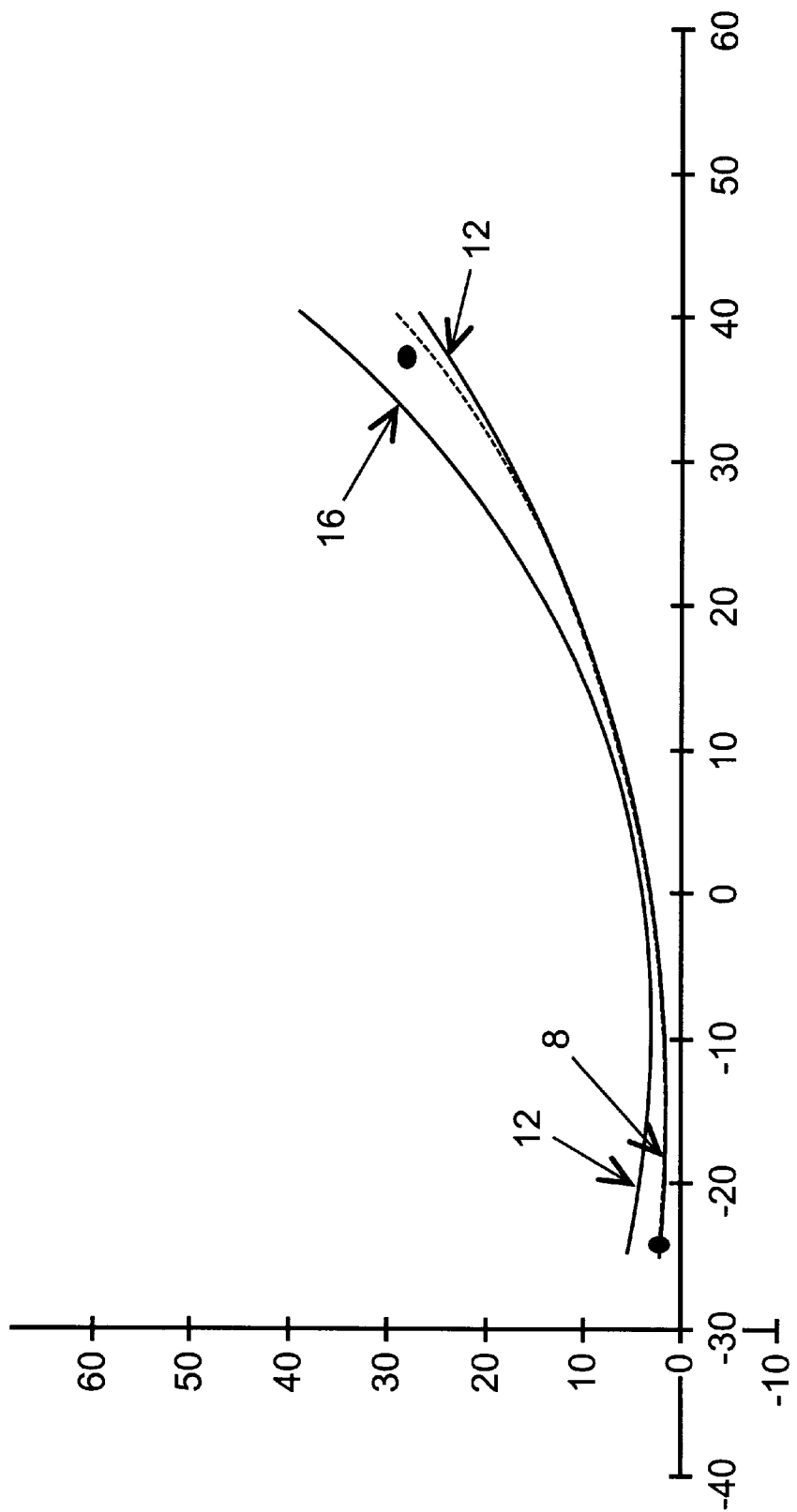
FIG. 32 is a similar optical lens to that of FIG. 29 but having reduced change in base curve across the visual field of the weaver.

FIG. 32 is a similar optical lens to that of FIG. 29 but having reduced change in base curve across the visual field of the wearer. The change nasal to temporal side is from 8 D top 12 D, compared with 5 D to 17 D in the previous example. The required wrap around Rx without non-prescription extension of the temporal field is achieved by tilting the lens through 11° horizontally. This requires correction of either the front, back or both surfaces to compensate optical errors introduced via the tilt.

FIG. 33

Figure 33:
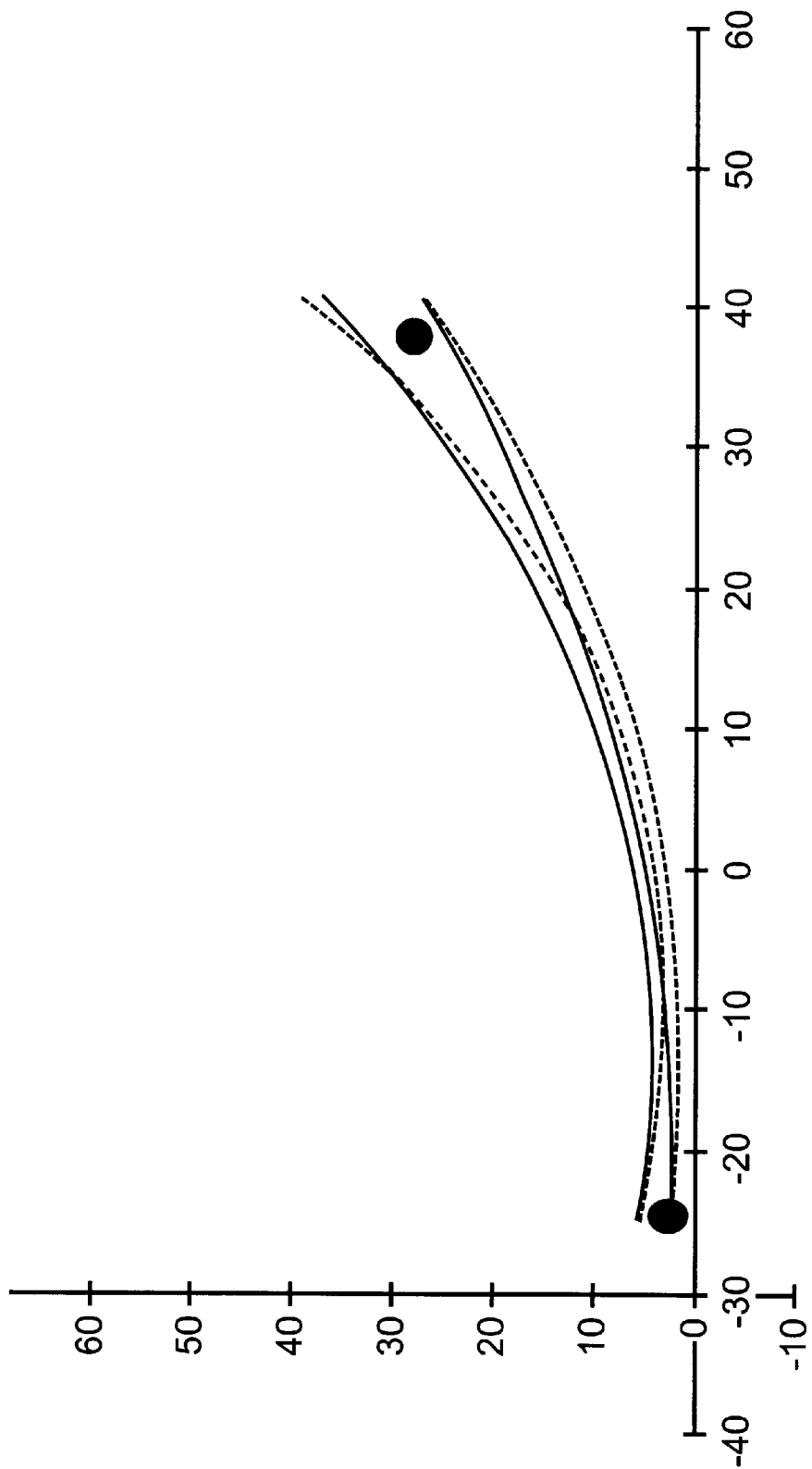
FIG. 33 illustrates a prior art optical lens having constant front and back curves.

FIG. 33 is an optical lens having constant front and back curves (8.0 and 12.0 D respectively) to create an Rx of −4 Dioptres. As for the lens in FIG. 32, the desired wrap is achieved by tilting the lens horizontally. The tilt angle in this case is 16°, necessitating the correction of greater optical errors by atoric modification of one or both of the lens surfaces as elaborated in the International Patent Application PCT/AU97/00188 to Applicants.

A benefit is achieved in the relative simplicity of the lens form compared to that of FIG. 32, represented by dotted outline in FIG. 33. It is seen that the nasal and temporal edge thicknesses of the two lenses are approximately equal, but the more conventional form lens encroaches closer to the eyes than does the lens of FIG. 32, designed according to the present invention. The greater the change in base curve across the visual field of the wearer, the more space is created for natural movement of the eyes and eye lashes.

EXAMPLE 18
FIG. 34

Figure 34:
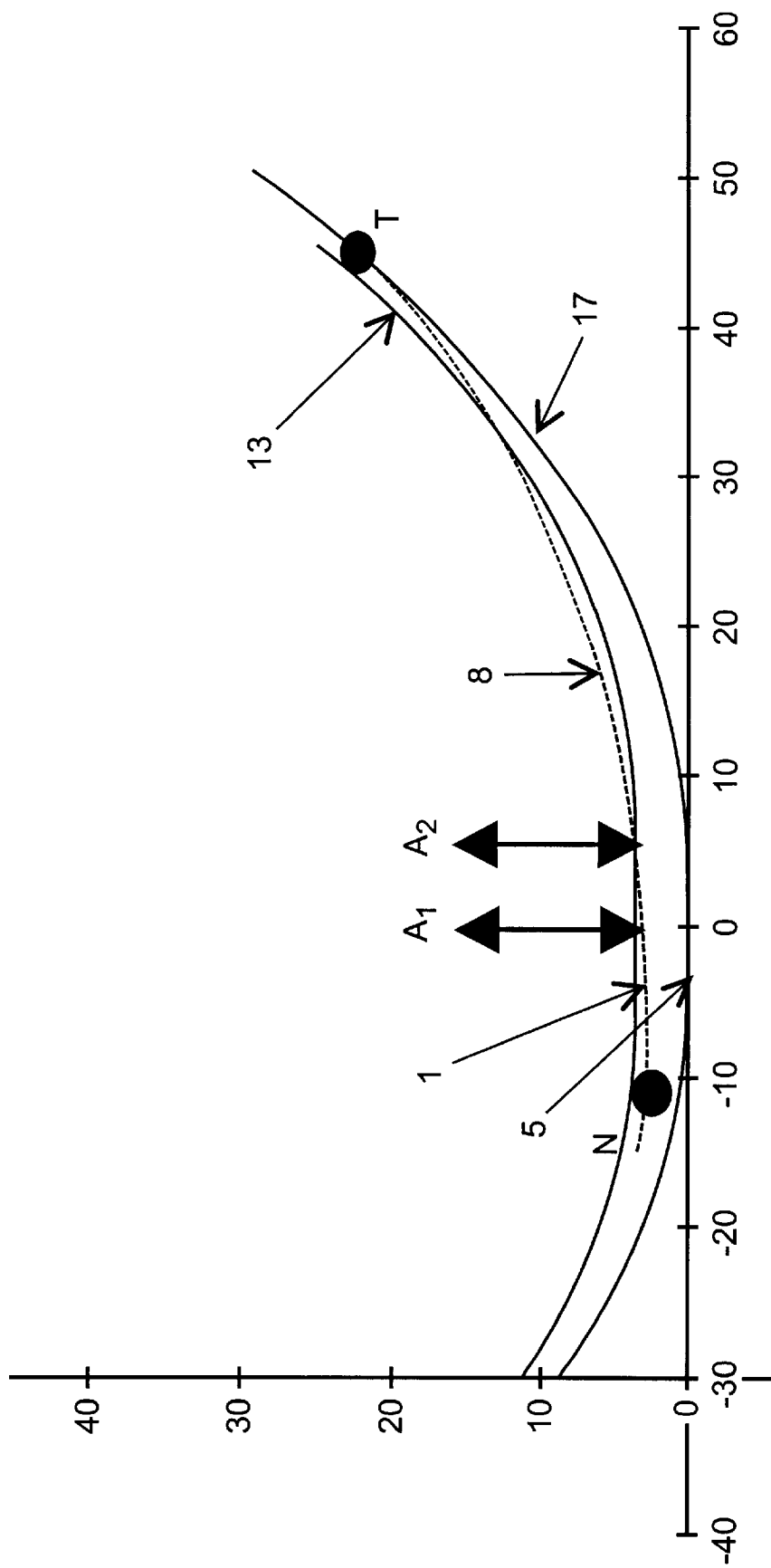
FIG. 34 illustrates a +4.0 D optical lens according to the present invention.

FIG. 34 illustrates a +4.0 D optical lens according to the present invention which is rotationally symmetrical about axis $A_1$, thus permitting the introduction of cylinder to any required orientation from an inventory of finished lenses. The temporal field of the lens provides Rx correction across its entire aperture. It may be described as having a tubular design axis defined by the rotation of $A_2$ around $A_1$.

EXAMPLE 19
FIG. 35

Figure 35:
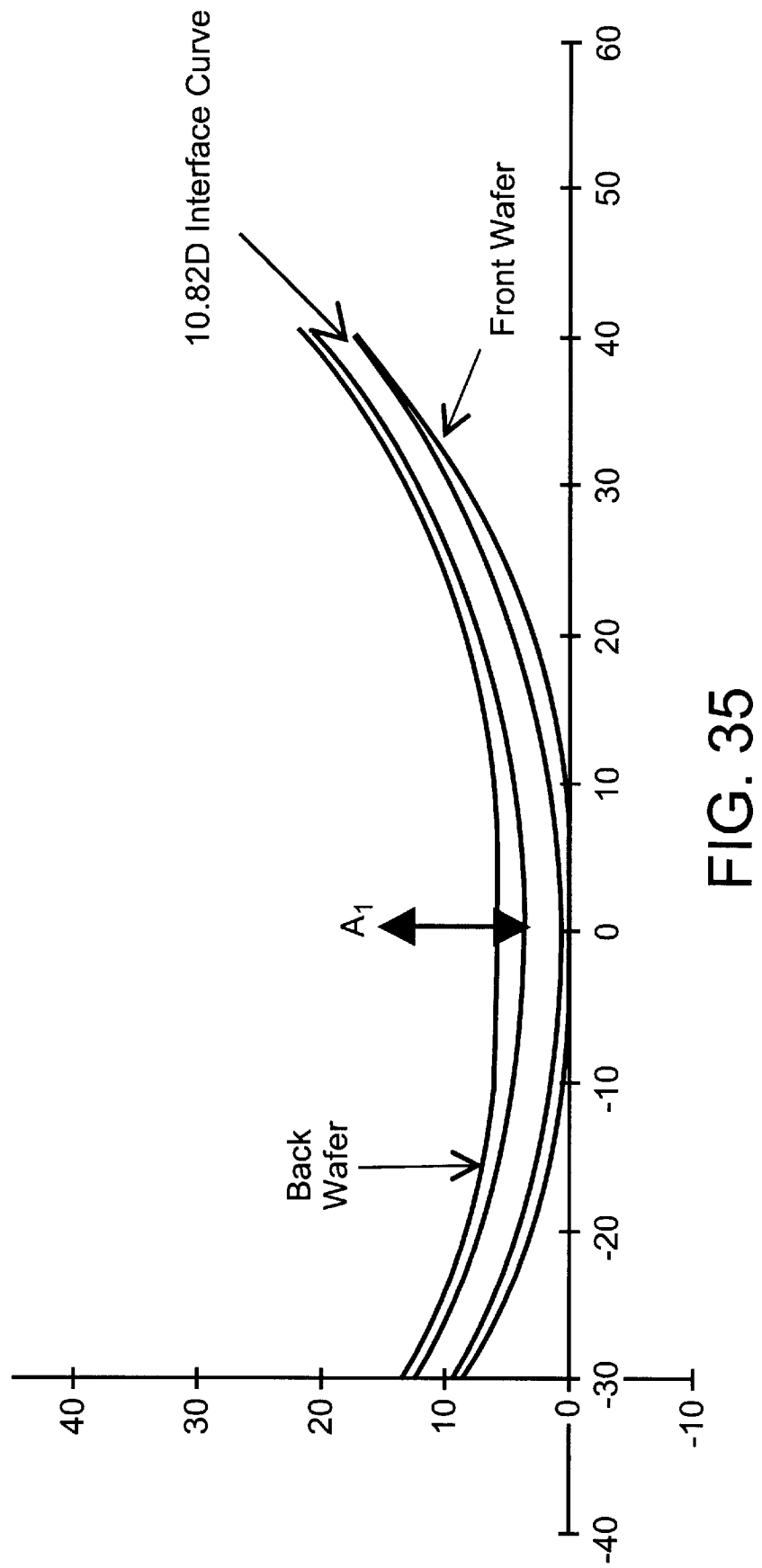
FIG. 35 illustrates an optical laminate article (exploded view) according to the present invention.

FIG. 35 illustrates an optical laminate article (exploded view) of +4.0 D according to the present invention including a front and back wafer having respective rear and front curves of 10.82 D.

The geometry of the optical laminate article when assembled replicates that of FIG. 34. However, its creation by a lamination process allows the provision of orientation sensitive features such as multi-focal correction, progressive power addition and light polarization to the final product by appropriate construction of the front wafer. Alternatively, features such as reflection mirrors, electrochromic layers and photochromic films may be encapsulated at the bonding surface, delivering useful features to the final lens and protecting the frail members that are typically used to create such properties.

EXAMPLE 20
FIG. 36

Figure 36:
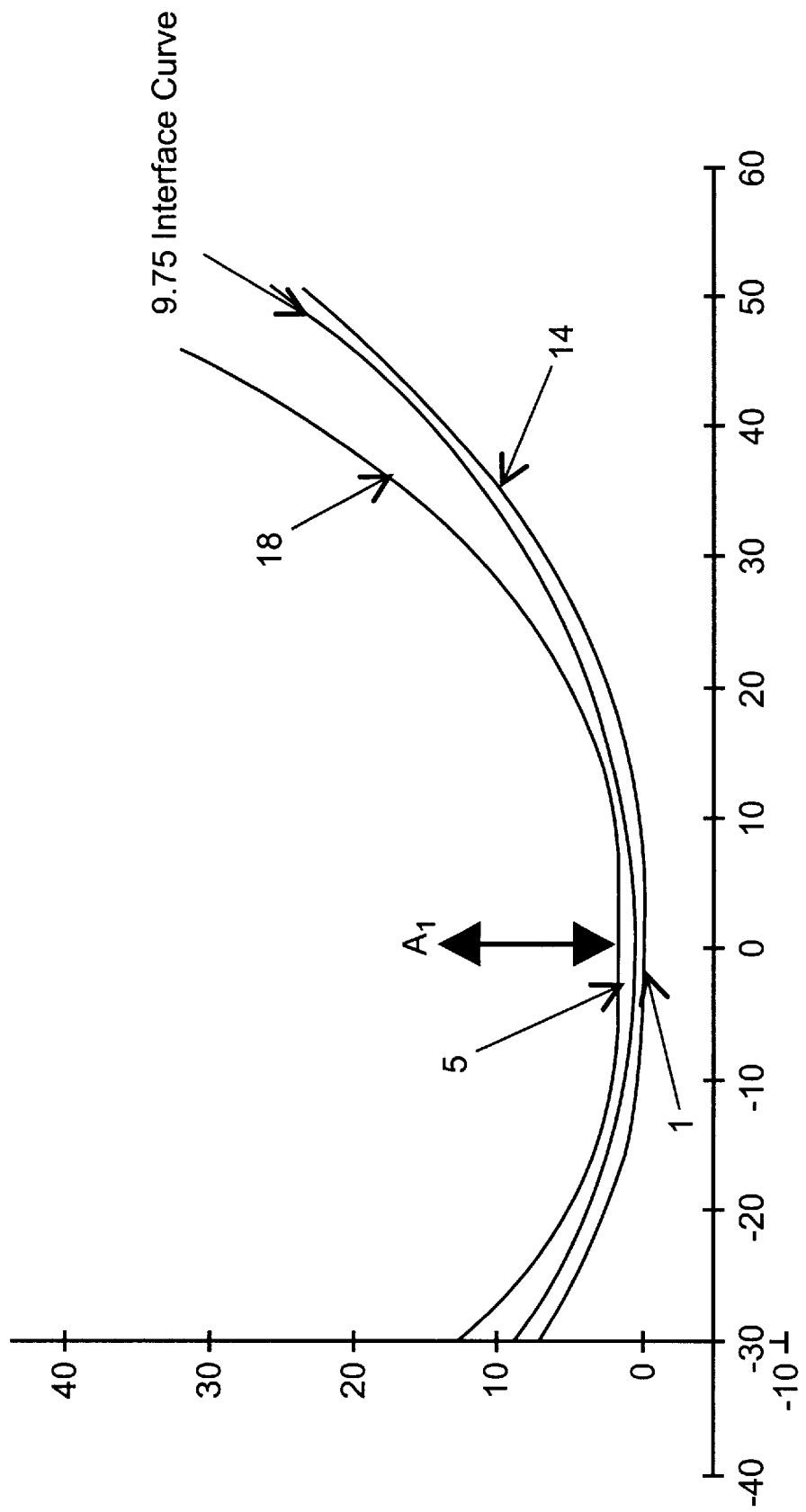
FIG. 36 illustrates an optical laminate article.

FIG. 36 illustrates an optical laminate article of −4.0 D which is rotationally symmetric about axis $A_1$ and has been created by laminating a pair of front and back wafers having a mating surface of 9.75 D. Desirably, all wafers of a product set suiting a prescription range from +6 to −6 D should have the same interface mating curve. However the most practical choice for that mating curve is dependent on the nominal design curve of the frames to which the final lenses are to be mounted.

EXAMPLE 21
FIG. 37

FIG. 2 illustrates the horizontal section of a +4.0 D optical lens according to the present invention. This lens may be glazed directly into a frame with nominal design curve of 8 D. In this case, the front curve toward the temple T is 17 D and that toward the nasal limit N is 5 D. There is no plano region and the lens provides the desired Rx correction across its entire aperture

EXAMPLE 22

Figure 37:
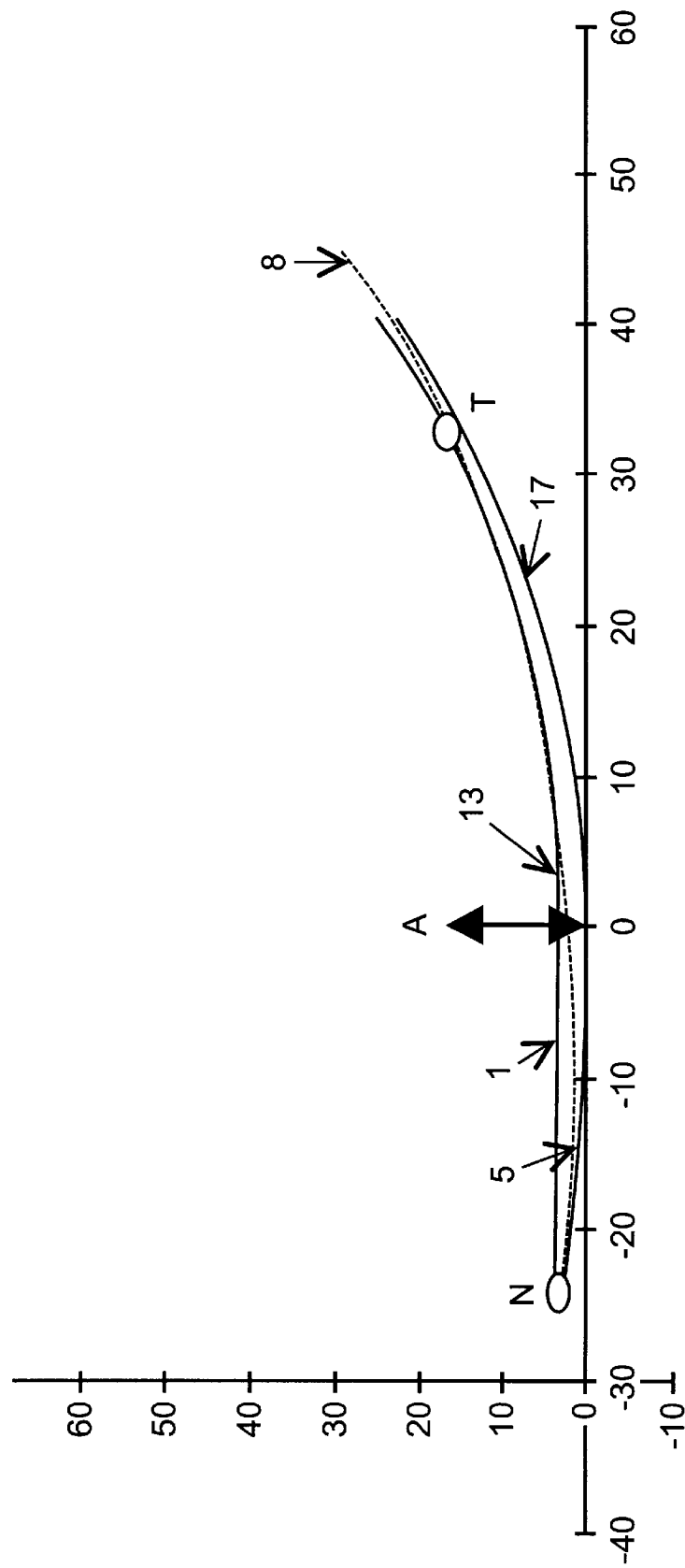
FIG. 37 depicts a lens having front and back surfaces which are smooth and continuous, in surface height and surface shape.

A: refer to FIG. 37 above

The lens depicted therein has front and back surfaces which are smooth and continuous, in surface height and surface shape. Together, the pair of surfaces define a constant through refractive power although the curvature of each has a discontinuity in the horizontal plane across the optical axis of the lens. The curvature change is identical for both surfaces, thus providing constant refractive power through the lens.

Either surface will not function as a suitable lens surface sheet unless mated with a complementing surface. A suitable mathematical form for the surfaces is $$Z(x, y) = 1/2A_2 - \sqrt{(1/2A_2 - Z(x))^2 - y^2}$$

$$\text{where } Z(x) = \sum_n B_n x^n$$

wherein Ox is the horizontal direction and Oy is the vertical direction. The coefficient $A_2$ has a constant value specifying a constant vertical curvature, while the coefficients $B_n$ take different values for positive and negative values of x.

For the lens in FIG. 37 made in polycarbonate, the front surface is $A_2$=6.838 $E$-03, and $B_2$=14.530 $E$-03 for $x$>0 and $B_2$=4.274 $E$-03 for $x$<0 while $B_4$=$(B_2)^3$, $B_6$=2*$(B_2)^5$, $B_8$=5*$(B_2)^7$

For the back surface, $A_2$=3.419 $E$-03 and $B_2$=11.111 $E$-03 for $x$>0 and $B_2$=0.855 $E$-03 for $x$<0.

Moulds for injection molding or casting of such lenses are produced by the procedures used in making progressive addition lenses, either by CNC milling of metal tools or of ceramic formers from which to manufacture glass tools (moulds) for casting. Preferably the surface is milled via a succession of traverses in the Oy direction of the design, these being indexed horizontally to follow the profile Z(x). This limits the sources of error in imparting the change in surface form corresponding to the values of $B_2$ for positive and negative values of x.

The remaining challenge in lens manufacture is to ensure precise alignment of axis and orientation of the two mould surfaces with respect to each other. Misalignment will cause errors in refractive power at the vertical axis.

Convention in the ophthalmic industry is to blend one surface region into another abutting region of different character in order to ensure that unwanted cosmetic features such as localised surface reflections are avoided. Typically this has been achieved with localised errors in refractive power. With modern CNC machining technology, such power errors can be avoided. It has been found that the two parts of the lens depicted in FIG. 37 (i.e. $x$<0 and $x$≧0) may be blended together such that the conformity of one to the other is heightened. Specifically, the surfaces and both first and second derivatives may be rendered smooth and continuous in themselves. Furthermore, the relationship between the surfaces will still define a constant refractive power through the lens.

Two examples are provided:

EXAMPLE 22A

To blend the two lens segments over a zone of width 8 mm to the nasal side of the line of direct sight.

$$Z(x) = B'_0 + \sum_{n=1}^{4} B'_{2n} x^{2n}; \quad x \leq x_0$$

$$= \sum_n B_n x^n; \quad x_0 < x \leq 0$$

$$= \sum_{n=1}^{4} B''_{2n} x^{2n}; \quad x > 0$$

wherein $x_0$ is the width of the prescription zone, and the coefficients $B_n$, $B'_n$ and $B''_n$ take different values for positive and negative values of x.
where
  $x_0 = -8.0$; $B'_0 = 0.220225$
  $B'_2 = 4.274$ E-03; $B'_4$, $B'_6$, $B'_8$ as above
  $B''_2 = 14.530$ E-03; $B''_4$, $B''_6$, $B''_8$ as above
  and $B_2 = 14.530$ E-03; $B_3 = 4.276$ E-04; $B_4 = 3.067$ E-06; $B_5 = 2.707$ E-07 $B_6 = 9.256$ E-09; $B_7 = 2.685$ E-10; $B_8 = 1.89$ E-11 for the front surface
For the back surface,
  $x_0 = -8.0$; $B'_0 = 0.218973$
  $B'_2 = 11.111$ E-03; $B'_{2n}$ as above
  $B''_2 = 0.855$ E-03; $B''_{2n}$ as above
  and $B_2 = 1.111$ E-02; $B_3 = 4.274$ E-04; $B_4 = 1.372$ E-06; $B_5 = 1.583$ E-07
  $B_6 = 6.426$ E-09; $B_7 = 1.431$ E-10; $B_8 = 5.115$ E-12

Figure 38:
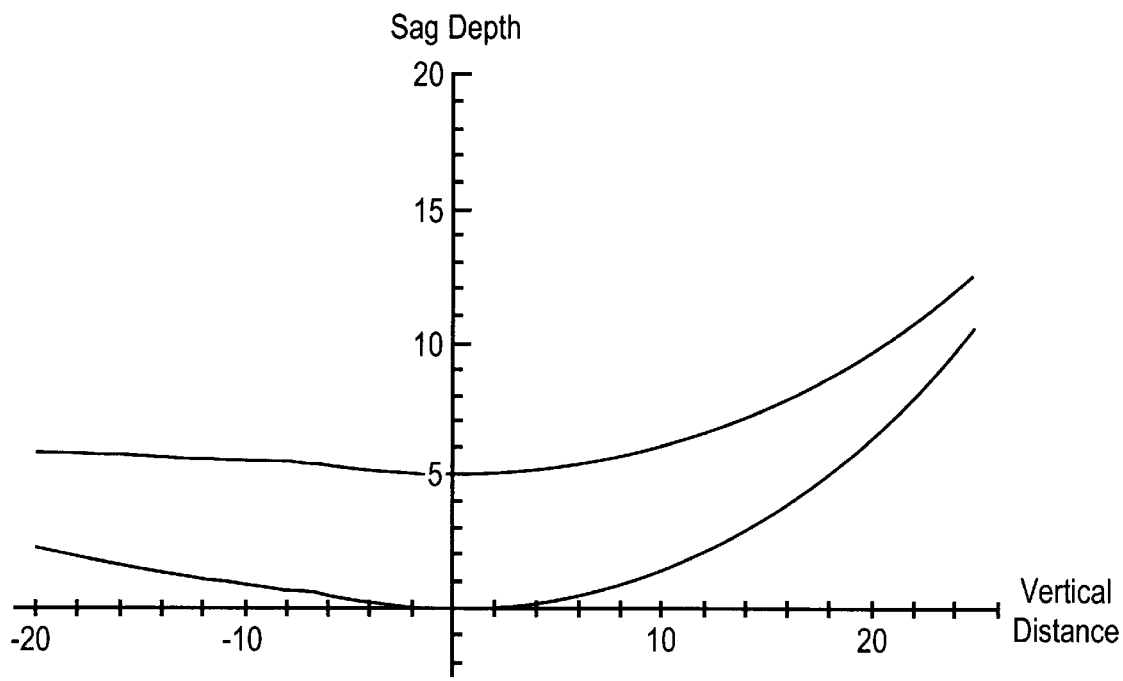
FIGS. 38 & 39 plot, respectively, the horizontal section and horizontal power of the lens element of Example 22A.
Figure 39:
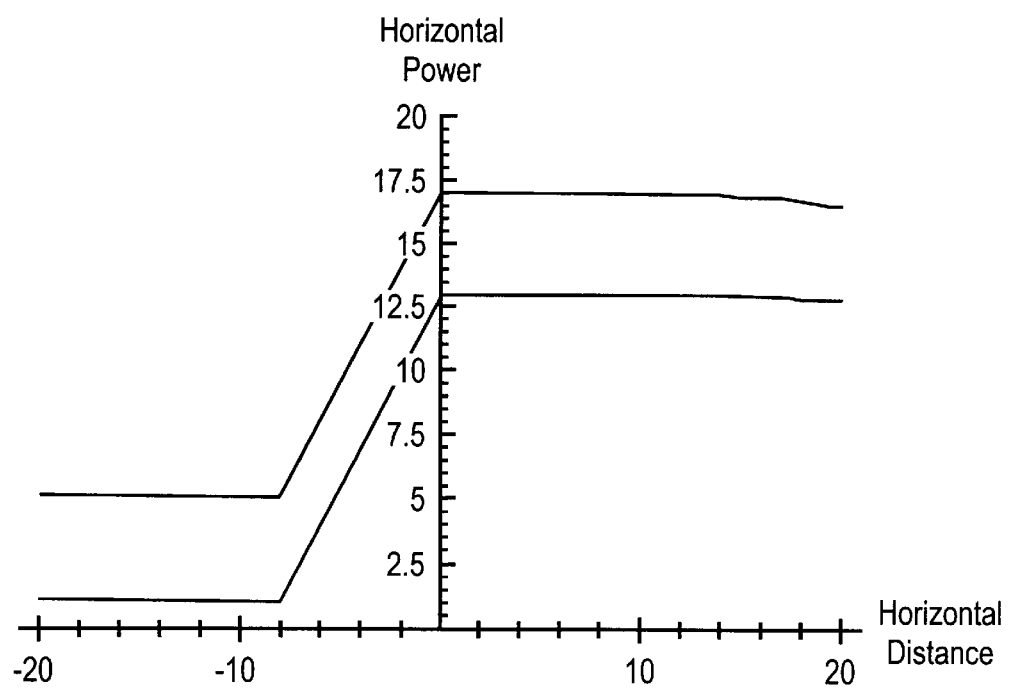

This creates the horizontal section shown here as FIG. 38 for which the horizontal power of the two surfaces vary as for FIG. 39. Note the linear change of power across the blend zone with absence of discontinuities in the surface description and its shape and curvature features.

EXAMPLE 22B

To blend the lens segments within 6 mm, using a faster, but still linear change in horizontal power.

Figure 40:
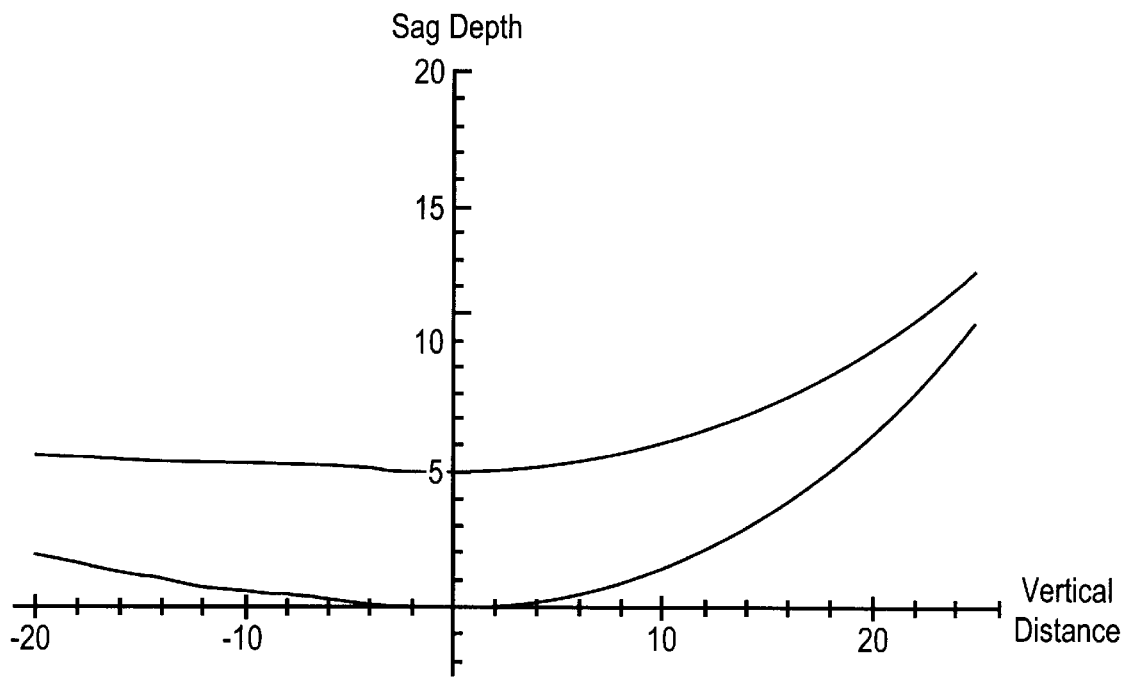
FIGS. 40 and 41 plot, respectively, the horizontal section and horizontal power of the lens element of Example 22B.
Figure 41:
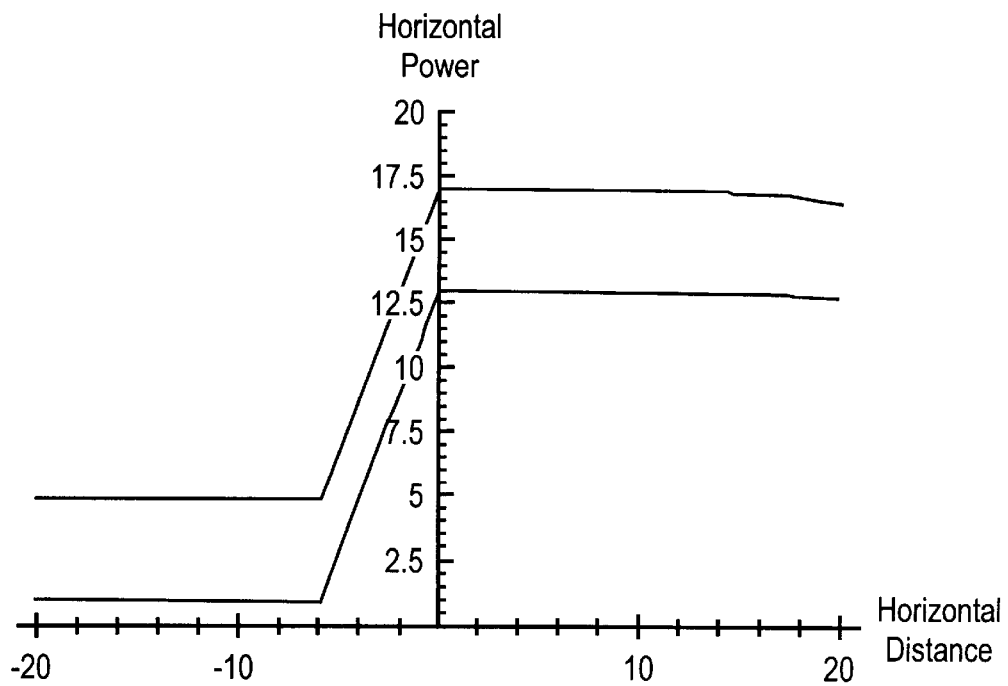

The lens section of FIG. 40 herein and the horizontal power changes of FIG. 41 herein are achieved by the following changes to the parameters for Example 22A above:
  $x = -5.775$; $B'_0 = 0.130382$ (front); $B'_0 = 0.130013$ (back)
and for the front surface;
  $B_2 = 1.453$ E-02; $B_3 = 5.983$ E-04; $B_4 = 3.067$ E-06; $B_5 = 3.789$ E-07;
  $B_6 = 1.689$ E-08; $B_7 = 4.808$ E-10; $B_8 = 2.264$ E-11
while the back surface has
  $B_2 = 1.11$ E-02; $B_3 = 5.983$ E-04; $B_4 = 1.372$ E-06; $B_5 = 2.216$ E-07;
  $B_6 = 1.227$ E-08; $B_7 = 3.0535$ E-10; $B_8 = 9.925$ E-12.

EXAMPLE 22C

To blend the lens segments within 8 mm centered on the line of sight, using a non-linear change in horizontal power so that the rate of change of power is itself continuous across the blend zone. That is the surface is continuous to the third derivative.

Figure 42:
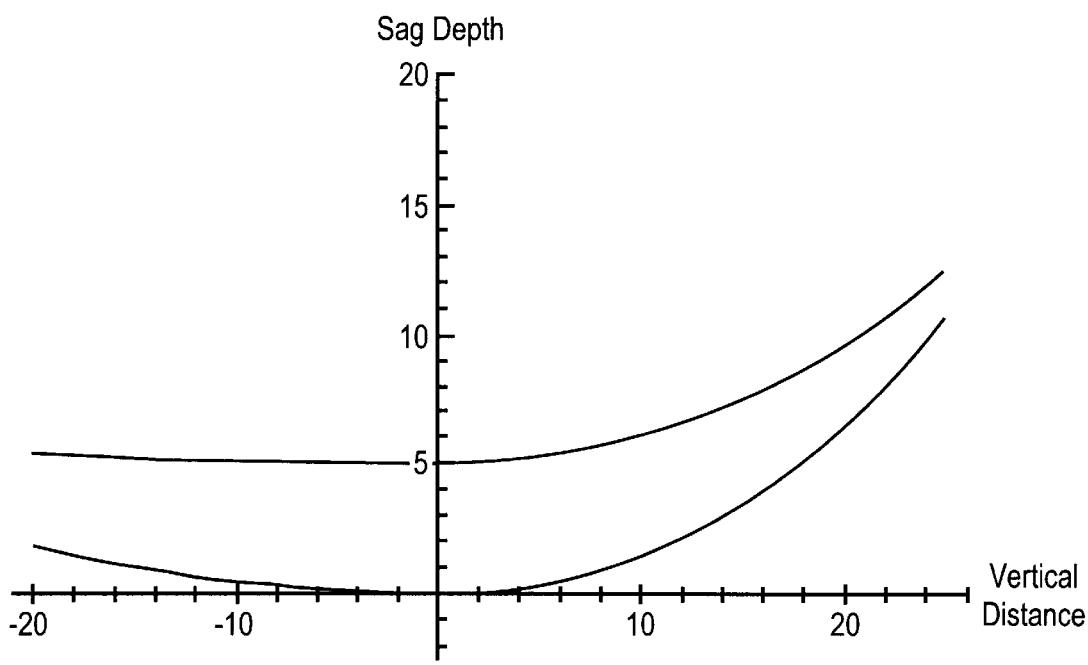
FIGS. 42, 43 and 44 plot, respectively, the horizontal section, horizontal power changes and through power of the lens element of Example 22C.
Figure 43:
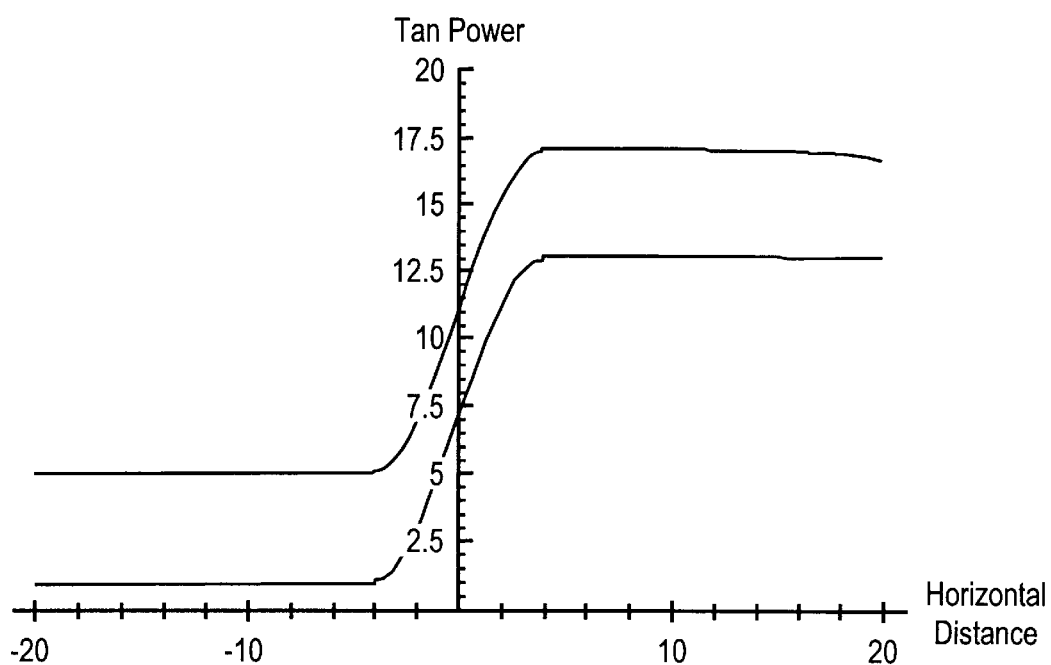
Figure 44:
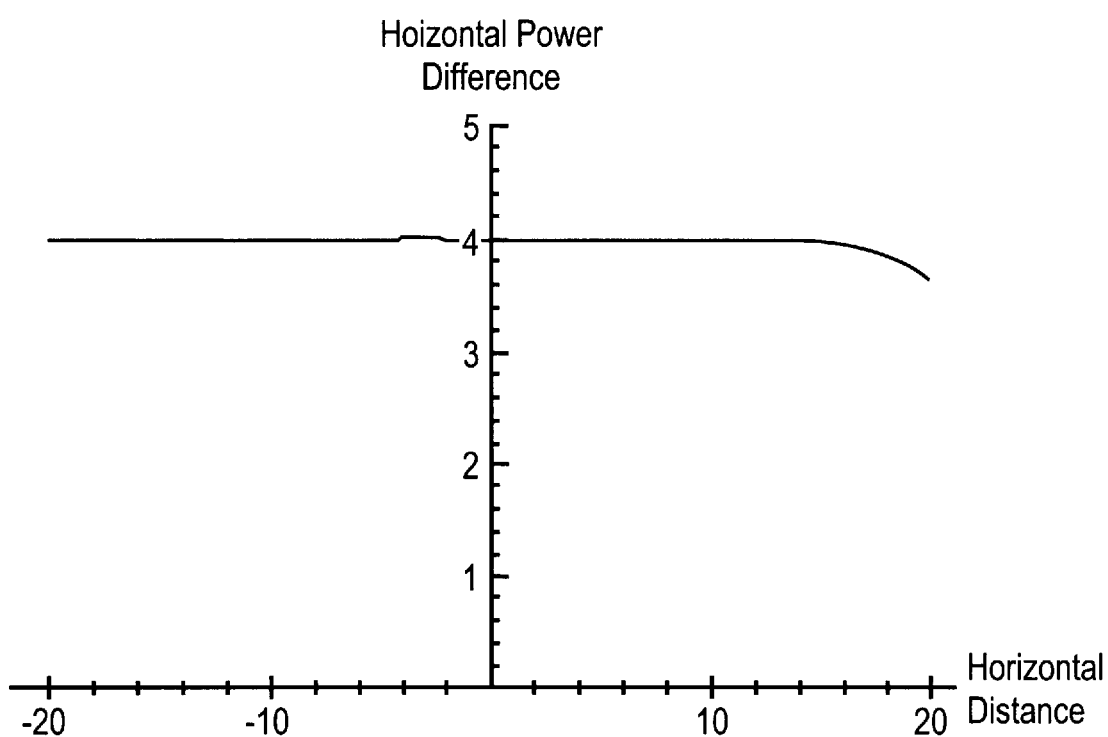

The lens section of FIG. 42 herein and the horizontal power changes of FIG. 43 and through power of FIG. 44 herein are achieved by the following changes to the representation for Examples 22A and 22B above;

$$Z(x) = B'_0 + \sum_{n=1}^{4} B'_{2n} x^{2n}; \quad x \leq -x_0$$

$$= \sum_n B_n x^n; \quad -x_0 < x \leq x_0$$

$$= \sum_{n=1}^{4} B''_{2n} x^{2n}; \quad x > x_0$$

where $B_2 = \{P_0 + 3.7 \ast \sin[x \ast \pi/15.5]\} \ast 10^{-3}/1.170$, the $B_n$ are as defined above and $P_0$ is 11 for the front and 7 for the back of the blend surface. Note the smoothness of the transition of surface slope and power across the blend.

Finally, it is to be understood that various other modifications and/or alterations may be made without departing from the spirit of the present invention as outlined herein.

What is claimed is:

1. An optical lens element including a front and back surface, at least one surface being continuous, and forming a prescription (Rx) zone and optionally a peripheral temporal zone;

a front surface exhibiting a change of base curve across the field of vision of the wearer, the base curves being smoothly blended to avoid a prismatic jump in the Rx zone;

at least one of the front and back surfaces bearing a surface correction to at least partially adjust for optical errors, wherein each surface corresponds to the formula $$Z(x, y) = 1/2A_2 - \sqrt{(1/2A_2 - Z(x))^2 - y^2}$$

where $Z(x) = \sum_n B_n x^n$ wherein Ox is the horizontal direction, Oy is the vertical direction and Oz is the optical axis; the coefficient $A_2$ has a constant value specifying a constant vertical curvature, while the coefficients $B_n$ take different values in different ranges of positive and negative values of x; and base curves are smoothly blended in the horizontal direction according to the formula $$Z(x) = B'_0 + \sum_{n=1}^{4} B'_{2n} x^{2n}; \quad x \leq x_0$$

$$= \sum_n B_n x^n; \quad x_0 < x \leq x_{0'}$$

$$= \sum_{n=1}^{4} B''_{2n} x^{2n}; \quad x > x_{0'}$$

wherein $x_0$ and $x_{0'}$ are located within or near the edges of the prescription zone, and the coefficients $B_n$, $B'_n$ and B"$_n$ take different values for the defined ranges of positive and negative values of x.

2. An optical lens element according to claim 1, wherein both front and back surfaces of the lens change base curve to provide the desired prescription (Rx) in the prescription zone without astigmatic, mean power or prismatic errors; and the back surface and front surface are complementary in shape.

3. An optical lens element providing a prescription (Rx) correction zone in the range of about −6.0 D to +6.0 D and a peripheral temporal zone for providing a shield in the area of the temples, wherein the front surface is capable of being mounted in a frame of constant design curve irrespective of the Rx, such frame curves being 5.0 D and above;

the back surface provides good clearance from temples or eye lashes; and at least one surface exhibits a gradual change of base curve across the field of vision of the wearer;

at least one of the front and back surfaces bearing a surface correction to at least partially adjust for optical errors induced by said changes in base curve, including astigmatism, mean power and prismatic errors.

4. An optical lens element according to claim 3, wherein the peripheral temporal zone is a non-prescription zone.

5. An optical lens element according to claim 3, wherein the front surface exhibits a change of base curve across the field of vision of the wearer, the base curves being smoothly blended to avoid a prismatic jump in the Rx zone.

6. An optical lens element according to claim 5, wherein the front surface of the lens element has a base curve of approximately 0.0 D to approximately 8.0 D extending from the nasal limit to the optical center of the lens element and a high base curve from the optical center to the temporal limit of approximately 8.0 D or above, but the vertical curve is 8.0 D or below.

7. An optical element according to claim 3, wherein at least one surface provides multi-focal correction or progressive power addition.

8. An optical lens element according to claim 3, wherein the lens element is modified to permit light control.

9. An optical lens element according to claim 3, wherein the lens element includes one or more of the group consisting of a mirror coating, a light control coating, a light polarizing member, a reflective coating or a light control tint within the peripheral temporal zone.

10. An optical lens element adapted for mounting in a frame of the wrap-around or shield type, such that the lens element is rotated temporally about a vertical axis through the optical center thereof, the lens element including a front and back surface, at least one surface being continuous and forming a prescription (Rx) zone and a peripheral temporal zone;

at least one of the front and back surfaces bearing a surface correction to at least partially adjust for optical errors including astigmatic and mean power errors;

at least one surface exhibits a change of base curve across the field of vision of the wearer, wherein each surface corresponds to the formula $$Z(x, y) = 1/2A_2 - \sqrt{(1/2A_2 - Z(x))^2 - y^2}$$

-continued where $Z(x) = \sum_n B_n x^n$ wherein Ox is the horizontal direction, Oy is the vertical direction, and Oz is the optical axis; the coefficient $A_2$ has a constant value specifying a constant vertical curvature, while the coefficients $B_n$ take different values in different ranges of positive and negative values of x; and base curves are smoothly blended in the horizontal direction according to the formula:

$$Z(x) = B'_0 + \sum_{n=1}^{4} B'_{2n} x^{2n}; \quad x \leq x_0$$

$$= \sum_n B_n x^n; \quad x_0 < x \leq x_{0'}$$

$$= \sum_{n=1}^{4} B''_{2n} x^{2n}; \quad x > x_{0'}$$

wherein $x_0$ and $x_{0'}$ are located within or near the edges of the prescription zone, and the coefficients $B_n$, $B'_n$ and $B''_n$ take different values for the defined ranges of positive and negative values of x.

11. An optical lens element according to claim 10, wherein at least one of the front and back surfaces further includes a surface correction to at least partially adjust for prismatic errors.

12. An optical lens element according to claim 10, wherein the back surface includes a base curvature such that the patient's required prescription power, Rx, in the prescription zone is achieved; the back surface being further modified to complement the front surface selected.

13. An optical lens element according to claim 10, wherein the back surface further includes an astigmatic and mean power error correction to compensate for lens wrap.

14. An optical lens element according to claim 10, wherein the lens element is modified to provide multi-focal correction or progressive power addition.

15. An optical lens element according to claim 10, wherein the lens element is modified to permit light control.

16. An optical lens element with non-zero refractive power adapted for mounting in a frame of the wrap around or shield type, the lens element including a front and back surface, at least one surface being continuous, forming a prescription (Rx) zone and a peripheral temporal zone;

at least one of the front and back surfaces bearing a surface correction to at least partially adjust for errors including astigmatic and mean power errors;

at least one surface exhibits a gradual change of base curve across the field of vision of the wearer;

wherein the optical axis is decentered relative to the geometric axis of the lens element to provide for prismatic correction.

17. An optical lens according to claim 16, wherein the lens element includes a non-prescription peripheral temporal zone.

18. An optical lens element according to claim 16, wherein the lens element is generally rotationally symmetrical about its geometric center.

19. An optical lens element according to claim 18, wherein the lens element is rotated temporally about a vertical axis through the optical center thereof.

20. An optical lens element according to claim 16, wherein at least one of the front and back surfaces further includes a surface correction to at least partially adjust for off-axis astigmatic and mean power errors as well as to avoid prismatic jump.

21. An optical lens element according to claim 16, wherein the lens element is modified to provide multi-focal correction or progressive power addition.

22. An optical lens element according to claim 16, wherein the lens element is modified to permit light control.

23. A laminate optical article with non-zero refractive power adapted for mounting in a frame of the wrap-around or shield type, including
a front lens element;
a complementary back lens element, at least one of the front and back surfaces of the laminate optical article being continuous and forming a prescription (Rx) zone;
wherein at least one surface exhibits a gradual change of base curve across the field of vision of the wearer; and
the front and/or back surface bear a correction to at least partially adjust for errors including astigmatic, mean power, and prismatic errors induced by said change in base curve.

24. The laminate optical article of claim 23, wherein at least one of the front and back lens elements includes an extension in the temporal region towards the peripheral field of corrected vision of a wearer to form a peripheral temporal zone.

25. A laminate optical article according to claim 24, wherein the peripheral temporal zone is a non-prescription zone.

26. A laminate optical article according to claim 23, wherein the front surface exhibits a change of base curve across the field of vision of the wearer, the base curves being smoothly blended to avoid a prismatic jump in the Rx zone.

27. A laminate optical article according to claim 26, wherein the front and back lens elements are generally rotationally symmetric about their respective geometric centers.

28. A laminate optical article according to claim 27, wherein the laminate article is rotated temporally about a vertical axis through the optical center thereof, or the optical axis is decentered relative to the geometric axis, or the laminate article is both rotated and decentered.

29. Spectacles including
a spectacle frame of the wrap-around type adapted to receive a pair of ophthalmic lenses such that each lens is rotated temporally about a vertical axis through the optical center thereof; and
a pair of optical lenses, each lens including
a front and back surface together forming a prescription (Rx) zone and a peripheral temporal zone,
at least one of the front and back surfaces bearing a surface correction to at least partially adjust for errors including astigmatic, mean power and prismatic errors; and at least one surface exhibiting a gradual change of base curve in a horizontal direction across the field of vision of the wearer.

30. Spectacles according to claim 29, wherein the peripheral temporal zone is a non-prescription zone.

31. Spectacles including
a spectacle frame of the wrap-around type;
a pair of optical lens elements which lens elements provide true Rx correction in a prescription (Rx) zone for a wearer 60° of eye rotation off axis, and terminating in an extension in the temporal region towards the peripheral field of corrected vision of a wearer to form a peripheral temporal zone,
each lens element having at least one surface which exhibits a gradual change of base curve across the field of corrected vision of the wearer,
at least one surface bearing a surface correction to at least partially adjust for optical errors induced by said change of base curve across the field of corrected vision of the wearer; and
the lens elements providing a clear perception of objects in the peripheral area of human vision and avoiding prismatic jump in the prescription zone.

32. An optical lens element of negative or positive refractive power including a front and back surface, the front and back surfaces together forming a prescription (Rx) zone providing Rx correction and an extension in the temporal region towards the peripheral field of corrected vision of a wearer to form a peripheral temporal zone;
wherein the front and back surfaces of the lens exhibit a change of base curve across the field of corrected vision of the wearer, the base curves being smoothly blended to avoid a prismatic jump in the field of corrected vision;
at least one of the front and back surfaces bearing a surface correction to at least partially adjust for optical errors induced by said change in base curve including astigmatic, mean power and prismatic errors;
the front and back surface being complementary in shape.

33. An optical lens element according to claim 32, wherein the lens element is adapted for mounting in a frame of the wrap-around or shield type, such that the lens is rotated temporally about a vertical axis through the optical center thereof.

34. An optical lens element according to claim 32, wherein the lens element is adapted for mounting in a frame of the wrap-around or shield type, such that the lens is decentered to displace its optical axis from the line of sight while maintaining parallelism between the two.

35. An optical lens element according to claim 32, wherein the lens element is adapted for mounting in a frame of the wrap-around or shield type, such that the lens is both decentered and rotated temporally about a vertical axis through the optical center thereof.

36. An optical lens element according to claim 32, wherein the peripheral temporal zone is at least in part of generally toric physical shape.

37. An optical lens element according to claim 32, wherein the peripheral temporal zone is at least in part generally plano, the front surface being modified in the peripheral temporal zone to substantially correspond to the curvature of the back surface.

38. An optical lens element according to claim 32, wherein the lens element is modified to permit light control.

39. An optical lens element according to claim 38, wherein the lens element includes one or more of the group consisting of a mirror coating, a light control coating, a light polarizing member, a reflective coating or a light control tint within the peripheral temporal zone.

40. An optical lens element according to claim 32, wherein the lens element is generally rotationally symmetrical about its geometric center.

41. An optical lens element according to claim 32, wherein the lens element is modified to provide multi-focal correction or progressive power addition.

42. An optical lens element according to claim 41, wherein the lens element is modified to permit light control.

43. An optical lens element according to claim 42, wherein the lens element includes one or more of the group consisting of a mirror coating, a light control coating, a light polarizing member, a reflective coating or a light control tint within the peripheral temporal zone.

44. An optical lens element according to claim 32, modified to accentuate facial form in the nasal region and include a region of reduced or opposite curvature defining a nasal accentuating region.

45. A pair of optical lens element according to claim 44, mounted in a frame such that the lenses in conjunction with an attached nose-piece provide physical or radiation protection to the wearer's nose.

46. A unitary lens having a non-zero refractive power including a pair of ophthalmic lens elements, each lens element including a front and back surface, and forming a prescription (Rx) zone and an extension in the temporal region towards the peripheral field of corrected vision of a wearer to form a peripheral temporal zone for providing a shield in the area of the temples, the base curves of each zone being smoothly blended therein to avoid a prismatic jump in the Rx zone; and providing prescription (Rx) correction in the range of about −6.0 D to +6.0 D, wherein the front surface is capable of being mounted in a frame of constant design curve of 5.0 D and above irrespective of the Rx; and at least one surface exhibits a change of base curve across the field of corrected vision of the wearer;

at least one of the front and back surfaces bearing a surface correction to at least partially adjust for optical errors induced by said change in base curve, including astigmatic, mean power and prismatic errors.

47. A unitary lens according to claim 46, wherein the peripheral temporal zone is a non-prescription zone.

48. A unitary lens according to claim 46, wherein the lens provides true Rx correction in the prescription (Rx) zone for a wearer not greater than 50° of eye rotation off axis and terminating in a peripheral temporal zone, that provides clear perception of objects in the peripheral area of human vision and avoids prismatic jump in the prescription zone.

49. An optical lens element having non-zero refractive power wherein, when mounted, the lens element is decentered to displace its optical axis from the geometric axis of the lens element while maintaining parallelism between the two axes, the lens element including a front and back surface, at least one surface being continuous and forming a prescription (Rx) zone providing Rx correction;

an extension in the temporal region towards the peripheral field of corrected vision of a wearer to form a peripheral temporal zone;

wherein at least one surface exhibits a gradual change of base curve across the field of corrected vision of the wearer; and at least one of the front and back surfaces bears a surface correction to at least partially adjust for optical errors induced by said change of base curve including astigmatic, mean power and prismatic errors.

50. An optical lens element according to claim 49, wherein the lens element is generally rotationally symmetrical about its geometric center.

51. An optical lens element according to claim 49, wherein the back surface includes a base curvature such that the patient's required prescription power, Rx, in the prescription zone is achieved; the back surface being further modified to complement the front surface selected.

52. An optical lens element according to claim 51, wherein the back surface further includes a prismatic, astigmatic and mean power error correction to compensate for lens wrap and decentration.

53. An optical lens element according to claim 49, wherein the lens element is modified to provide multi-focal correction or progressive power addition.

54. An optical lens element according to claim 49, wherein the lens element is modified to permit light control.

* * * * *

UNITED STATES PATENT AND TRADEMARK OFFICE
CERTIFICATE OF CORRECTION

PATENT NO. : 6,334,681
DATED : January 1, 2002
INVENTOR(S) : Colin Maurice Perrott et al.

Page 1 of 1

It is certified that error appears in the above-identified patent and that said Letters Patent is hereby corrected as shown below:

<u>Title page,</u>
Item [75] after inventor's name, Colin Maurice Perrott, delete "Mouse Habor", insert -- Mount Barker --; and after the inventor's name, Kevin Douglas O'Connor, delete "Greenwood", insert -- Goodwood --.
ABSTRACT,
Line 2, after the word "of", delete "east", insert -- least --.

Signed and Sealed this

Twenty-first Day of May, 2002

Attest:

Attesting Officer

JAMES E. ROGAN
Director of the United States Patent and Trademark Office